US008941350B2

United States Patent
Otsuka et al.

(10) Patent No.: US 8,941,350 B2
(45) Date of Patent: Jan. 27, 2015

(54) POWER CONVERSION APPARATUS, POWER CONVERSION METHOD, MOTOR SYSTEM, AND TWO-PHASE INDUCTION MOTOR

(71) Applicant: Panasonic Corporation, Osaka (JP)

(72) Inventors: Nobuyuki Otsuka, Kyoto (JP); Yuji Kudoh, Kyoto (JP); Toshimitsu Morizane, Osaka (JP)

(73) Assignee: Panasonic Corporation, Osaka (JP)

( * ) Notice: Subject to any disclaimer, the term of this patent is extended or adjusted under 35 U.S.C. 154(b) by 22 days.

(21) Appl. No.: 13/953,048

(22) Filed: Jul. 29, 2013

(65) Prior Publication Data
US 2013/0307463 A1    Nov. 21, 2013

Related U.S. Application Data

(63) Continuation of application No. PCT/JP2012/001618, filed on Mar. 9, 2012.

(51) Int. Cl.
| | | |
|---|---|---|
| *H02P 27/04* | (2006.01) | |
| *H02P 27/16* | (2006.01) | |
| *H02M 5/293* | (2006.01) | |
| *H02K 21/02* | (2006.01) | |
| *H02M 5/297* | (2006.01) | |

(52) U.S. Cl.
CPC ............. *H02P 27/16* (2013.01); *H02M 5/293* (2013.01); *H02K 21/02* (2013.01); *H02M 5/297* (2013.01)
USPC ............................ 318/800; 318/811; 318/685

(58) Field of Classification Search
CPC ........................................................ H02P 27/16
USPC ......................................... 318/800, 812, 685
See application file for complete search history.

(56) References Cited

U.S. PATENT DOCUMENTS 4,371,802 A    2/1983   Morrill

FOREIGN PATENT DOCUMENTS

| | | |
|---|---|---|
| EP | 2 309 633 | 4/2011 |
| JP | 58-26556 | 2/1983 |
| JP | 7-46803 | 2/1995 |

(Continued)

OTHER PUBLICATIONS

International Search Report issued Jun. 12, 2012 in corresponding International Application No. PCT/JP2012/001618.

*Primary Examiner* — Erick Glass
(74) *Attorney, Agent, or Firm* — Wenderoth, Lind & Ponack, L.L.P.

(57) ABSTRACT

A power conversion method including: receiving an input voltage which is a single-phase AC voltage; designating a first target voltage and a second target voltage respectively representing consecutive target values of a first-phase output voltage and a second-phase output voltage which form a two-phase AC voltage; cyclically connecting and disconnecting a pair of input terminals and a pair of first output terminals at a duty cycle corresponding to a ratio |ref1/in| during a time period in which an instantaneous absolute value of the input voltage is greater than an instantaneous absolute value of the first target voltage; and cyclically connecting and disconnecting the pair of the input terminals and a pair of second output terminals at a duty cycle corresponding to a ratio |ref2/in| during time periods in which the instantaneous absolute value of the input voltage is greater than an instantaneous absolute value of the second target voltage.

14 Claims, 60 Drawing Sheets

(56) References Cited

FOREIGN PATENT DOCUMENTS

| | | |
|---|---|---|
| JP | 11-122849 | 4/1999 |
| JP | 2007-58676 | 3/2007 |
| JP | 2010-154714 | 7/2010 |
| JP | 2010-154715 | 7/2010 |
| JP | 2011-4449 | 1/2011 |
| WO | 2010/010711 | 1/2010 |

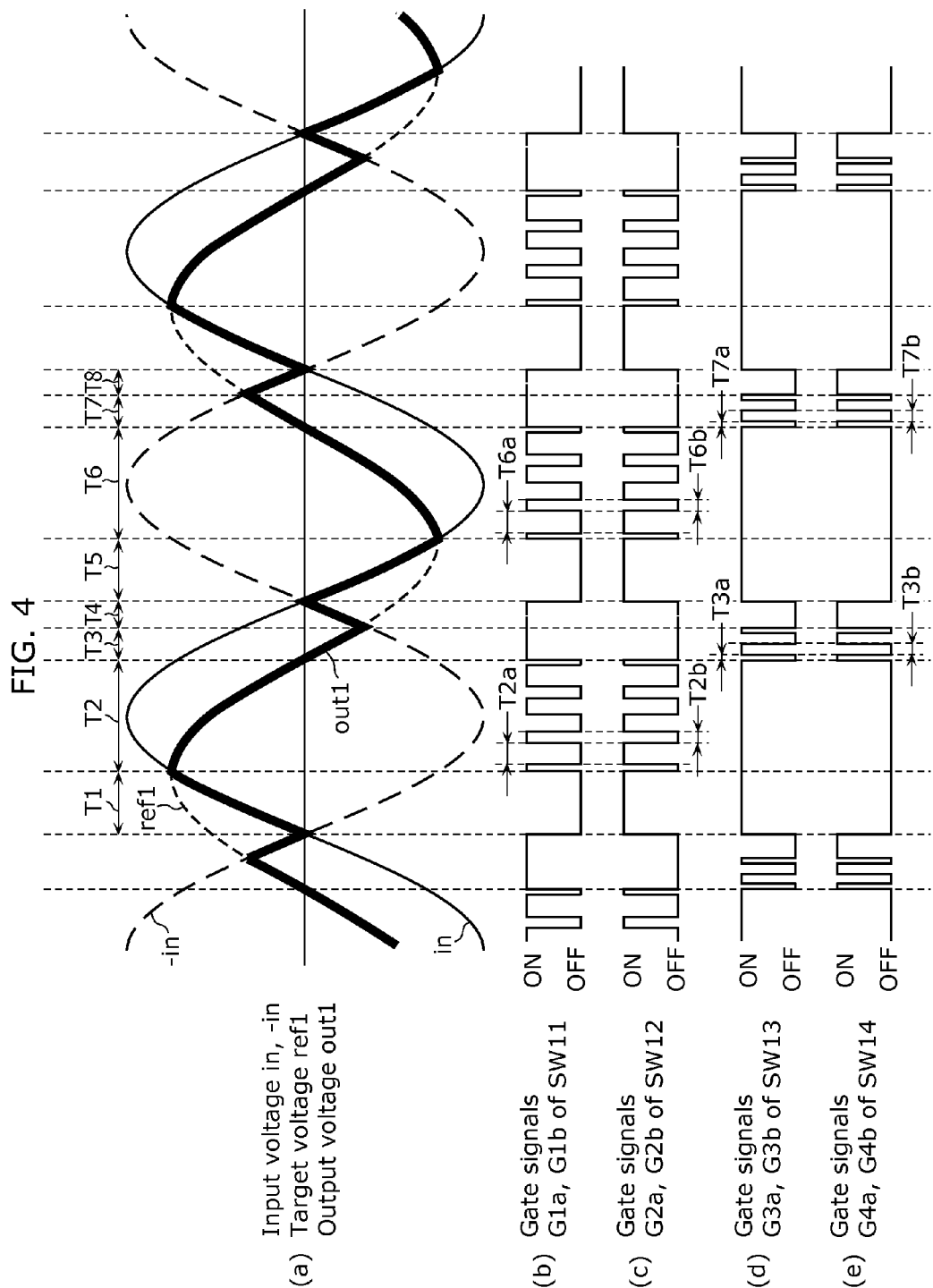

Time periods T3a, T4

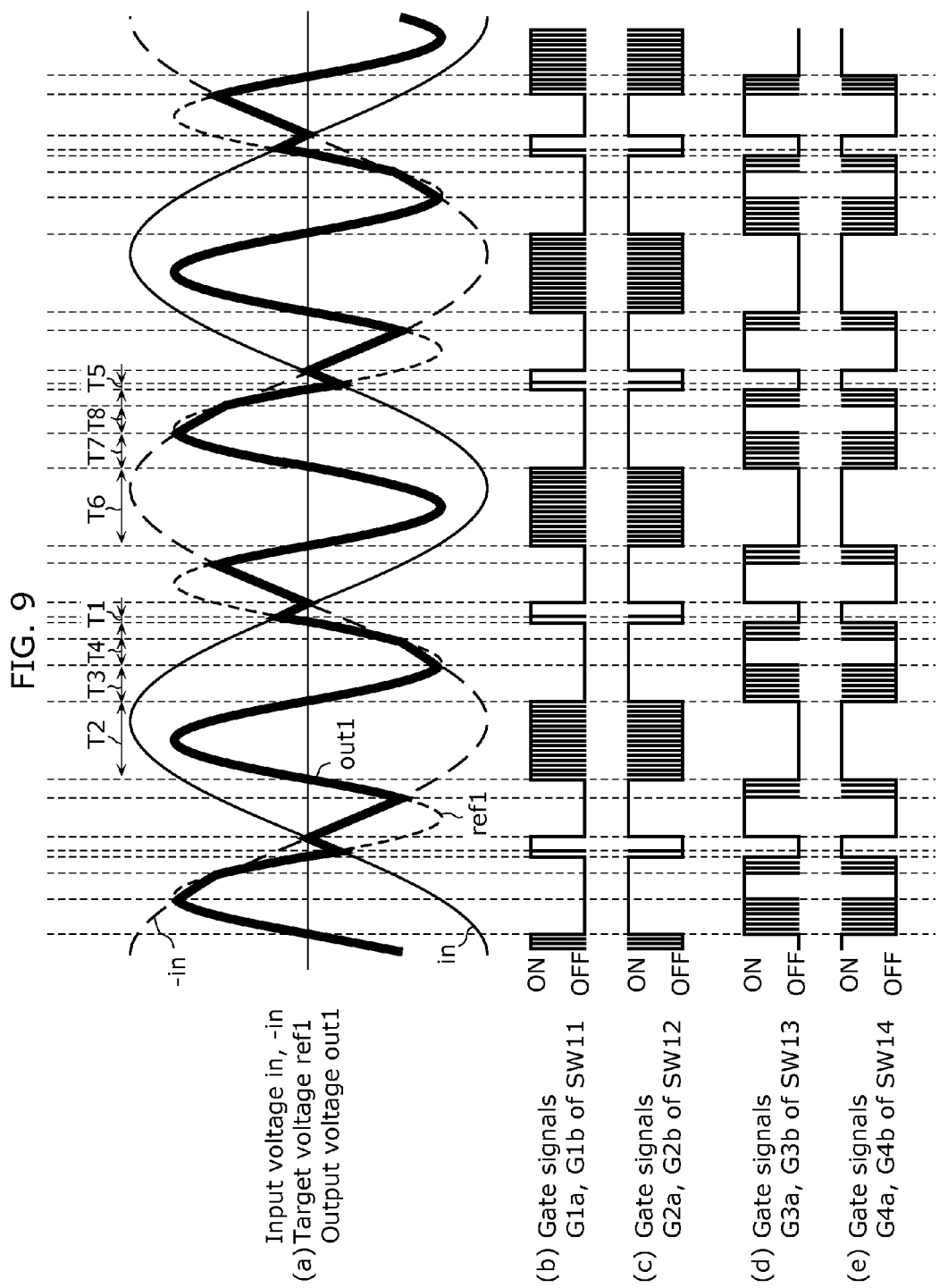

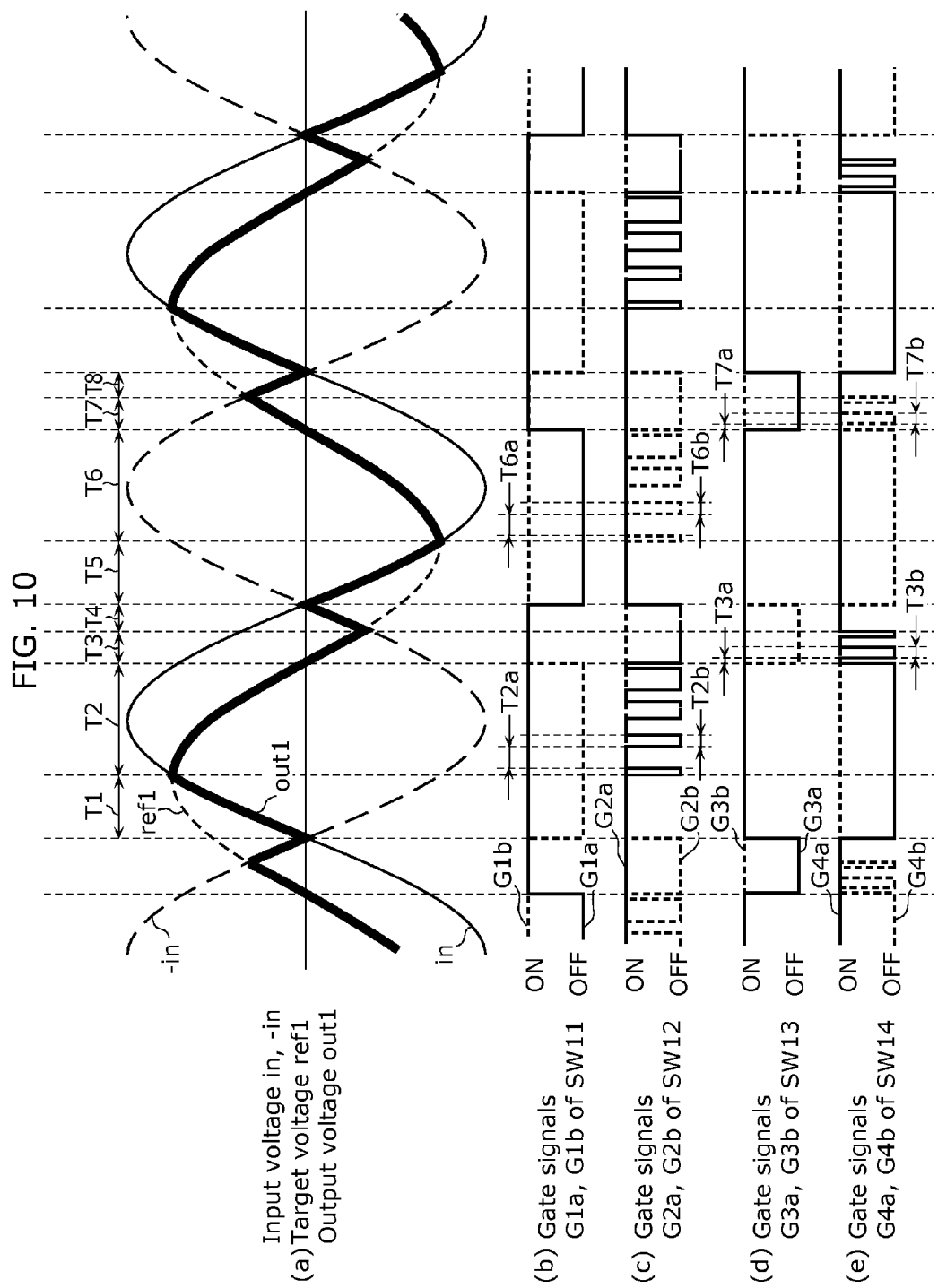

Time periods T1, T2a

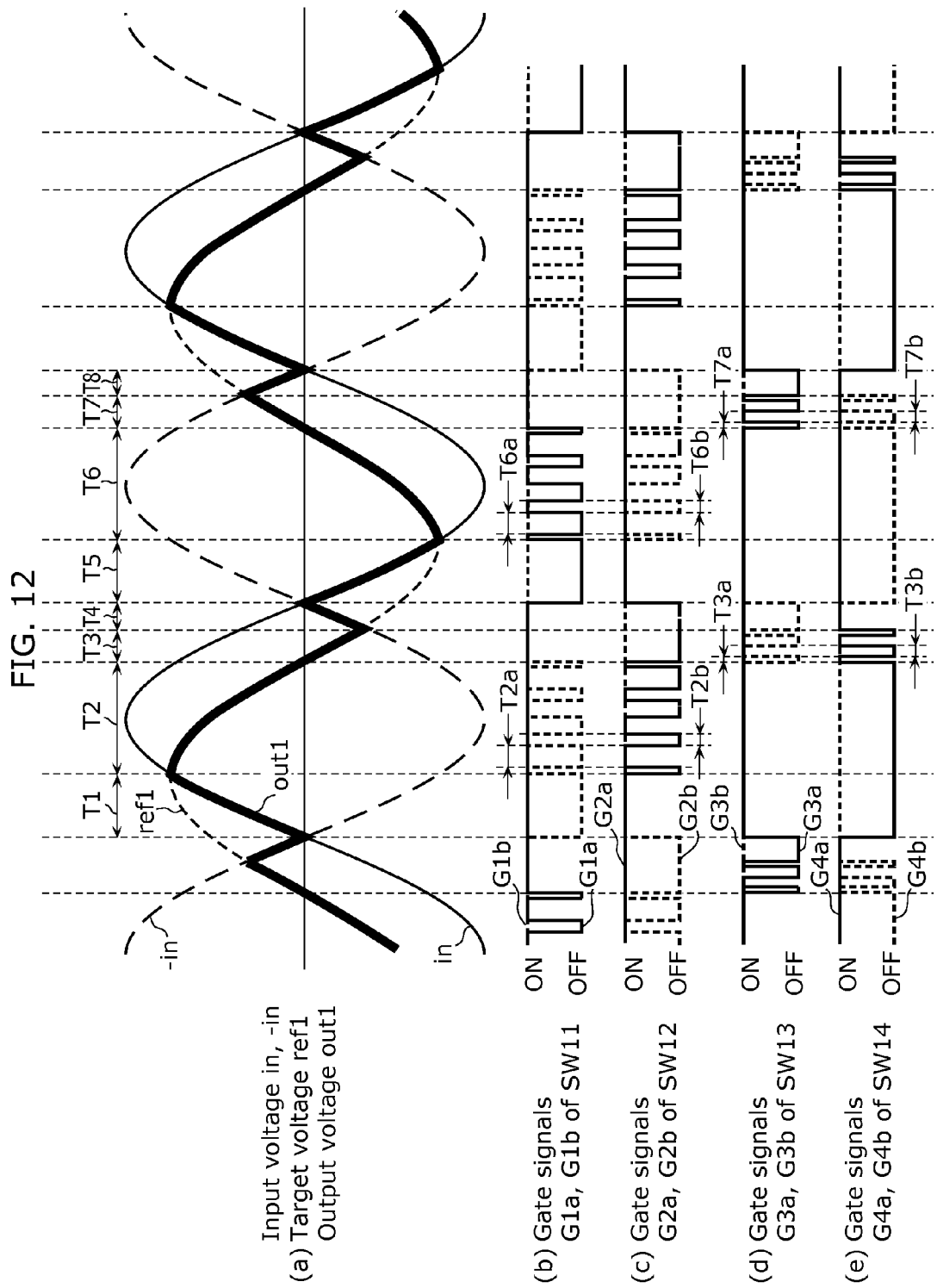

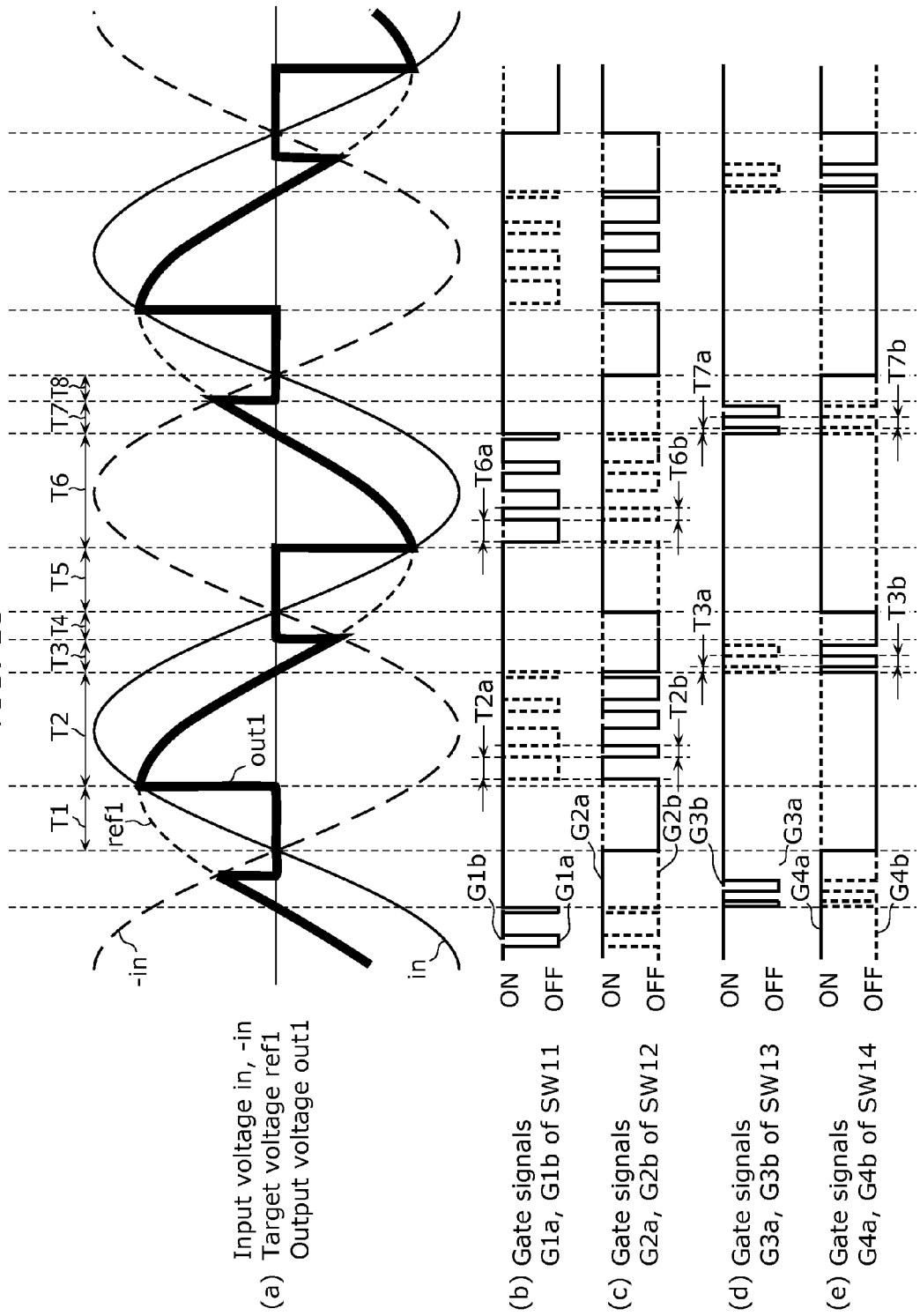

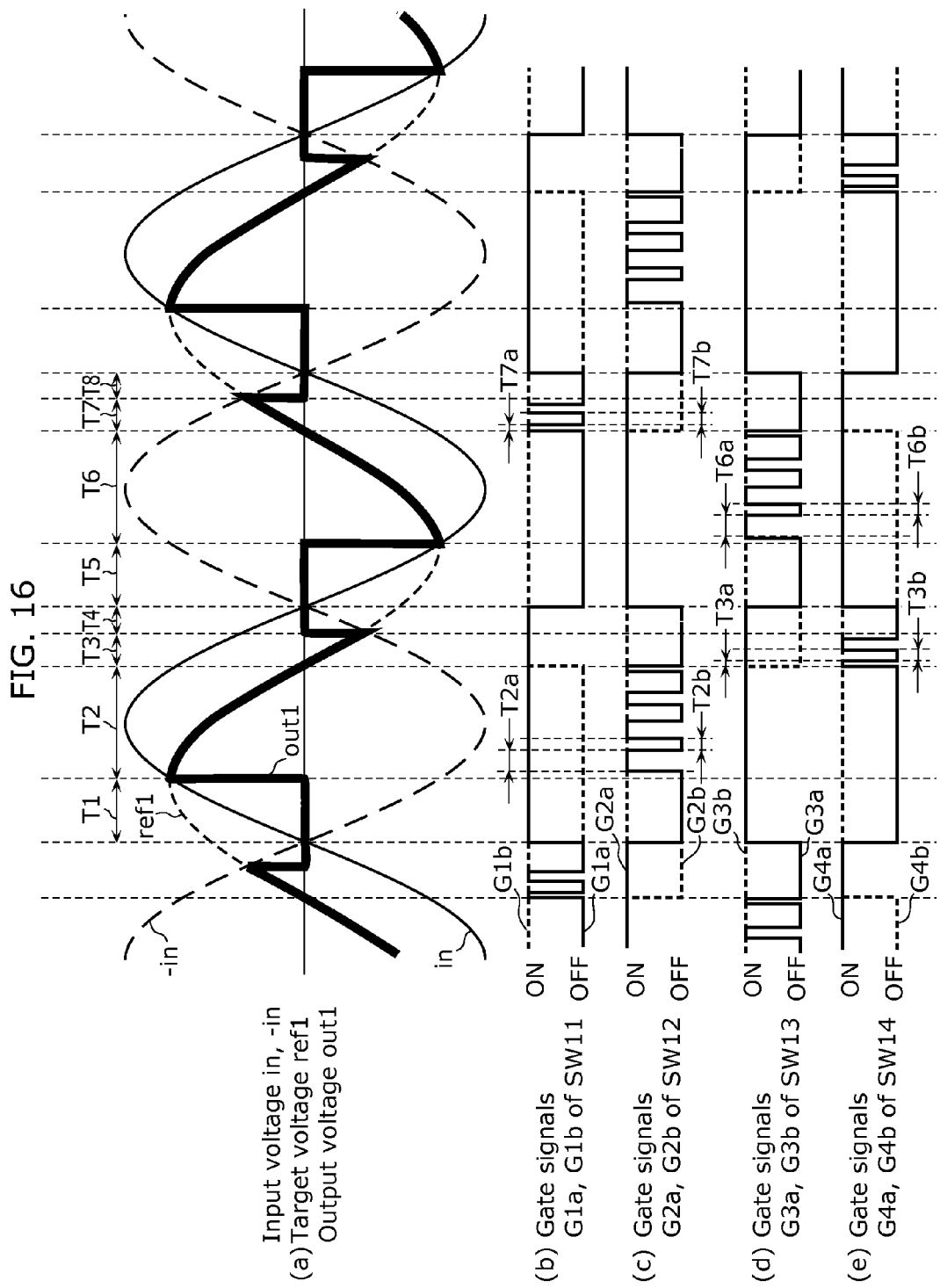

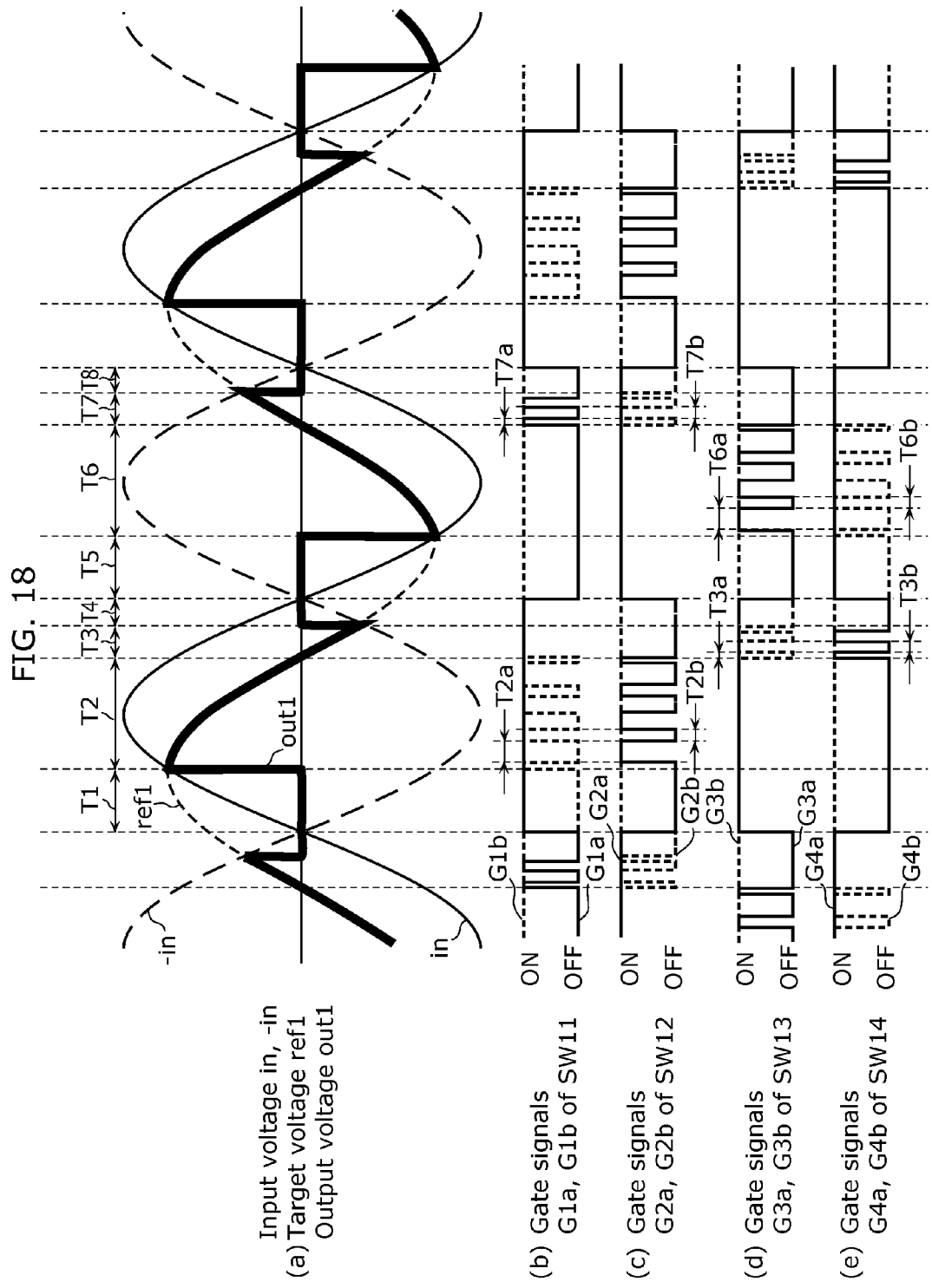

Time periods T3b, T4

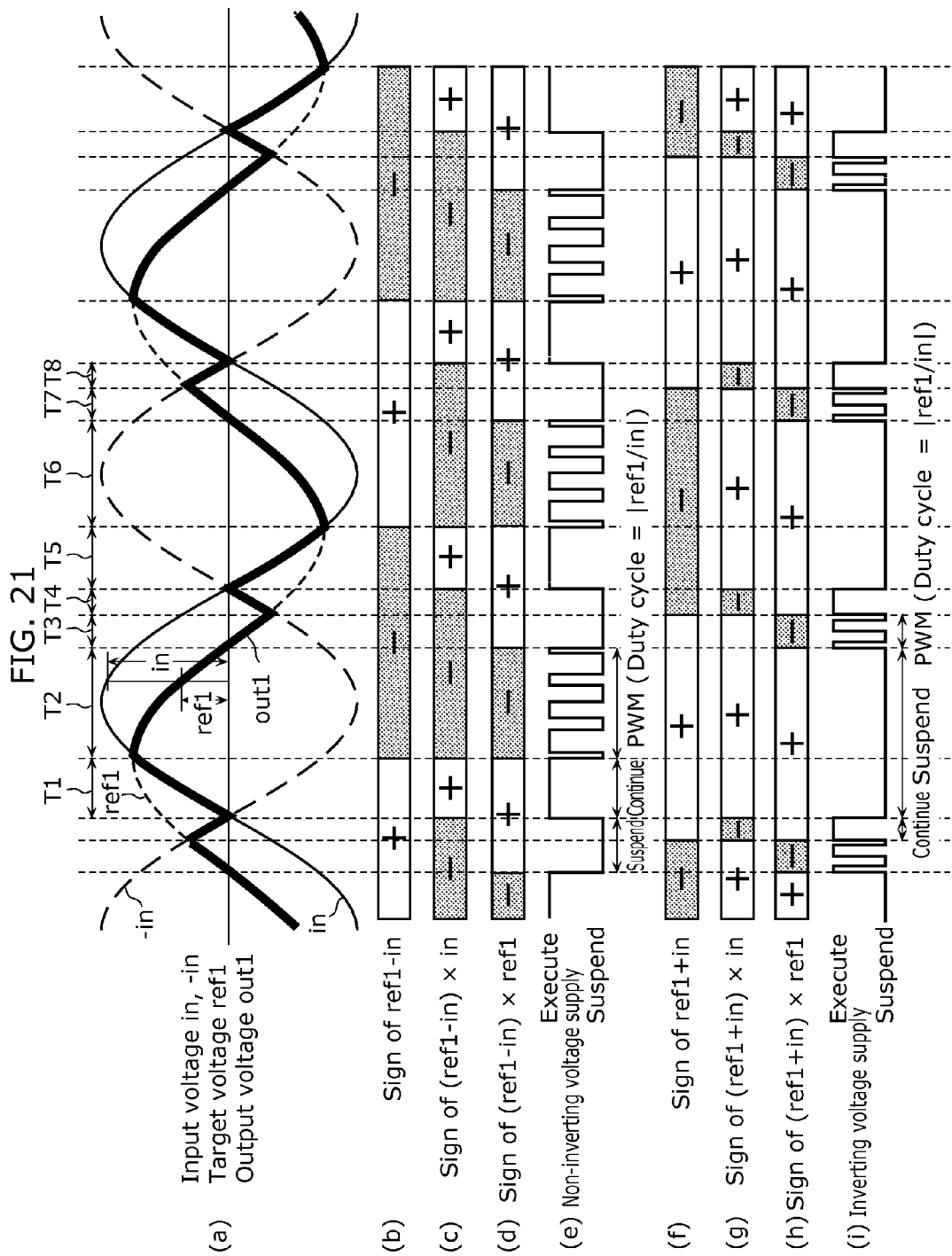

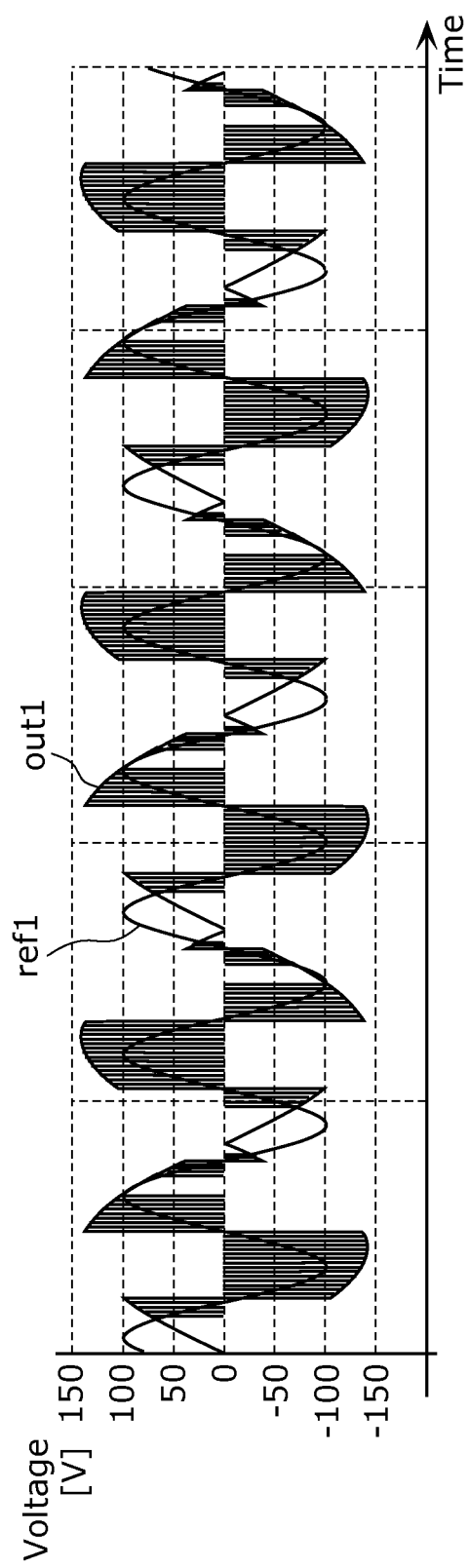

POWER CONVERSION APPARATUS, POWER CONVERSION METHOD, MOTOR SYSTEM, AND TWO-PHASE INDUCTION MOTOR

CROSS REFERENCE TO RELATED APPLICATION

This is a continuation application of PCT Patent Application No. PCT/JP2012/001618 filed on Mar. 9, 2012, designating the United States of America. The entire disclosure of the above-identified application, including the specification, drawings and claims are incorporated herein by reference in its entirety.

FIELD

One or more exemplary embodiments disclosed herein relate generally to a power conversion apparatus and a power conversion method, and particularly to a technique of converting single-phase AC power into two-phase AC power and a two-phase induction motor driven by two-phase AC power obtained by converting single-phase AC power using such a technique.

BACKGROUND

Conventionally, power conversion apparatuses including a matrix converter have been in practical use (see Patent Literature (PTL) 1 and PTL 2, for example).

FIG. 24 is a circuit diagram of a matrix converter 200 disclosed in PTL 1. To drive a three-phase motor 203 using a single-phase AC power supply 201, the matrix converter 200 directly converts an input AC voltage supplied from the single-phase AC power supply 201 into a three-phase output AC voltage using bidirectional switches 202a to 202f, and supplies the output AC voltage of each phase to a winding of a corresponding phase of the three-phase motor 203.

Each of the bidirectional switches 202a to 202f includes two switching elements connected in inverse parallel, each capable of changing between a unidirectional conducting state and a non-conducting state. A magnitude determining unit 204 determines the magnitude relationship between the voltages at the terminals of the single-phase AC power supply 201. According to the magnitude relationship determined by the magnitude determining unit 204, a control unit 205 supplies a current to the windings of the three-phase motor 203 from the single-phase AC power supply 201, and controls the conduction of each of the bidirectional switches 202a to 202f to allow circulation of a regenerative current from the windings of the three-phase motor 203.

According to PTL 1, the matrix converter 200 having the above configuration allows the motor driving current to be stable, highly efficient, and highly reliable without a short circuit.

PTL 2 discloses a similar technique for driving a three-phase motor with a single-phase AC power supply, using a matrix converter.

For home appliances, a two-phase motor is often used as it is simple in configuration and favorable for miniaturization compared to the three-phase motor. Most of the two-phase motors that operate from a household single-phase AC power supply are capacitor motors which generate a rotating magnetic field for a start-up, by applying a two-phase AC voltage generated from the single-phase AC power supply using a capacitor to a main winding and an auxiliary winding (see PTL 3, for example).

FIG. 25 is a circuit diagram of a capacitor motor 300 disclosed in PTL 3, illustrating a typical example of connection of windings 302 and 303, a capacitor 304, and an AC power supply 301. PTL 3 discloses a technique of switching among a plurality of rotation speeds of the capacitor motor by simply changing the connection of the capacitor, the windings, and the AC power supply, without a need to add a center tap for the windings or an external reactor.

CITATION LIST

Patent Literature

[PTL 1] Japanese Unexamined Patent Application Publication No. 2011-4449
[PTL 2] Japanese Unexamined Patent Application Publication No. 2010-154714
[PTL 3] Japanese Unexamined Patent Application Publication No. 7-46803

SUMMARY

Technical Problem

However, the lifespan of the motor in the capacitor motor is limited by the capacitor's lifespan. Conventionally, a single-phase motor which does not include a capacitor has been used in some cases; however, the range of application of the single-phase motor is limited compared to the capacitor motor because the single-phase motor cannot generate the rotating magnetic field for a start-up, thus not allowing unique determination of the rotor's rotating direction and readily causing torque pulsation.

In view of the above circumstance, one non-limiting and exemplary embodiment provides: a power conversion apparatus and a power conversion method for converting a single-phase AC voltage into a two-phase AC voltage without using a capacitor; a motor system which includes such a power conversion apparatus; and a two-phase induction motor suitable for being driven by such a power conversion apparatus.

Solution to Problem

In one general aspect, the techniques disclosed here feature a power conversion apparatus which converts an input voltage which is a single-phase AC voltage into output voltages forming a two-phase AC voltage, the power conversion apparatus including: a pair of input terminals to which the input voltage is applied; a pair of first output terminals which output one of the output voltages as a first-phase output voltage; a pair of second output terminals which output the other of the output voltages as a second-phase output voltage; four first bidirectional switches each corresponding to a different combination of one of the paired input terminals and one of the paired first output terminals to switch connection and disconnection between the corresponding input terminal and first output terminal according to a corresponding one of first control signals; four second bidirectional switches each corresponding to a different combination of one of the paired input terminals and one of the paired second output terminals to switch connection and disconnection between the corresponding input terminal and second output terminal according to a corresponding one of second control signals; a target voltage designating unit configured to designate a first target voltage representing, using one of AC voltages forming a two-phase AC voltage, consecutive target values of the first-phase output voltage and a second target voltage representing, using the other of the AC voltages forming the two-phase AC voltage, consecutive target values of the second-phase output voltage; a control signal generating unit configured to (i) generate the first control signals to cyclically connect and disconnect the pair of the input terminals and the pair of the first output terminals via the first bidirectional switches at a duty cycle corresponding to a ratio of an instantaneous absolute value of the first target voltage to an instantaneous absolute value of the input voltage during a time period in which the instantaneous absolute value of the input voltage is greater than the instantaneous absolute value of the first target voltage, and (ii) generate the second control signals to cyclically connect and disconnect the pair of the input terminals and the pair of the second output terminals via the second bidirectional switches at a duty cycle corresponding to a ratio of an instantaneous absolute value of the second target voltage to the instantaneous absolute value of the input voltage during a time period in which the instantaneous absolute value of the input voltage is greater than the instantaneous absolute value of the second target voltage; and a driver which supplies the generated first control signals to the first bidirectional switches and the generated second control signals to the second bidirectional switches.

This general aspect may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the specification and drawings. The benefits and/or advantages may be individually obtained by the various embodiments and features of the specification and drawings, which need not all be provided in order to obtain one or more of such benefits and/or advantages.

Advantageous Effects

The power conversion apparatus according to one or more exemplary embodiments or features disclosed herein can convert a single-phase AC voltage into a two-phase AC voltage by the switching operation of the bidirectional switches. As a result, the two-phase AC voltage can be generated from the single-phase AC voltage with high efficiency without using a capacitor having a possibility of undermining the long-term reliability of the apparatus.

Each of AC voltages forming a two-phase AC voltage generated from a household commercial power supply using the power conversion apparatus may be fed independently to the winding of a corresponding phase of the two-phase induction motor. By doing so, it is possible to provide, in a broad range of home appliances, a highly reliable and long-life motor system which does not include a capacitor and takes advantage of the two-phase induction motor that is favorable for miniaturization compared to the three-phase induction motor.

BRIEF DESCRIPTION OF DRAWINGS

These and other advantages and features will become apparent from the following description thereof taken in conjunction with the accompanying drawings, by way of non-limiting examples of embodiments disclosed herein.

FIG. 4 is a timing chart illustrating an example of gate signals according to Embodiment 1.

FIG. 9 is a timing chart illustrating another example of gate signals according to Embodiment 1.

FIG. 10 is a timing chart illustrating an example of gate signals according to Variation 1 of Embodiment 1.

FIG. 12 is a timing chart illustrating an example of gate signals according to Variation 2 of Embodiment 1.

FIG. 15 is a timing chart illustrating another example of gate signals according to Embodiment 2.

FIG. 16 is a timing chart illustrating another example of gate signals according to Embodiment 2.

FIG. 18 is a timing chart illustrating another example of gate signals according to Embodiment 2.

FIG. 21 is a timing chart illustrating a basic operation of a simulation model according to Embodiment 3.

FIG. 22B is a graph illustrating another example of a simulation result according to Embodiment 3.

DESCRIPTION OF EMBODIMENTS

Figure 1A:
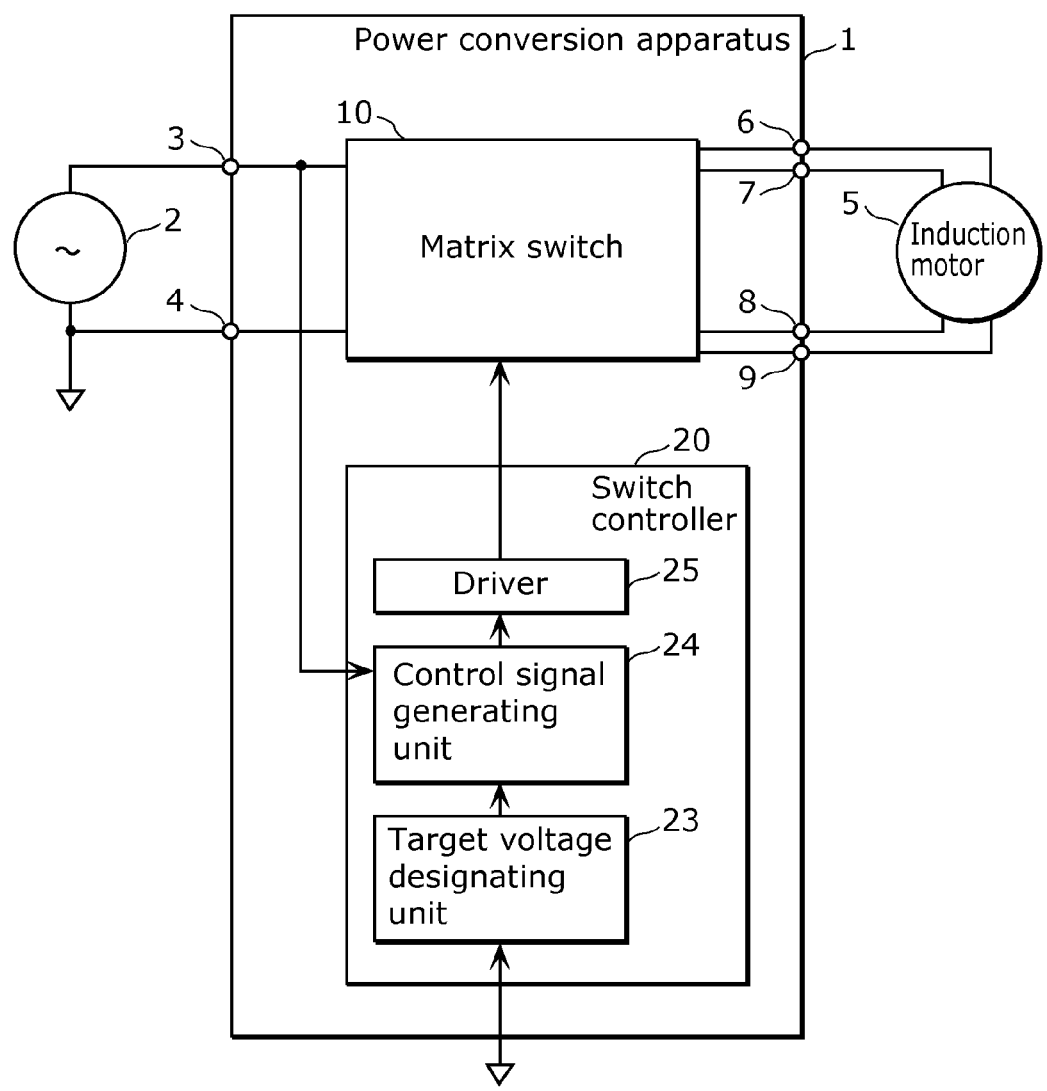
FIG. 1A is a block diagram illustrating an example of a functional configuration of a motor system including a power conversion apparatus according to Embodiment 1.

Underlying Knowledge Forming Basis of the Present Disclosure

A power conversion apparatus according to an exemplary embodiment disclosed herein is a power conversion apparatus which converts an input voltage which is a single-phase AC voltage into output voltages forming a two-phase AC voltage, the power conversion apparatus including: a pair of input terminals to which the input voltage is applied; a pair of first output terminals which output one of the output voltages as a first-phase output voltage; a pair of second output terminals which output the other of the output voltages as a second-phase output voltage; four first bidirectional switches each corresponding to a different combination of one of the paired input terminals and one of the paired first output terminals to switch connection and disconnection between the corresponding input terminal and first output terminal according to a corresponding one of first control signals; four second bidirectional switches each corresponding to a different combination of one of the paired input terminals and one of the paired second output terminals to switch connection and disconnection between the corresponding input terminal and second output terminal according to a corresponding one of second control signals; a target voltage designating unit configured to designate a first target voltage representing, using one of AC voltages forming a two-phase AC voltage, consecutive target values of the first-phase output voltage and a second target voltage representing, using the other of the AC voltages forming the two-phase AC voltage, consecutive target values of the second-phase output voltage; a control signal generating unit configured to (i) generate the first control signals to cyclically connect and disconnect the pair of the input terminals and the pair of the first output terminals via the first bidirectional switches at a duty cycle corresponding to a ratio of an instantaneous absolute value of the first target voltage to an instantaneous absolute value of the input voltage during a time period in which the instantaneous absolute value of the input voltage is greater than the instantaneous absolute value of the first target voltage, and (ii) generate the second control signals to cyclically connect and disconnect the pair of the input terminals and the pair of the second output terminals via the second bidirectional switches at a duty cycle corresponding to a ratio of an instantaneous absolute value of the second target voltage to the instantaneous absolute value of the input voltage during a time period in which the instantaneous absolute value of the input voltage is greater than the instantaneous absolute value of the second target voltage; and a driver which supplies the generated first control signals to the first bidirectional switches and the generated second control signals to the second bidirectional switches.

With such a configuration, the single-phase AC voltage can be converted into the two-phase AC voltage through the switching control by the bidirectional switches. As a result, the two-phase AC voltage can be generated from the single-phase AC voltage with high efficiency without using a capacitor having a possibility of undermining the long-term reliability of the apparatus.

The target voltage designating unit may be configured to designate the first target voltage and the second target voltage using AC voltages forming a two-phase sinusoidal AC voltage which have: an amplitude $1/\sqrt{2}$ times smaller than an amplitude of the input voltage; a frequency identical to a frequency of the input voltage; and phase differences of +45 degrees and −45 degrees relative to the input voltage.

With such a configuration, a total duty cycle of 100% can be obtained from the output voltages of the two phases, and thus the input voltage can be effectively and stably converted into the output voltage of each phase.

The control signal generating unit may be configured to (i) generate the first control signals to (a) make a straight connection between the pair of the input terminals and the pair of the first output terminals during a time period in which the input voltage and the first target voltage have a same polarity and (b) make a cross connection between the pair of the input terminals and the pair of the first output terminals during a time period in which the input voltage and the first target voltage have different polarities, and (ii) generate the second control signals to (a) make a straight connection between the pair of the input terminals and the pair of the second output terminals during a time period in which the input voltage and the second target voltage have a same polarity and (b) make a cross connection between the pair of the input terminals and the pair of the second output terminals during a time period in which the input voltage and the second target voltage have different polarities.

With such a configuration, it is possible to obtain a large output voltage having an amplitude twice larger than the amplitude of the line voltage of the input voltage at maximum.

The control signal generating unit may be configured to (i) generate the first control signals to constantly connect the pair of the input terminals and the pair of the first output terminals during a time period in which the instantaneous absolute value of the input voltage is less than or equal to the instantaneous absolute value of the first target voltage, and (ii) generate the second control signals to constantly connect the pair of the input terminals and the pair of the second output terminals during a time period in which the instantaneous absolute value of the input voltage is less than or equal to the instantaneous absolute value of the second target voltage.

With such a configuration, the effective use of the input voltage is possible because the first-phase output voltage or the second-phase output voltage is regulated to have the largest generable value when the input voltage is insufficient relative to the first target voltage or the second target voltage.

The control signal generating unit may be configured to (i) generate the first control signals to constantly disconnect the pair of the input terminals and the pair of the first output terminals during a time period in which the instantaneous absolute value of the input voltage is less than or equal to the instantaneous absolute value of the first target voltage, and (ii) generate the second control signals to constantly disconnect the pair of the input terminals and the pair of the second output terminals during a time period in which the instantaneous absolute value of the input voltage is less than or equal to the instantaneous absolute value of the second target voltage.

With such a configuration, fluctuations of the input voltage can be reduced because the voltage supply is cut off when the input voltage is insufficient relative to the first target voltage or the second target voltage. In addition, the combination of switches which form a part of the path of a circulating current can be changed while the voltage supply is cut off, and thus there is no need to accurately change the switches when the input voltage becomes 0 V. As a result, misoperation can be prevented.

The control signal generating unit may be configured to (i) generate the first control signals to short-circuit the pair of the first output terminals when the pair of the input terminals and the pair of the first output terminals are disconnected, and (ii) generate the second control signals to short-circuit the pair of the second output terminals when the pair of the input terminals and the pair of the second output terminals are disconnected.

With such a configuration, the power efficiency increases because it is possible to allow the regenerative current from the load to circulate within the power conversion apparatus.

Each of the first bidirectional switches and each of the second bidirectional switches may include two unidirectional switches connected in inverse parallel, each of the unidirectional switches changing between a forward-directional conducting state and a non-conducting state according to either a corresponding one of the first control signals or a corresponding one of the second control signals and not conducting in an opposite direction, and the control signal generating unit may be configured to (i) generate, for short-circuiting the pair of the first output terminals, the first control signals to place, in the conducting state, all the unidirectional switches included in plural ones of the first bidirectional switches which are used for short-circuiting the pair of the first output terminals, and (ii) generate, for short-circuiting the pair of the second output terminals, the second control signals to place, in the conducting state, all the unidirectional switches included in plural ones of the second bidirectional switches which are used for short-circuiting the pair of the second output terminals.

With such a configuration, it is possible to allow the regenerative current from the load to circulate within the power conversion apparatus irrespective of the direction of the regenerative current.

Each of the first bidirectional switches and each of the second bidirectional switches may include two unidirectional switches connected in inverse parallel, each of the unidirectional switches changing between a forward-directional conducting state and a non-conducting state according to either a corresponding one of the first control signals or a corresponding one of the second control signals and not conducting in an opposite direction, and the control signal generating unit may be configured to generate the first control signals and the second control signals to (i) change between the conducting state and the non-conducting state of one of the two unidirectional switches to which the input voltage is applied in a forward direction and (ii) constantly place, in the conducting state, the other of the two unidirectional switches to which the input voltage is applied in the opposite direction.

With such a configuration, the power consumption required for the switching operations can be decreased by reducing the number of switching operations performed for changing the states of the unidirectional switches.

The control signal generating unit may be configured to (i) generate the first control signals to place, in a conducting state, plural ones of the first bidirectional switches which are determined depending on a polarity of the input voltage, when the pair of the input terminals and the pair of the first output terminals are connected, and (ii) generate the second control signals to place, in a conducting state, plural ones of the second bidirectional switches which are determined depending on the polarity of the input voltage, when the pair of the input terminals and the pair of the second output terminals are connected.

With such a configuration, the heat generated by each bidirectional switch is leveled out by leveling out the number of switching operations among the bidirectional switches. Thus, it is possible to reduce the disadvantages of decreased power and lower reliability caused by local overheating.

The control signal generating unit may be configured to generate the first control signals and the second control signals to avoid overlap of a time period in which the pair of the input terminals and the pair of the first output terminals are connected and a time period in which the pair of the input terminals and the pair of the second output terminals are connected.

With such a configuration, the power feeding of the two phases can be performed in time periods which do not overlap each other in each cycle, as long as the total duty cycle for the two phases does not exceed 100%.

A power conversion method according to an exemplary embodiment disclosed herein is a power conversion method for converting an input voltage which is a single-phase AC voltage into output voltages forming a two-phase AC voltage, the power conversion method including: receiving the input voltage at a pair of input terminals; designating a first target voltage representing, using one of AC voltages forming a two-phase AC voltage, consecutive target values of a first-phase output voltage that is one of the output voltages and a second target voltage representing, using the other of the AC voltages forming the two-phase AC voltage, consecutive target values of a second-phase output voltage that is the other of the output voltages; cyclically connecting and disconnecting the pair of the input terminals and a pair of first output terminals via first bidirectional switches at a duty cycle corresponding to a ratio of an instantaneous absolute value of the first target voltage to an instantaneous absolute value of the input voltage during a time period in which the instantaneous absolute value of the input voltage is greater than the instantaneous absolute value of the first target voltage; and cyclically connecting and disconnecting the pair of the input terminals and a pair of second output terminals via second bidirectional switches at a duty cycle corresponding to a ratio of an instantaneous absolute value of the second target voltage to the instantaneous absolute value of the input voltage during a time period in which the instantaneous absolute value of the input voltage is greater than the instantaneous absolute value of the second target voltage.

With such a configuration, it is possible to obtain a highly efficient and reliable power conversion method for converting a single-phase AC voltage into a two-phase AC voltage.

A motor system according to an exemplary embodiment disclosed herein is a motor system including: the power conversion apparatus described above; a two-phase induction motor including (i) a first axis winding, (ii) a second axis winding, (iii) a rotor, (iv) a pair of first power receiving terminals connected to the first axis winding, and (v) a pair of second power receiving terminals connected to the second axis winding, the first axis winding and the second axis winding being not electrically connected within the two-phase induction motor; first feed lines connecting the pair of the first output terminals of the power conversion apparatus and the pair of the first power receiving terminals of the two-phase induction motor; and second feed lines connecting the pair of the second output terminals of the power conversion apparatus and the pair of the second power receiving terminals of the two-phase induction motor.

With such a configuration, a long-life two-phase motor which does not include a capacitor can be driven using the two-phase AC voltage converted from the single-phase AC voltage by the power conversion apparatus.

In the motor system, the two-phase induction motor may include a rotation angle sensor which outputs a rotation angle signal indicating consecutive rotation amounts of the rotor, the power conversion apparatus may further include a rotation angle obtaining unit configured to obtain the rotation angle signal, and the target voltage designating unit may be configured to perform vector control to change at least one of amplitude, frequency, and phase of the first target voltage and the second target voltage based on a difference between a rotation speed of the rotor determined from the obtained rotation angle signal and a speed command value.

In the motor system, the power conversion apparatus may further include: a current sensor which outputs current amount signals each indicating consecutive current amounts flowing in either the pair of the first output terminals or the pair of the second output terminals; and a current amount obtaining unit configured to obtain the current amount signals, and the target voltage designating unit may be configured to perform speed sensorless vector control to estimate a rotation speed of the rotor using the obtained consecutive current amounts, and change at least one of amplitude, frequency, and phase of the first target voltage and the second target voltage based on a difference between the estimated rotation speed and a speed command value.

With such a configuration, a motor system having a high controllability can be obtained.

A two-phase induction motor according to an exemplary embodiment disclosed herein is a two-phase induction motor including: a first axis winding; a second axis winding; a rotor; a pair of first power receiving terminals connected to the first axis winding; and a pair of second power receiving terminals connected to the second axis winding, wherein the first axis winding and the second axis winding are not electrically connected within the two-phase induction motor.

With such a configuration, it is possible to obtain a long-life two-phase motor which does not include a capacitor and is suitable for being driven by the power conversion apparatus described above.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying drawings, regarding a power conversion apparatus, a power conversion method, a motor system which includes such a power conversion apparatus, and a two-phase induction motor suitable for being driven by such a power conversion apparatus.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended claims and their equivalents. Therefore, among the structural elements in the following exemplary embodiments, structural elements not recited in any one of the independent claims are described as arbitrary structural elements.

Embodiment 1

FIG. 1A is a block diagram illustrating an example of a functional configuration of a motor system including a power conversion apparatus according to Embodiment 1. The motor system illustrated in FIG. 1A includes a power conversion apparatus 1, an induction motor 5, and feed lines connecting the power conversion apparatus 1 and the induction motor 5.

A single-phase AC power supply 2 supplies a single-phase AC voltage to the motor system. The single-phase AC power supply 2 may be a household commercial power supply, for example.

The power conversion apparatus 1 converts an input voltage which is a single-phase AC voltage into output voltages forming a two-phase AC voltage. The power conversion apparatus 1 includes: a pair of input terminals 3 and 4 to which the single-phase AC power supply 2 applies the input voltage; a pair of first output terminals 6 and 7 which output one of the output voltages as a first-phase output voltage; a pair of second output terminals 8 and 9 which output the other of the output voltages as a second-phase output voltage; a matrix switch 10; and a switch controller 20.

Figure 2:
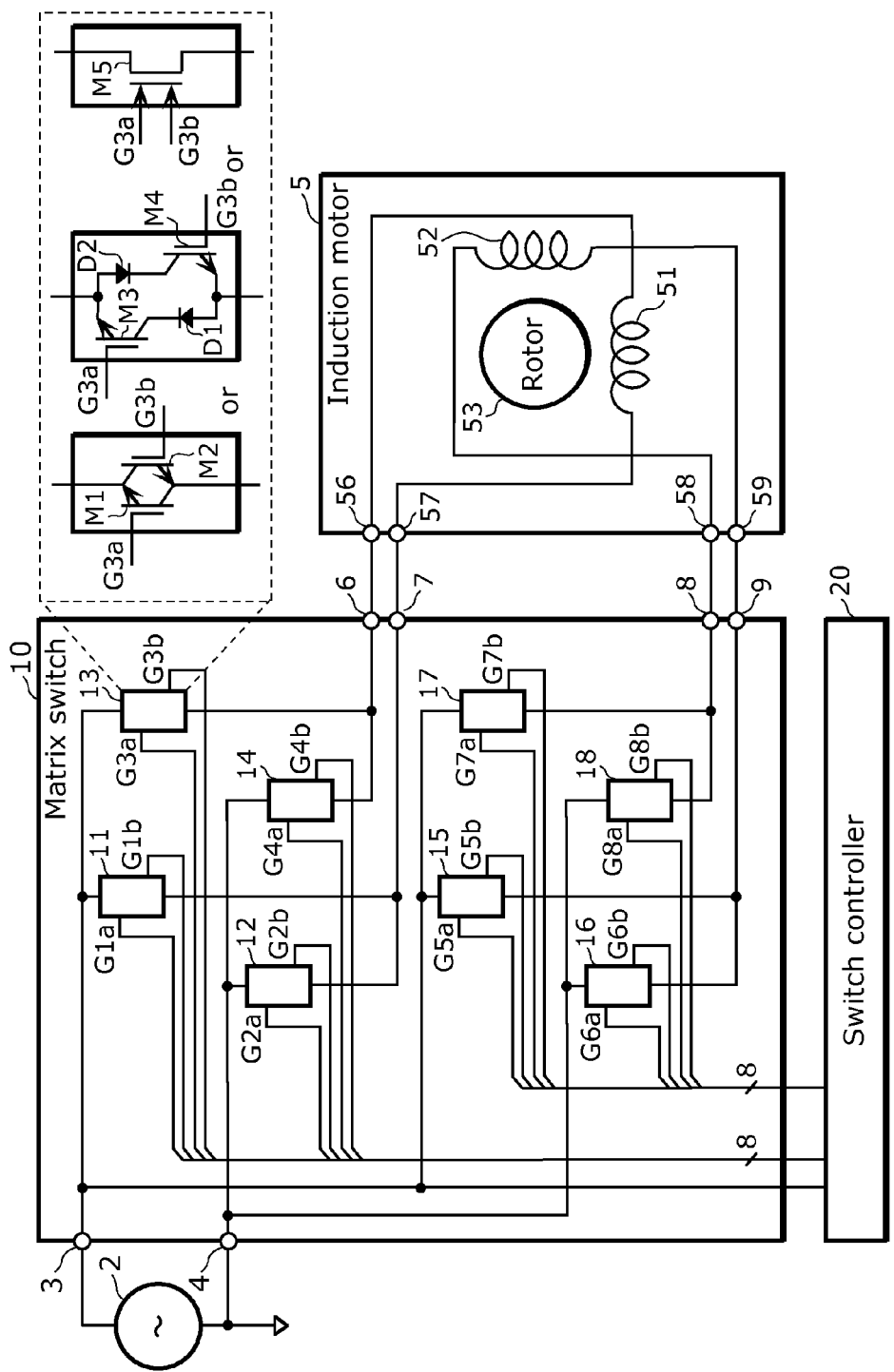
FIG. 2 is a block diagram illustrating an example of a detailed configuration of a matrix switch and an induction motor according to Embodiment 1.

FIG. 2 is a block diagram illustrating an example of a detailed configuration of the induction motor 5 and the matrix switch 10.

The induction motor 5 is a two-phase induction motor and includes a first axis winding 51, a second axis winding 52, a rotor 53, a pair of first power receiving terminals 56 and 57 connected to the first axis winding 51, and a pair of second power receiving terminals 58 and 59 connected to the second axis winding 52.

The first axis winding 51 and the second axis winding 52 are not electrically connected within the induction motor 5. The first axis winding 51 and the second axis winding 52 may have the same electrical characteristics. The first power receiving terminals 56 and 57 are connected to the first output terminals 6 and 7 of the power conversion apparatus 1 via first feed lines, and the second power receiving terminals 58 and 59 are connected to the second output terminals 8 and 9 of the power conversion apparatus 1 via second feed lines. It is to be noted that the number of the first axis winding 51 and the second axis winding 52 need not be one each. It is also possible to form a multipolar motor using two or more first axis windings 51 and second axis windings 52, given that the number is the same for both the first and second axis windings 51 and 52.

The matrix switch 10 includes first bidirectional switches 11 to 14 and second bidirectional switches 15 to 18.

The first bidirectional switches 11 to 14 each correspond to a different combination of the input terminal 3 or 4 and the first output terminal 6 or 7, and switch between connection and disconnection between the corresponding one of the input terminals 3 and 4 and the corresponding one of the first output terminals 6 and 7 according to a corresponding one of first control signals G1a to G4b supplied by the switch controller 20.

The second bidirectional switches 15 to 18 each correspond to a different combination of the input terminal 3 or 4 and the second output terminal 8 or 9, and switch between connection and disconnection between the corresponding one of the input terminals 3 and 4 and the corresponding one of the second output terminals 8 and 9 according to a corresponding one of second control signals G5a to G8b supplied by the switch controller 20.

As illustrated with the representative first bidirectional switch 13, each of the first bidirectional switches 11 to 14 and each of the second bidirectional switches 15 to 18 includes two unidirectional switches connected in inverse parallel.

For example, a single unidirectional switch may be a reverse-blocking Isolated Gate Bipolar Transistor (IGBT) M1 or M2, or may be formed as a circuit in which an IGBT M3 and a diode D1 are connected in series or a circuit in which an IGBT M4 and a diode D2 are connected in series.

Each unidirectional switch changes its state between a unidirectional conducting state and a non-conducting state according to one of the first control signals G1a to G4b and the second control signals G5a to G8b, and does not conduct in the opposite direction.

Due to this configuration, the state of each bidirectional switch can be changed to any of the following: a conducting state in which a current flows bidirectionally; a conducting state in which a current flows only in the upper direction or the lower direction of the drawing; and a non-conducting state.

The matrix switch 10 can connect, by straight connection or cross connection, and disconnect the pair of the input terminals 3 and 4 and the pair of the first output terminals 6 and 7 via the first bidirectional switches 11 to 14 according to the first control signals G1a to G4b.

Here, the straight connection between the pair of the input terminals 3 and 4 and the pair of the first output terminals 6 and 7 is defined as connection between the input terminals 3 and 4 and the first output terminals 6 and 7 in such combinations that the input voltage applied to the input terminals 3 and 4 is supplied to the first output terminals 6 and 7 with the same polarity (also referred to as non-inverting voltage supply).

The cross connection between the pair of the input terminals 3 and 4 and the pair of the first output terminals 6 and 7 is defined as connection between the input terminals 3 and 4 and the first output terminals 6 and 7 in such combinations that the input voltage applied to the input terminals 3 and 4 is supplied to the first output terminals 6 and 7 with the opposite polarity (also referred to as inverting voltage supply).

The disconnection between the pair of the input terminals 3 and 4 and the pair of the first output terminals 6 and 7 is defined as disconnection of at least one of the input terminals 3 and 4 from both of the first output terminals 6 and 7 to cut off the supply of the input voltage applied to the pair of the input terminals 3 and 4, to the pair of the first output terminals 6 and 7.

Similarly, the matrix switch 10 can connect, by straight connection or cross connection, and disconnect the pair of the input terminals 3 and 4 and the pair of the second output terminals 8 and 9 via the second bidirectional switches 15 to 18 according to the second control signals G5a to G8b. The definitions of the straight connection, cross connection, and disconnection between the pair of the input terminals 3 and 4 and the pair of the second output terminals 8 and 9 are the same as those described above.

The switch controller 20 is a controller of the matrix switch 10. The switch controller 20 generates the first control signals G1a to G4b and the second control signals G5a to G8b and supplies them to the matrix switch 10 so that the input voltage that is a single-phase AC voltage is converted into the output voltages forming a two-phase AC voltage via the matrix switch 10.

The switch controller 20 may be implemented as an analog circuit including an oscillator, a comparator, a multiplier, and so on. The switch controller 20 may also be implemented as a software function performed by a processor executing a predetermined program.

As illustrated in FIG. 1A, the switch controller 20 includes a target voltage designating unit 23, a control signal generating unit 24, and a driver 25.

The target voltage designating unit 23 designates a first target voltage representing, using one of AC voltages forming a two-phase AC voltage, consecutive target values of the first-phase output voltage and a second target voltage representing, using the other of the AC voltages forming the two-phase AC voltage, consecutive target values of the second-phase output voltage.

The control signal generating unit 24 generates the first control signals G1a to G4b and the second control signals G5a to G8b. The first control signals G1a to G4b are control signals for cyclically connecting and disconnecting the pair of the input terminals 3 and 4 and the pair of the first output terminals 6 and 7. The first control signals G1a to G4b are generated based on a comparison between the input voltage and the first target voltage in terms of the polarity and the instantaneous absolute value. The second control signals G5a to G8b are control signals for cyclically connecting and disconnecting the pair of the input terminals 3 and 4 and the pair of the second output terminals 8 and 9. The second control signals G5a to G8b are generated based on a comparison between the input voltage and the second target voltage in terms of the polarity and the instantaneous absolute value.

When the input terminal 4 is grounded with sufficiently low impedance, the control signal generating unit 24 obtains the voltage at the input terminal 3 to detect, as the input voltage, the voltage at the input terminal 3 relative to the ground voltage.

Figure 1B:
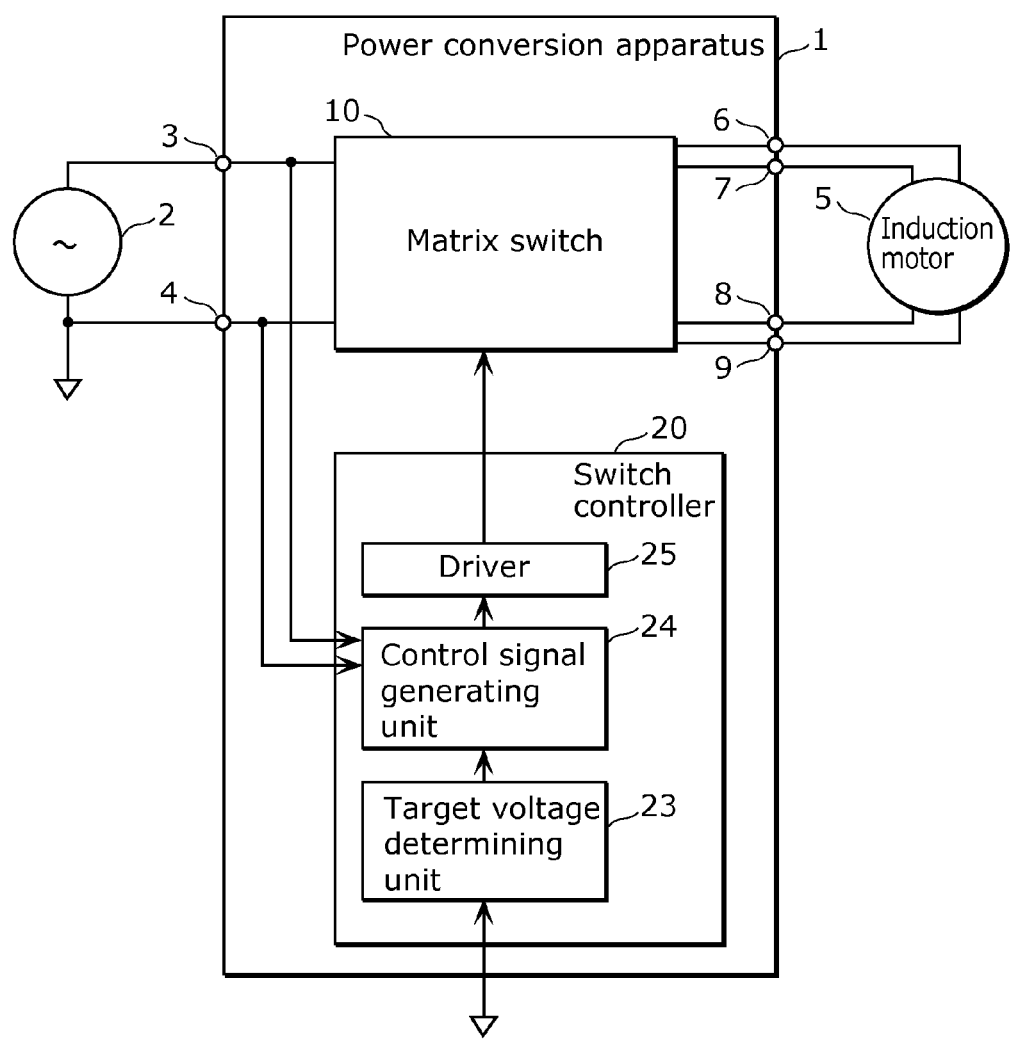
FIG. 1B is a block diagram illustrating another example of a motor system according to Embodiment 1.

When the input terminal 4 is not grounded, the control signal generating unit 24 may detect the voltage between the input terminals 3 and 4 to detect this voltage between the terminals as the input voltage, as illustrated in FIG. 1B.

The driver 25 supplies the generated first control signals G1a to G4b to the first bidirectional switches 11 to 14 and the generated second control signals G5a to G8b to the second bidirectional switches 15 to 18.

The following describes a power conversion method performed by the power conversion apparatus 1 having the above configuration.

Figure 3:
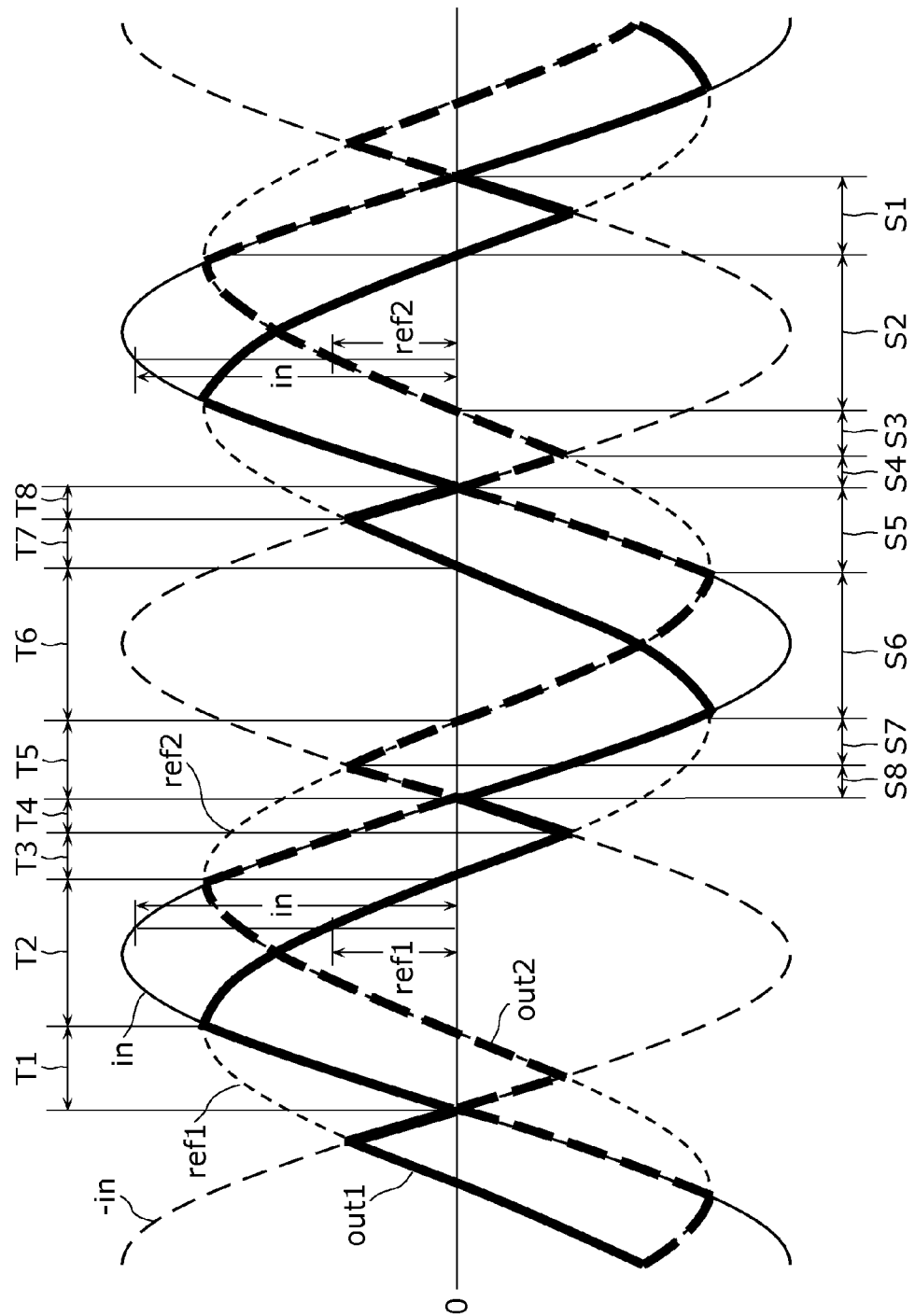
FIG. 3 is a graph illustrating an example of waveforms of main voltages used in a power conversion method according to Embodiment 1.

FIG. 3 is a graph illustrating an example of waveforms of main voltages used in the power conversion method. Referring to FIG. 3, the following first describes the fundamental idea of the power conversion method.

FIG. 3 illustrates a typical example of waveforms of input voltages in and −in, a first target voltage ref1, a second target voltage ref2, a first-phase output voltage out1, and a second-phase output voltage out2.

The input voltages in and −in are single-phase AC voltages applied to the input terminals 3 and 4 from the single-phase AC power supply 2. The input voltage in is a voltage at the input terminal 3 relative to the input terminal 4, and the input voltage −in is a voltage at the input terminal 4 relative to the input terminal 3.

As an example, the input voltage in is expressed as $(\sqrt{2})$V sin $(\omega t)$ when a sinusoidal AC voltage having V as the effective value of the voltage is applied between the input terminals 3 and 4. Here, $\omega$ denotes angular frequency, and $\omega=2\pi f$ when the frequency of the sinusoidal AC voltage is f. In addition, t denotes time. When using the Japanese household commercial power supply as the input voltage, V=100 [V] and f=50 or 60 [Hz].

Each of the first target voltage ref1 and the second target voltage ref2 is one of two AC voltages forming a two-phase AC voltage designated by the target voltage designating unit 23. The first target voltage ref1 and the second target voltage ref2 represent consecutive target values (that is, target values at respective points of time) of the first-phase output voltage out1 and the second-phase output voltage out2, respectively.

For example, when driving the two-phase induction motor using the first-phase output voltage out1 and the second-phase output voltage out2, AC voltages which are the same in frequency and different in phase are used as the first target voltage ref1 and the second target voltage ref2. The frequency, amplitude, and phase difference of the first target voltage ref1 and the second target voltage ref2 are appropriately determined for controlling the rotation speed and/or torque and according to the structure of the two-phase induction motor being driven.

As an example, the first target voltage ref1 and the second target voltage ref2 may be sinusoidal AC voltages having the same frequency as the frequency of the input voltage in, an amplitude $1/\sqrt{2}$ times smaller than the amplitude of the input voltage in, and phase differences of +45 degrees and −45 degrees relative to the input voltage in. In this case, the first target voltage ref1 is expressed as V sin $(\omega t+\pi/4)$ and the second target voltage ref2 is expressed as V sin $(\omega t-\pi/4)$.

During the time periods T2, T3, T6 and T7 in which the instantaneous absolute value of the input voltage in is greater than the instantaneous absolute value of the first target voltage ref1 (in other words, the absolute value of the input voltage is excessive), the power conversion apparatus 1 cyclically connects and disconnects the pair of the input terminals 3 and 4 and the pair of the first output terminals 6 and 7 via the first bidirectional switches 11 to 14 to regulate the average of the first-phase output voltage out1 in a short period of time (e.g., average for each cycle) to be the instantaneous value of the first target voltage ref1.

Such control may be performed through PWM control, for example. As the cycles of the PWM control, cycles sufficiently short compared to the cycles of the input voltage in, the first target voltage ref1, and the second target voltage ref2 are used (e.g., cycles of a PWM carrier signal having a frequency of 20 kHz).

The PWM control consecutively changes the connection period per cycle so that the duty cycle, i.e., a ratio of a connection period to the PWM cycle, equals a ratio of the instantaneous value of the first target voltage ref1 to the instantaneous value of the input voltage in. As a result, the average of the first-phase output voltage out1 per cycle is regulated to be the instantaneous value of the first target voltage ref1. The waveform of the first-phase output voltage out1 in FIG. 3 shows the average of the first-phase output voltage out1 per cycle.

It is to be noted that such regulation can be performed not only by the PWM control but also by other known control methods such as Pulse Density Modulation (PDM) control which consecutively changes the length of each cycle with the connection period being constant.

During the time periods T1, T4, T5 and T8 in which the instantaneous absolute value of the input voltage in is less than or equal to the instantaneous absolute value of the first target voltage ref1 (in other words, the absolute value of the input voltage is insufficient), the power conversion apparatus 1 constantly connects the pair of the input terminals 3 and 4 and the pair of the first output terminals 6 and 7 via the first bidirectional switches 11 to 14 to regulate the absolute value of the first-phase output voltage out1 to be the largest generable value.

However, during the time periods in which the absolute value of the input voltage is insufficient, the power conversion apparatus 1 may continuously disconnect the pair of the input terminals 3 and 4 and the pair of the first output terminals 6 and 7 to make the first-phase output voltage out1 zero (i.e., the voltage supply may be suspended). Such an embodiment will be described in detail later.

When connecting the pair of the input terminals 3 and 4 and the pair of the first output terminals 6 and 7, the power conversion apparatus 1 makes a straight connection during the time periods (T1, T2, T5, and T6) in which the input voltage in and the first target voltage ref1 have the same polarity, and makes a cross connection during the time periods (T3, T4, 17, and T8) in which the input voltage in and the first target voltage ref1 have different polarities.

The power conversion apparatus 1 applies the same idea to the input voltage in and the second target voltage ref2 to convert the input voltage in into the second-phase output voltage out2.

In the time periods S1 to S8 illustrated in FIG. 3, there is a relationship between the input voltage in and the second target voltage ref2 in terms of the sign and the instantaneous absolute value. This relationship is the same as that between the input voltage in and the first target voltage ref1 in terms of the sign and the instantaneous absolute value.

Thus, in order to convert the input voltage in into the second-phase output voltage out2, the power conversion apparatus 1 performs continuous non-inverting voltage supply during the time periods S1 and S5, performs non-inverting voltage supply through the PWM control during the time periods S2 and S6, performs inverting voltage supply through the PWM control during the time periods S3 and S7, and performs continuous inverting voltage supply during the time periods S4 and S8. As a result, the input voltage in is converted into the second-phase output voltage out2 as illustrated in FIG. 3. As with the waveform of the first-phase output voltage out1, the waveform of the second-phase output voltage out2 in FIG. 3 is represented by the average per cycle.

Next, the following describes the processing performed by the switch controller 20 to execute such a power conversion method.

FIG. 4 is a timing chart illustrating an example of the waveforms of the input voltages in and −in, the target voltage ref1 designated by the target voltage designating unit 23, the first control signals G1a to G4b generated by the control signal generating unit 24, and the output voltage out1. The waveform of the output voltage out1 is represented by the average of the output voltage out1 per cycle. The time periods T1 to T8 correspond to the time periods T1 to T8 in FIG. 3, respectively.

In FIG. 4 and the following description, the first bidirectional switches 11 to 14 are denoted as SW11 to SW14, respectively, and the first control signals G1a to G4b are denoted as gate signals G1a to G4b of SW11 to SW14, respectively. The ON level of the gate signals G1a to G4b indicates a signal level for placing the unidirectional switches forming the SW11 to SW14 in the conducting state, whereas the OFF level of the gate signals G1a to G4b indicates a signal level for placing the unidirectional switches forming the SW11 to SW14 in the non-conducting state.

FIG. 5A to FIG. 5H are circuit diagrams each illustrating: the conduction states of SW11 to SW14 that are set according to the gate signals G1a to G4b illustrated in FIG. 4 in the time periods T1 to T8; and the current path of the first axis winding 51 determined accordingly. In FIG. 5A to FIG. 5H, the conducting state and the non-conducting state of each of the unidirectional switches forming SW11 to SW14 are denoted by a solid line and a dotted line, respectively, and the current path of the first axis winding 51 is denoted by a thick dashed arrow.

For simplicity, FIG. 4, FIG. 5A to FIG. 5H, and the following description focus on the first target voltage ref1, the gate signals G1a to G4b, and SW11 to SW14 which are for converting the input voltage in into the first-phase output voltage out1. However, the same holds true for the second target voltage ref2, the second control signals G5a to G8b, and the bidirectional switches 15 to 18 which are for converting the input voltage in into the second-phase output voltage out2.

The target voltage designating unit 23 designates the first target voltage ref1 that is a voltage of one of the two phases of the two-phase AC voltage. For example, the target voltage designating unit 23 designates the first target voltage ref1 by actually generating the first target voltage ref1 using an oscillator or by showing the consecutive instantaneous values of the first target voltage ref1 as time-series data.

The control signal generating unit 24 consecutively (e.g., per PWM cycle) determines one of the time periods T1 to T8 as the current period based on a comparison between the instantaneous value of the input voltage in and the instantaneous value of the first target voltage ref1. The control signal generating unit 24 then generates the gate signals G1a to G4b for performing one of the continuous non-inverting voltage supply, the non-inverting voltage supply through the PWM control, the continuous inverting voltage supply, and the inverting voltage supply through the PWM control, according to the determined time period.

In the time periods T1 and T5, the gate signals G1a to G4b for the continuous non-inverting voltage supply are generated.

The control signal generating unit 24 determines the time period T1 as the current period based on $0<\text{in} \leq \text{ref1}$ (condition 1), and determines the time period T5 as the current period based on $0>\text{in} \geq \text{ref1}$ (condition 5).

Upon determination of the time period T1 or T5, the control signal generating unit 24 sets the gate signals G2a and G2b of SW12 and the gate signals G3a and G3b of SW13 to the ON level, and sets the gate signals G1a and G1b of SW11 and the gate signals G4a and G4b of SW14 to the OFF level.

Figure 5A:
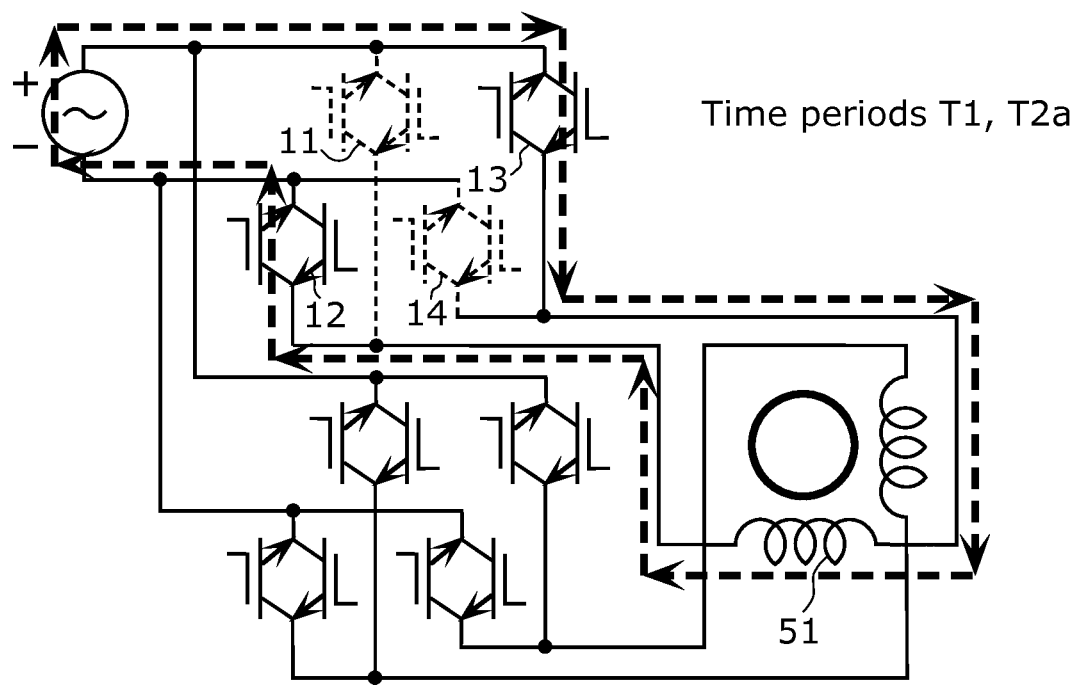
FIG. 5A is a circuit diagram illustrating an example of the states of switches and a current path according to Embodiment 1.
Figure 5B:
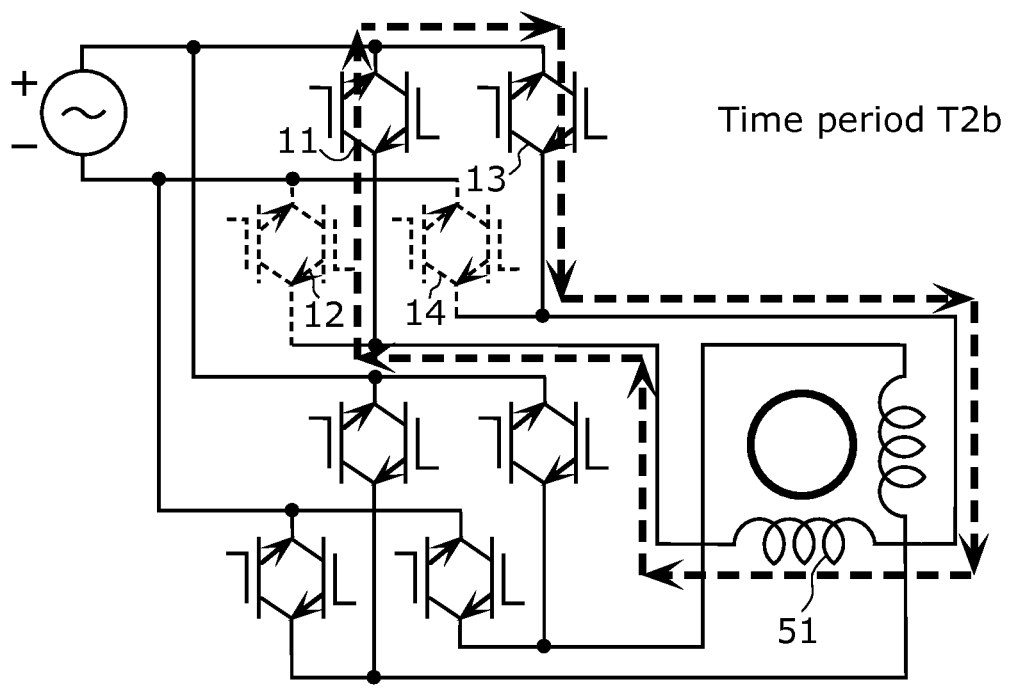
FIG. 5B is a circuit diagram illustrating an example of the states of switches and a current path according to Embodiment 1.
Figure 5C:
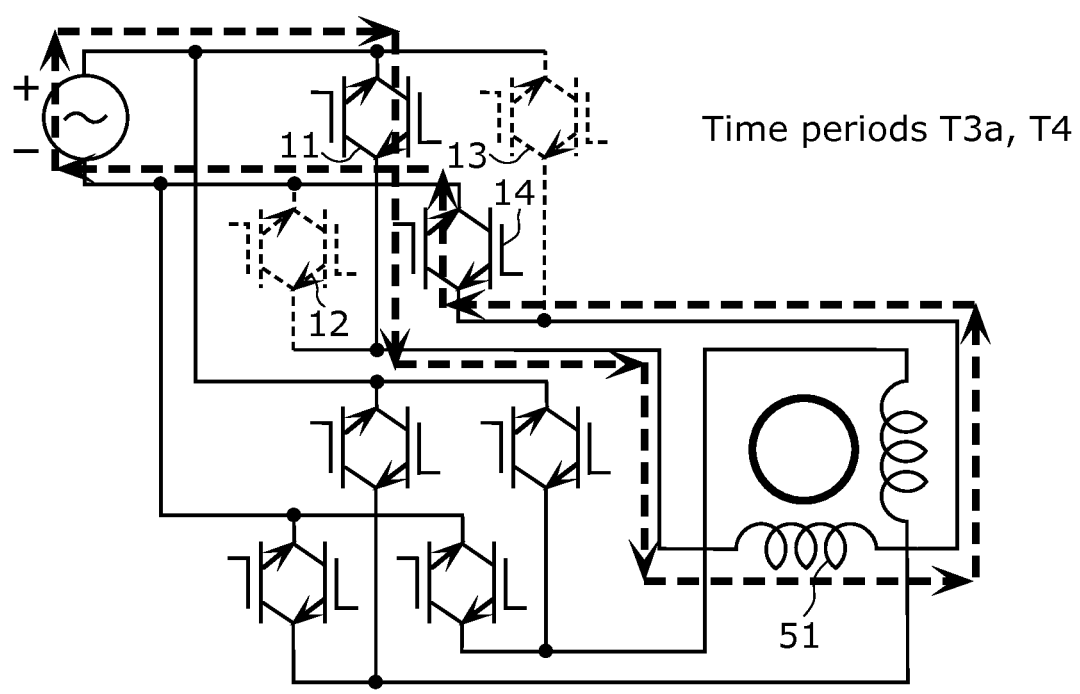
FIG. 5C is a circuit diagram illustrating an example of the states of switches and a current path according to Embodiment 1.
Figure 5D:
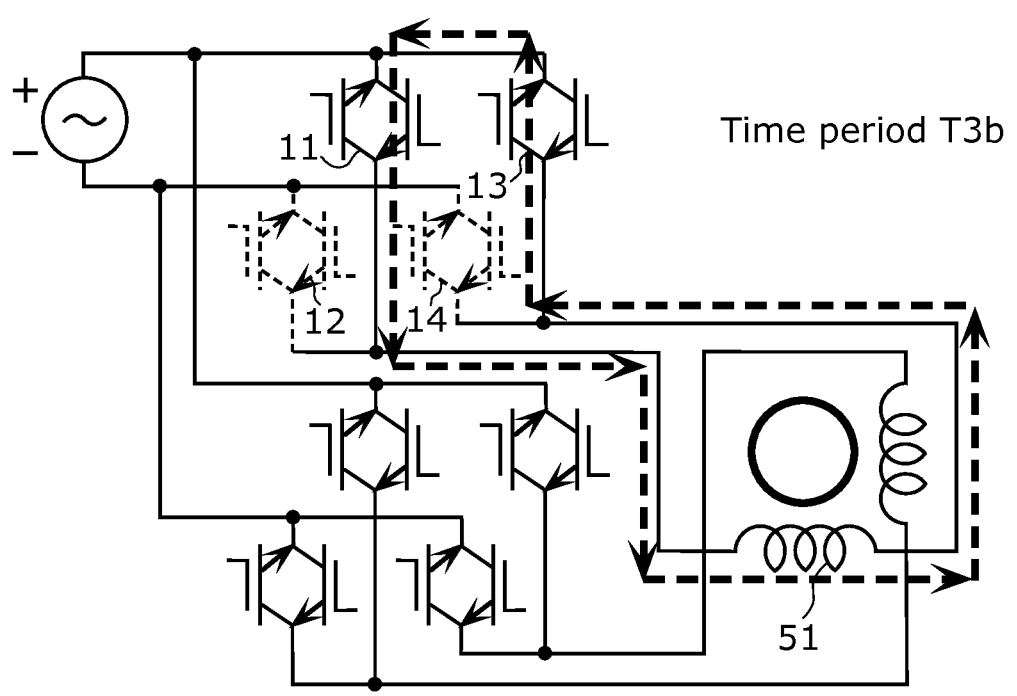
FIG. 5D is a circuit diagram illustrating an example of the states of switches and a current path according to Embodiment 1.
Figure 5E:
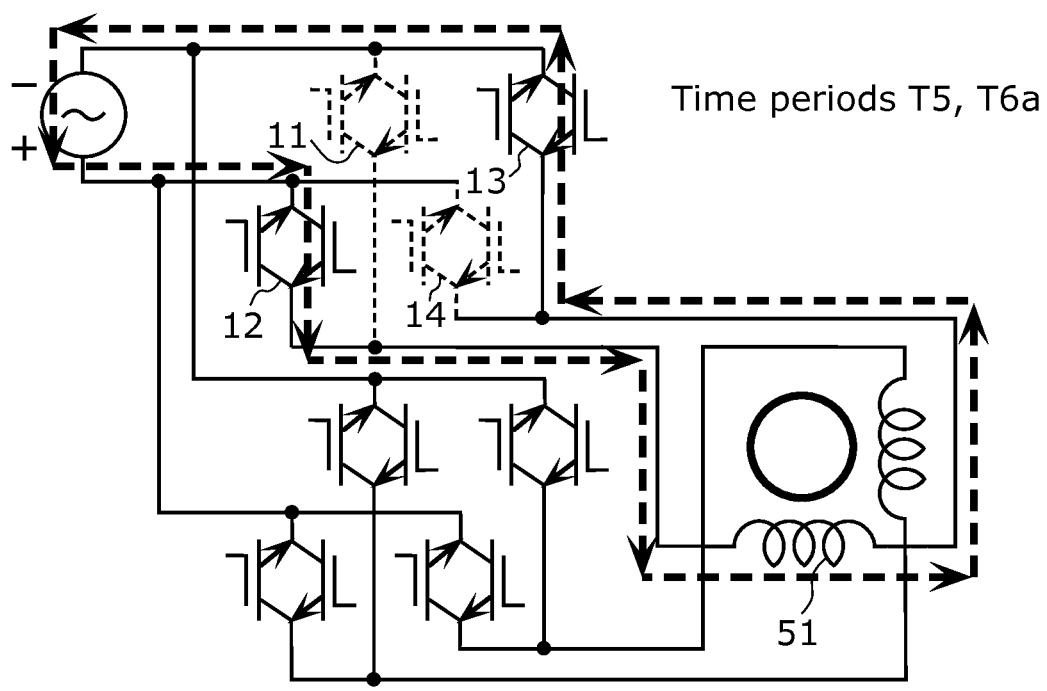
FIG. 5E is a circuit diagram illustrating an example of the states of switches and a current path according to Embodiment 1.

According to such gate signals G1a to G4b, in the time periods T1 and T5, the conduction states of SW11 to SW14 and the current path of the first axis winding 51 are set as illustrated in FIG. 5A and FIG. 5E for making a straight connection between the pair of the input terminals 3 and 4 and the pair of the first output terminals 6 and 7, to perform the continuous non-inverting voltage supply.

In the time periods T2 and T6, the first control signals G1a to G4b for the non-inverting voltage supply through the PWM control are generated.

The control signal generating unit 24 determines the time period T2 as the current period based on $0<\text{ref1}<\text{in}$ (condition 2), and determines the time period T6 as the current period based on $0>\text{ref}>\text{in}$ (condition 6).

Upon determination of the time period T2 or T6, the control signal generating unit 24 sets the levels of the gate signals G1a to G4b in power feeding period T2a, T6a in the same manner as in the time period T1, T5. Each of the power feeding periods T2a and T6a mentioned here is a part of the PWM cycle.

The control signal generating unit 24 consecutively changes the lengths of the power feeding periods T2a and T6a so that the ratio of the power feeding period T2a, T6a to the PWM cycle equals the ratio of the instantaneous value of the first target voltage ref1 to the instantaneous value of the input voltage in. In the example illustrated in FIG. 4, the lengths of the power feeding periods T2a and T6a are gradually reduced, and become zero at the end of the time periods T2 and T6.

Furthermore, the control signal generating unit 24 sets the gate signals G1a and G1b of SW11 and the gate signals G1a and G3b of SW13 to the ON level, and sets the gate signals G2a and G2b of SW12 and the gate signals G4a and G4b of SW14 to the OFF level in regeneration periods T2b and T6b, each of which is the remaining part of the PWM cycle.

Figure 5F:
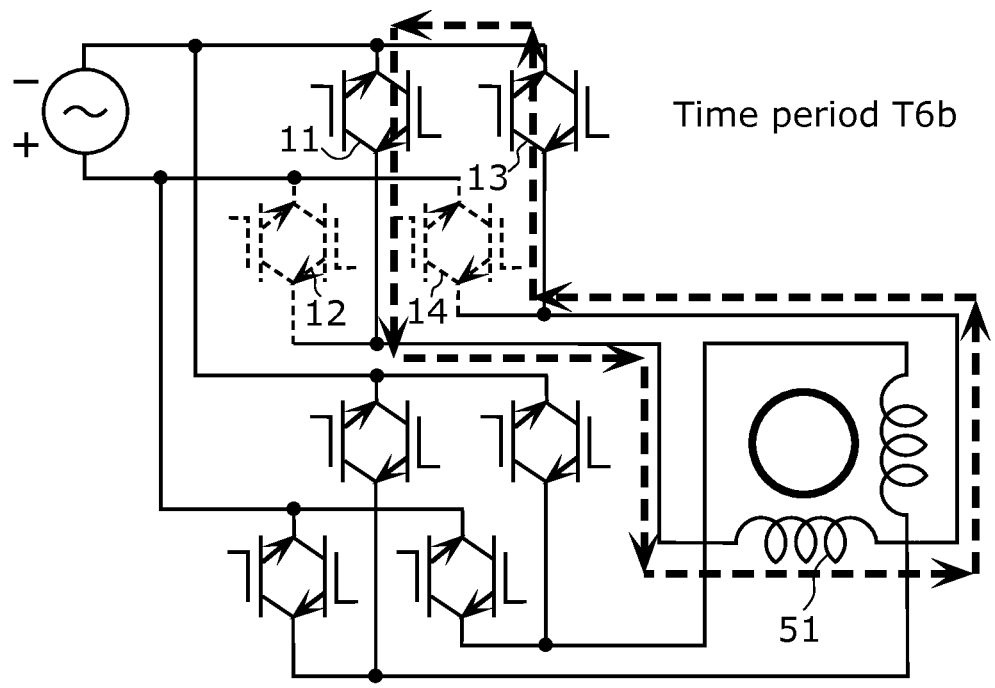
FIG. 5F is a circuit diagram illustrating an example of the states of switches and a current path according to Embodiment 1.

According to such gate signals G1a to G4b, in the time periods T2a and T6a, the conduction states of SW11 to SW14 and the current path of the first axis winding 51 are set as illustrated in FIG. 5A and FIG. 5E for making a straight connection between the pair of the input terminals 3 and 4 and the pair of the first output terminals 6 and 7, to perform the non-inverting voltage supply. Furthermore, in the time periods T2a and T6a, the conduction states of SW11 to SW14 and the current path of the first axis winding 51 are set as illustrated in FIG. 5B and FIG. 5F for short-circuiting the pair of the first output terminals 6 and 7, to perform power regeneration which allows circulation, within the matrix switch 10, of a regenerative current from the first axis winding 51. As a result, the non-inverting voltage supply through the PWM control (cyclical power feeding and regeneration) is performed in the time periods T2 and T6.

In the time periods T3 and T7, the gate signals G1a to G4b for the inverting voltage supply through the PWM control are generated.

The control signal generating unit 24 determines the time period T3 as the current period based on 0>ref1>−in (condition 3), and determines the time period T7 as the current period based on 0<ref1<−in (condition 7).

Upon determination of the time period T3 or T7, the control signal generating unit 24 sets the gate signals G1a and G1b of SW11 and the gate signals G4a and G4b of SW14 to the ON level and sets the gate signals G2a and G2b of SW12 and the gate signals G1a and G3b of SW13 to the OFF level in power feeding period T3a, T7a each of which is a part of the PWM cycle.

The control signal generating unit 24 consecutively changes the lengths of the power feeding periods T3a and T7a so that the ratio of the power feeding period T3a, T7a to the PWM cycle equals the ratio of the instantaneous value of the first target voltage ref1 to the instantaneous value of the input voltage in. In the example illustrated in FIG. 4, the lengths of the power feeding periods T3a and T7a are zero at the beginning of the time periods T3 and T7, and are gradually increased afterward.

Furthermore, in regeneration periods T3b and T7b, each of which is the remaining part of the PWM cycle, the control signal generating unit 24 sets the levels of the gate signals G1a to G4b in the same manner as in the time periods T2b and T6b, respectively.

Figure 5G:
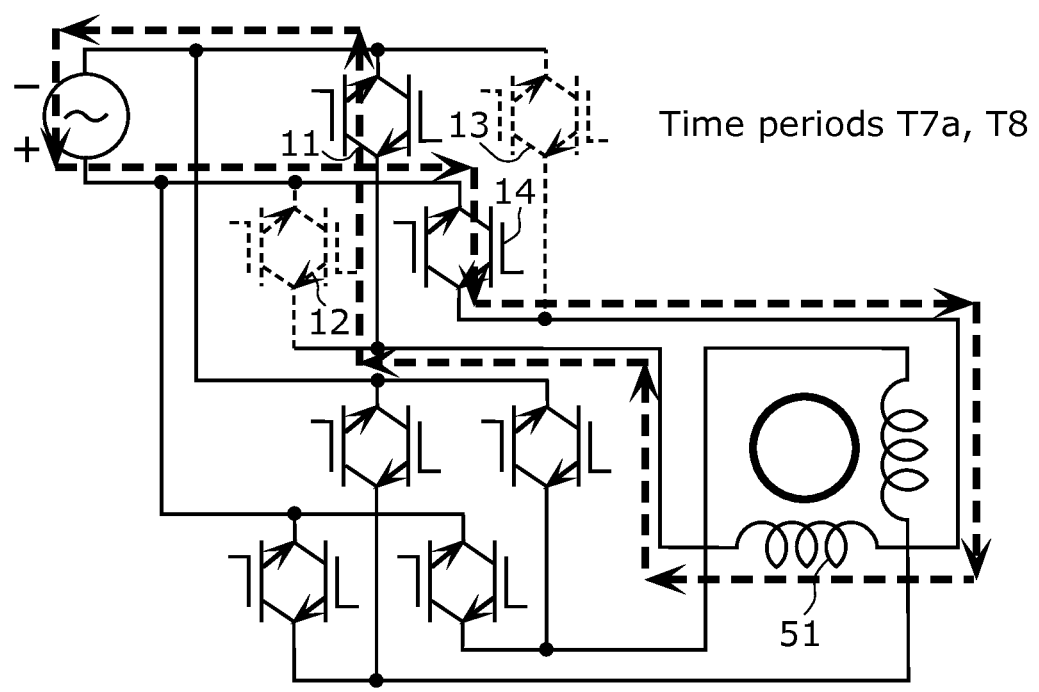
FIG. 5G is a circuit diagram illustrating an example of the states of switches and a current path according to Embodiment 1.
Figure 5H:
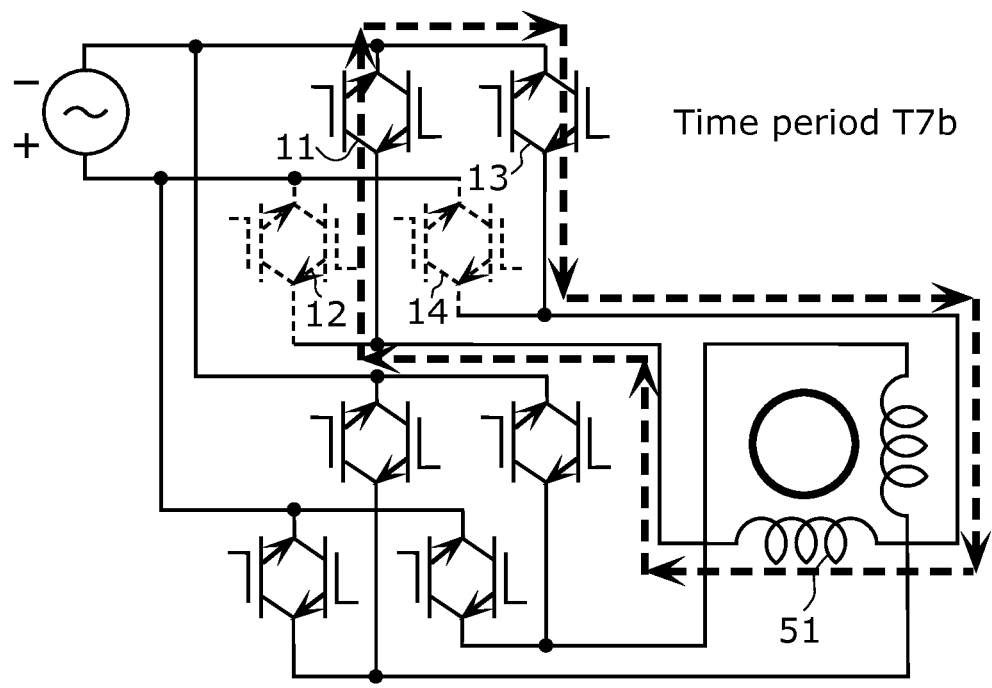
FIG. 5H is a circuit diagram illustrating an example of the states of switches and a current path according to Embodiment 1.

According to such gate signals G1a to G4b, in the time periods T3a and T7a, the conduction states of SW11 to SW14 and the current path of the first axis winding 51 are set as illustrated in FIG. 5C and FIG. 5G for making a cross connection between the pair of the input terminals 3 and 4 and the pair of the first output terminals 6 and 7, to perform the inverting voltage supply. Furthermore, in the time periods T3b and T7b, the conduction states of SW11 to SW14 and the current path of the first axis winding 51 are set as illustrated in FIG. 5D and FIG. 5H for short-circuiting the pair of the first output terminals 6 and 7, to perform power regeneration which allows circulation, within the matrix switch 10, of a regenerative current from the first axis winding 51. As a result, the inverting voltage supply through the PWM control (cyclical power feeding and regeneration) is performed in the time periods T3 and T7.

In the time periods T4 and T8, the gate signals G1a to G4b for the continuous inverting voltage supply are generated.

The control signal generating unit 24 determines the time period T4 as the current period based on 0>−in≥ref1 (condition 4), and determines the time period T8 as the current period based on 0<−in≤ref1 (condition 8).

Upon determination of the time period T4 or T8, the control signal generating unit 24 sets the levels of the gate signals G1a to G4b in the same manner as in the time period T3a, T7a.

According to such gate signals G1a to G4b, in the time periods T4 and T8, the conduction states of SW11 to SW14 and the current path of the first axis winding 51 are set as illustrated in FIG. 5C and FIG. 5G for making a cross connection between the pair of the input terminals 3 and 4 and the pair of the first output terminals 6 and 7, to perform the continuous inverting voltage supply.

According to the power conversion apparatus 1 and the power conversion method described above, it is possible to convert the input voltage which is a single-phase AC voltage into a two-phase AC voltage with high efficiency using the matrix switch, without requiring a direct voltage in between.

The two-phase AC voltage obtained by the conversion by the power conversion apparatus 1 is used for, for example, driving the induction motor 5 in which the first axis winding 51 and the second axis winding 52 are not electrically connected. Neither the induction motor 5 nor the power conversion apparatus 1 includes a capacitor that reduces the lifespan and reliability of the apparatus. Thus, combining the induction motor 5 and the power conversion apparatus 1 produces a long-life and highly reliable motor system which does not include a capacitor that reduces the lifespan and reliability of the apparatus.

With the conventional capacitor motor, the resistance of the auxiliary winding used for a start-up is sometimes set larger than that of the main winding. With such a capacitor motor, the torque is limited due to the resistance of the auxiliary winding.

In contrast, the two-phase AC voltage generated by the power conversion apparatus 1 is suitable to be applied to two windings having the same electrical characteristics. Thus, combining the power conversion apparatus 1 and the induction motor 5 which includes the first axis winding 51 and the second axis winding 52 having the same electrical characteristics produces a high-efficiency motor system.

In addition, the following advantageous effect can also be obtained because the single-phase to two-phase conversion by the power conversion apparatus 1 produces output voltages having a large amplitude compared output voltages produced by a typical single-phase to three-phase conversion.

Figure 6A:
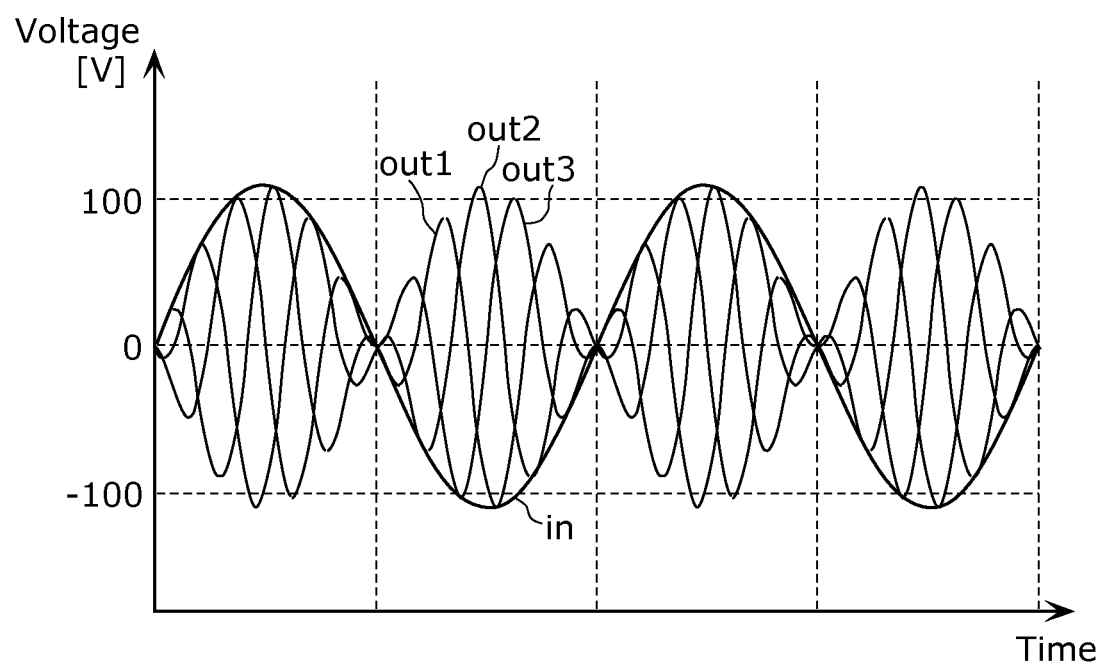
FIG. 6A is a graph illustrating an example of output voltages obtained by a single-phase to three-phase conversion performed by a typical matrix converter.
Figure 6B:
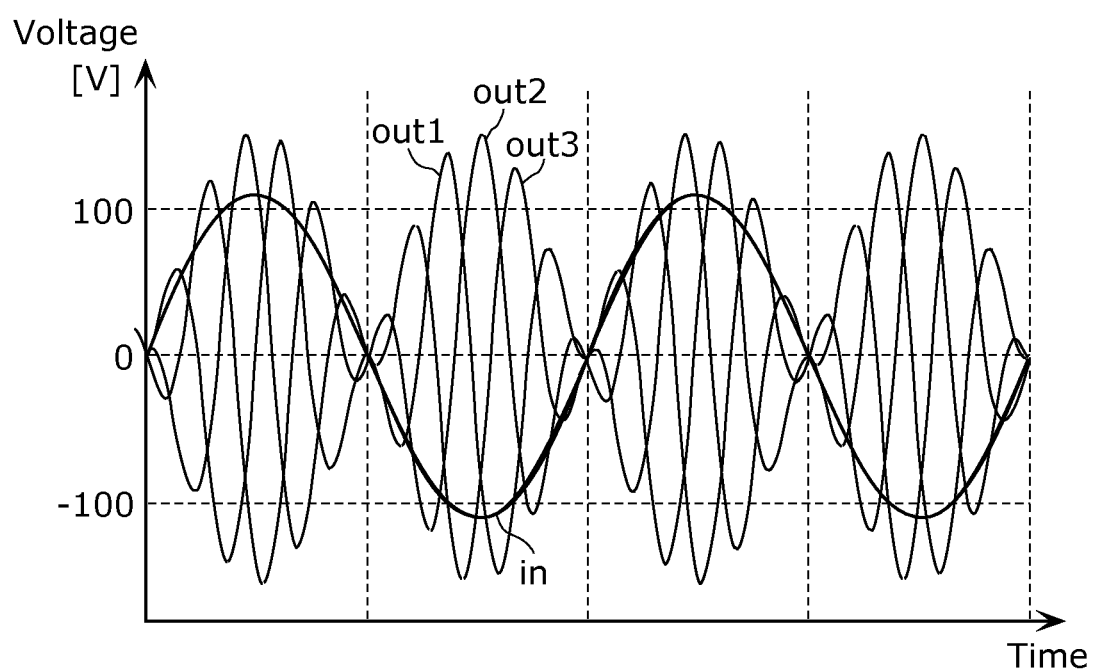
FIG. 6B is a graph illustrating an example of output voltages obtained by a single-phase to two-phase conversion performed by a power conversion apparatus according to Embodiment 1.

FIG. 6A is a graph illustrating an example of output voltages obtained by a single-phase to three-phase conversion performed by a typical matrix converter. FIG. 6B is a graph illustrating an example of output voltages obtained by a single-phase to two-phase conversion performed by the power conversion apparatus 1.

FIG. 6A and FIG. 6B illustrate output voltages obtained by converting input voltages having the same amplitude. However, for the convenience of comparison, FIG. 6B illustrates a calculation result obtained by performing equivalent three-phase conversion on the two-phase AC voltage output from the power conversion apparatus 1.

As a result, it was found that the amplitudes of the output voltages after the equivalent three-phase conversion by the power conversion apparatus 1 illustrated in FIG. 6B are $\sqrt{2}$ times larger than the amplitudes of the output voltages obtained by the single-phase to three-phase conversion performed by the typical matrix converter illustrated in FIG. 6A. This means that the two-phase induction motor driven by the output voltages of the power conversion apparatus 1 generates a $\sqrt{2}$-fold torque compared to the three-phase induction motor driven by the output voltages of the typical matrix converter.

Thus, if the torque and the volume of the motor (e.g., amount of windings) are in inverse proportion, the two-phase induction motor can generate the same torque with a volume which is $1/\sqrt{2}$ (approximately 71%) of that of the three-phase induction motor.

Introducing a vector control function to the motor system combining the power conversion apparatus 1 and the induction motor 5 described above produces a motor system with higher controllability. The following describes such a motor system.

Figure 7:
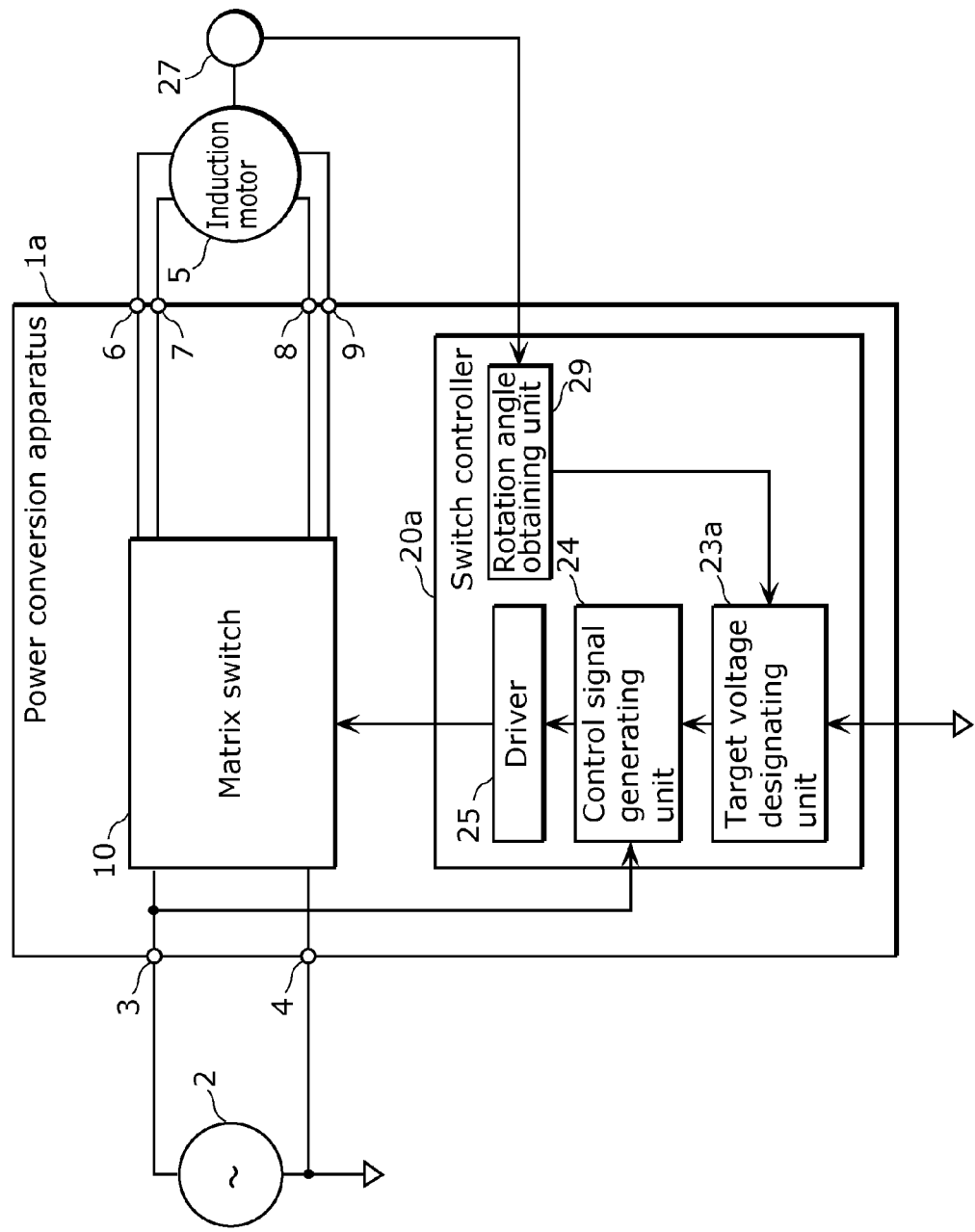
FIG. 7 is a functional block diagram illustrating another example of a motor system according to Embodiment 1.

FIG. 7 is a block diagram illustrating an example of a functional configuration of another motor system according to Embodiment 1.

In the motor system illustrated in FIG. 7, the induction motor 5 includes a rotation angle sensor 27 which outputs a rotation angle signal indicating consecutive rotation amounts of the rotor. A power conversion apparatus 1a is different from the above-described power conversion apparatus 1 in that the power conversion apparatus 1a includes a rotation angle obtaining unit 29 and a target voltage designating unit 23a different from the target voltage designating unit 23.

The rotation angle obtaining unit 29 obtains the rotation angle signal output from the rotation angle sensor 27. The target voltage designating unit 23a performs vector control to change at least one of the amplitude, frequency, and phase of the first target voltage ref1 and the second target voltage ref2 based on a difference between a rotation speed of the rotor determined from the obtained rotation angle signal and a speed command value.

The vector control is specifically maintaining of the excitation current component of the winding current at a constant level, and regulation of the torque current component of the winding current.

The power conversion apparatus 1a having the above configuration can control the rotation speed of the rotor by reducing the fluctuations in the rotation speed caused by load fluctuations.

Figure 8:
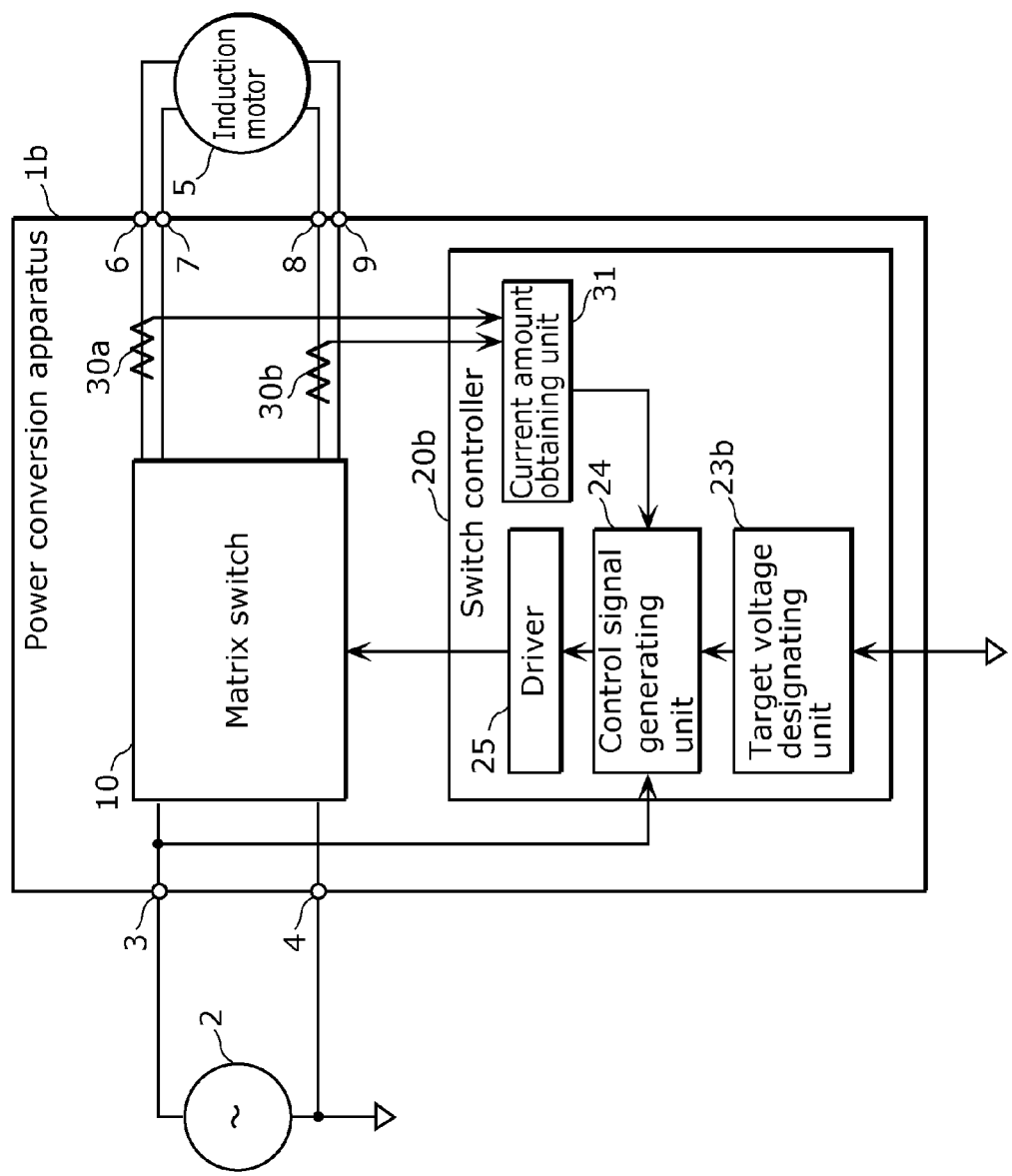
FIG. 8 is a functional block diagram illustrating another example of a motor system according to Embodiment 1.

FIG. 8 is a block diagram illustrating an example of a functional configuration of another motor system according to Embodiment 1.

The motor system illustrated in FIG. 8 includes a power conversion apparatus 1b which is different from the above-described power conversion apparatus 1 in that the power conversion apparatus 1b includes current sensors 30a and 30b, a current amount obtaining unit 31, and a target voltage designating unit 23b different from the target voltage designating unit 23.

The current sensor 30a is a sensor which outputs a current amount signal indicating consecutive current amounts flowing in the pair of the first output terminals 6 and 7, and the current sensor 30b is a sensor which outputs a current amount signal indicating consecutive current amounts flowing in the pair of the second output terminals 8 and 9. The current sensors 30a and 30b may be shunt resistors, for example. The current amount obtaining unit 31 obtains the signals output from the current sensors 30a and 30b.

The target voltage designating unit 23b performs speed sensorless vector control to estimate the rotation speed of the rotor using the obtained consecutive current amounts, and change at least one of the amplitude, frequency, and phase of the first target voltage ref1 and the second target voltage ref2 based on a difference between the estimated rotation speed and a speed command value.

With the speed sensorless vector control, the rotation speed of the rotor is estimated using a measured value of the winding current, and the torque is controlled using the estimated rotation speed. Since the rotation angle sensor likely to be subject to a constraint on its use environment is not used, the power conversion apparatus 1b is suitable for controlling a motor used in a severe environment (e.g., where large vibrations are present).

The power conversion apparatus 1b having the above configuration can control the rotation speed of the rotor by reducing the fluctuations in the rotation speed without using the rotation angle sensor.

The following describes that the same power conversion method as that described above can be applied even to a case where the amplitude, frequency, or phase of the first target voltage ref1 and the second target voltage ref2 is changed.

FIG. 9 is a timing chart illustrating the waveform of each signal in the case where the above-described power conversion method is performed using a first target voltage ref1 having a frequency three times greater than that of the first target voltage ref1 illustrated in FIG. 4, as an example of the case of changing the frequency. FIG. 9 is illustrated in the same manner as FIG. 4.

FIG. 9 illustrates that even when the frequency of the first target voltage ref1 is changed from FIG. 4, it is still possible to determine the time periods T1 to T8 based on the same conditions as in FIG. 4 and generate the gate signals G1a to G4b according to the first target voltage ref1 having a higher frequency. This holds true for the case of changing the amplitude or phase of the first target voltage ref1.

The above description has shown the configuration in which, as an example of the bidirectional switches in FIG. 2, unidirectional switches are connected in inverse parallel each of which is the reverse-blocking IGBT M1 or M2 or is formed as a circuit in which the IGBT M3 and the diode D1 are connected in series or a circuit in which the IGBT M4 and the diode D2 are connected in series. However, each bidirectional switch may be formed using a bidirectional Hetero Field Effect Transistor (HFET) or Gate Injection Transistor (GIT) M5 made of a gallium nitride (GaN)-based semiconductor. In the case of using the HFET or GIT made of a GaN-based semiconductor, a bidirectional switch can be formed by providing two gates (G3a and G3b) between the source and drain.

Such a configuration reduces the circuit size because a single bidirectional switch can be formed from a single element. Additionally, the two gates being adjacent to each other in the element allow the two gate signal lines to be formed in substantially the same length, thereby reducing delay between the gate signals. As a result, the control over the dead time and the commutation circuit increases, thereby preventing misoperation.

Variations of Embodiment 1

In the above embodiment, the state of each of the bidirectional switches 11 to 14 is changed to either a bidirectional conducting state or a non-conducting state, using the gate signals having the same waveform for the two unidirectional switches forming the bidirectional switch. Thus, the levels of two gate signals are constantly changed at the same time for each bidirectional switch, thereby increasing the total number of times the levels of the gate signals are changed. This results in relatively large power consumption for the switching operation (including the gate signal generation, the charge and discharge of the signal lines, and the charge and discharge of the gate capacitance of the unidirectional switches). Such an increase in the power consumption is noticeable especially in the non-inverting voltage supply performed through the PWM control and in the inverting voltage supply performed through the PWM control.

To overcome this, the power required for driving the gate signals can be reduced by fixing the level of the gate signal corresponding to one of the unidirectional switches included in one bidirectional switch. The following describes two variations for generating such gate signals.

In Variation 1, the gate signals G1a to G8b are generated to change between the conducting state and the non-conducting state of only one of the two unidirectional switches included in one bidirectional switch, to which the input voltage in is applied in the forward direction, and to constantly place, in the conducting state, the other of the two unidirectional switches to which the input voltage in is applied in the opposite direction.

FIG. 10 is a timing chart illustrating an example of the waveforms of the gate signals G1a to G4b generated based on the above idea. FIG. 10 is illustrated in the same manner as FIG. 4, and the waveform of each gate signal is distinguishably shown for the corresponding unidirectional switch. Specifically, the waveform of each gate signal (having a reference sign with "a" at the end) of the unidirectional switch illustrated on the left (in the drawing) in the corresponding bidirectional switch is shown with a solid line, whereas the waveform of each gate signal (having a reference sign with "b" at the end) of the unidirectional switch illustrated on the right (in the drawing) in the corresponding bidirectional switch is shown with a dotted line.

FIG. 11A to FIG. 11H are circuit diagrams each illustrating: the conduction states of SW11 to SW14 that are set according to the gate signals G1a to G4b illustrated in FIG. 10 in the time periods T1 to T8; and the current path of the first axis winding 51 determined accordingly. FIG. 11A to FIG. 11H are illustrated in the same manner as FIG. 5A to FIG. 5H.

The gate signals G1a to G4b in FIG. 10 are different from the gate signals G1a to G4b in FIG. 4 in the following points:

Specifically, the gate signals G1a, G2b, G1a, and G4b are fixed at the ON level to constantly place, in the conducting state, the unidirectional switches to which the input voltage in is applied in the opposite direction in the time periods T1 to T4, namely, the left unidirectional switch of SW11, the right unidirectional switch of SW12, the left unidirectional switch of SW13, and the right unidirectional switch of SW14.

Furthermore, the gate signals G1b, G2a, G3b, and G4a are fixed at the ON level to constantly place, in the conducting state, the unidirectional switches to which the input voltage in is applied in the opposite direction in the time periods T5 to T8, namely, the right unidirectional switch of SW11, the left unidirectional switch of SW12, the right unidirectional switch of SW13, and the left unidirectional switch of SW14.

Moreover, the gate signals G1b, G3b, G1a, and G3a are fixed at the OFF level to constantly place, in the non-conducting state, the unidirectional switches which are in a direction opposite to the regenerative current from the first axis winding 51 in the time periods T2, T3, T6, and T7, namely, the right unidirectional switch of SW11 in the time period T2, the right unidirectional switch of SW13 in the time period T3, the left unidirectional switch of SW11 in the time period T6, and the left unidirectional switch of SW13 in the time period T7.

With the gate signals G1a to G4b in FIG. 10, the same switching operations as in the case of the gate signals G1a to G4b in FIG. 4 are performed as illustrated in FIG. 11A to FIG. 11H. The gate signals the levels of which change for the PWM control are only the gate signal G2a in the time period T2, the gate signal G4a in the time period T3, the gate signal G2b in the time period T6, and the gate signal G4b in the time period T7. This significantly reduces the total number of times the levels of the gate signals are changed, and thus decreases the amount of power required for driving the gate signals.

In general, with a power conversion apparatus which drives an inductive load, after the polarity of the power supply voltage is inverted, the regenerative current from the load sometimes continues to flow in the direction prior to the inversion of the polarity of the power supply voltage, especially when the inductance of the load is large, for example.

Figure 11A:
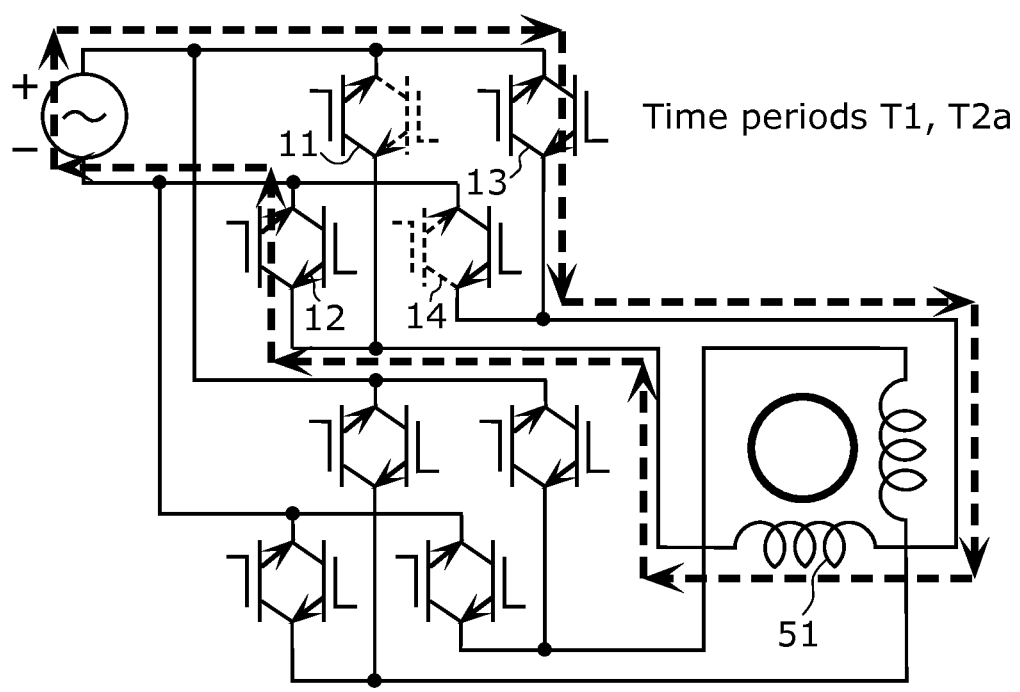
FIG. 11A is a circuit diagram illustrating an example of the states of switches and a current path according to Variation 1 of Embodiment 1.
Figure 11B:
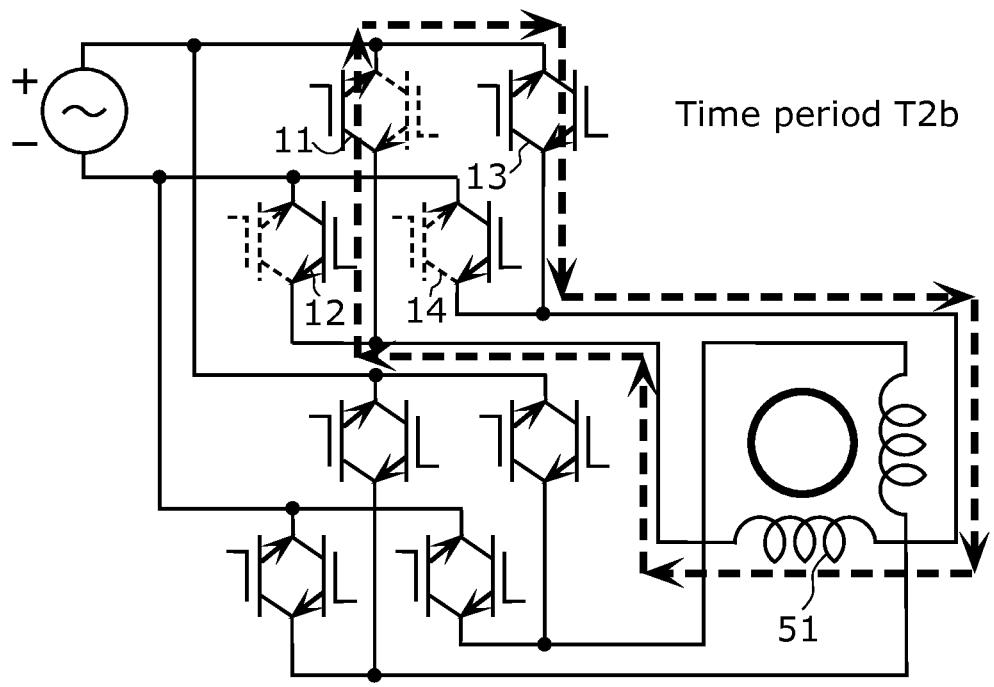
FIG. 11B is a circuit diagram illustrating an example of the states of switches and a current path according to Variation 1 of Embodiment 1.
Figure 11C:
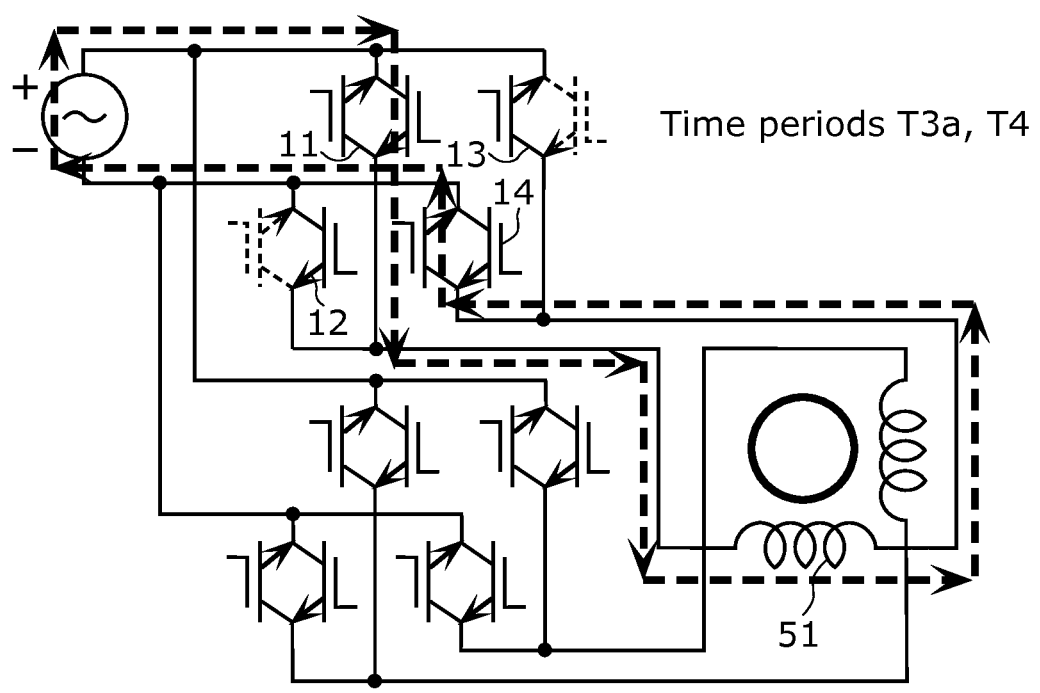
FIG. 11C is a circuit diagram illustrating an example of the states of switches and a current path according to Variation 1 of Embodiment 1.
Figure 11D:
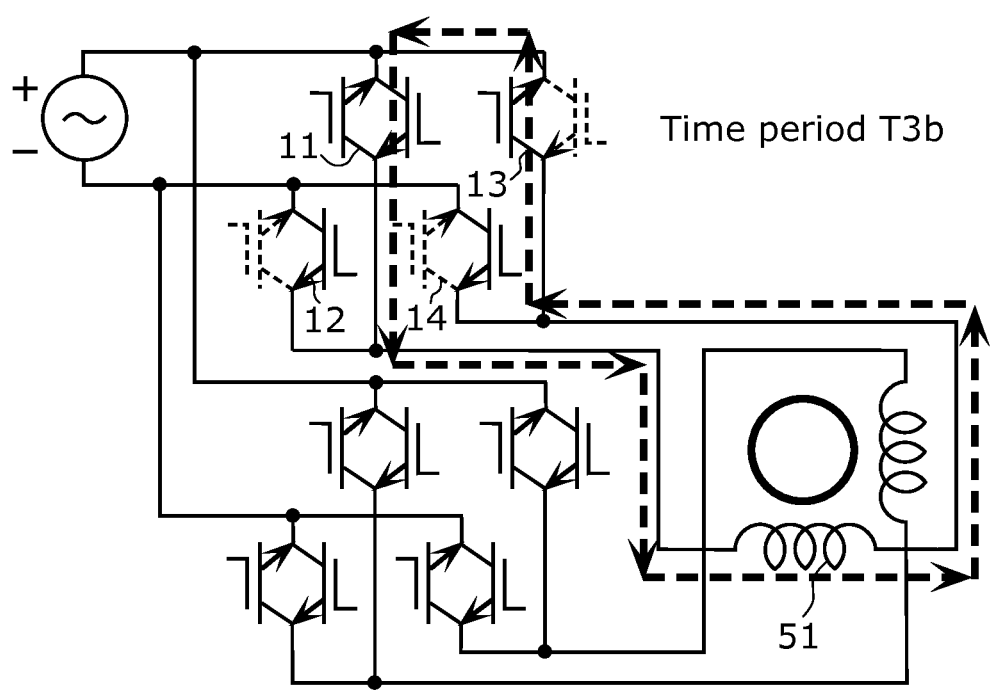
FIG. 11D is a circuit diagram illustrating an example of the states of switches and a current path according to Variation 1 of Embodiment 1.
Figure 11E:
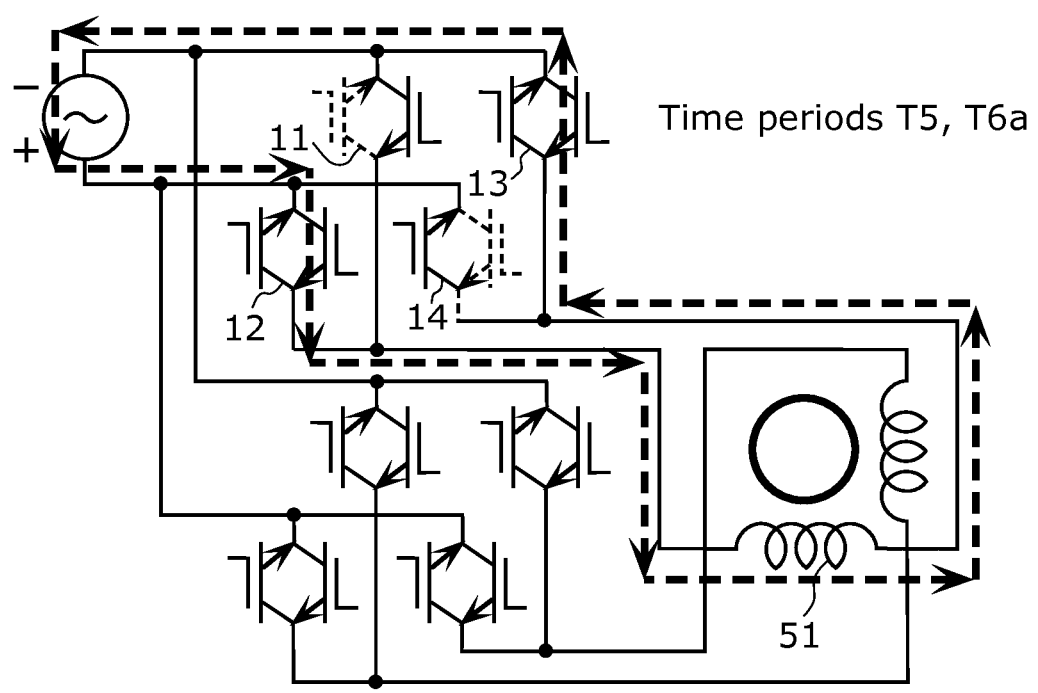
FIG. 11E is a circuit diagram illustrating an example of the states of switches and a current path according to Variation 1 of Embodiment 1.
Figure 11F:
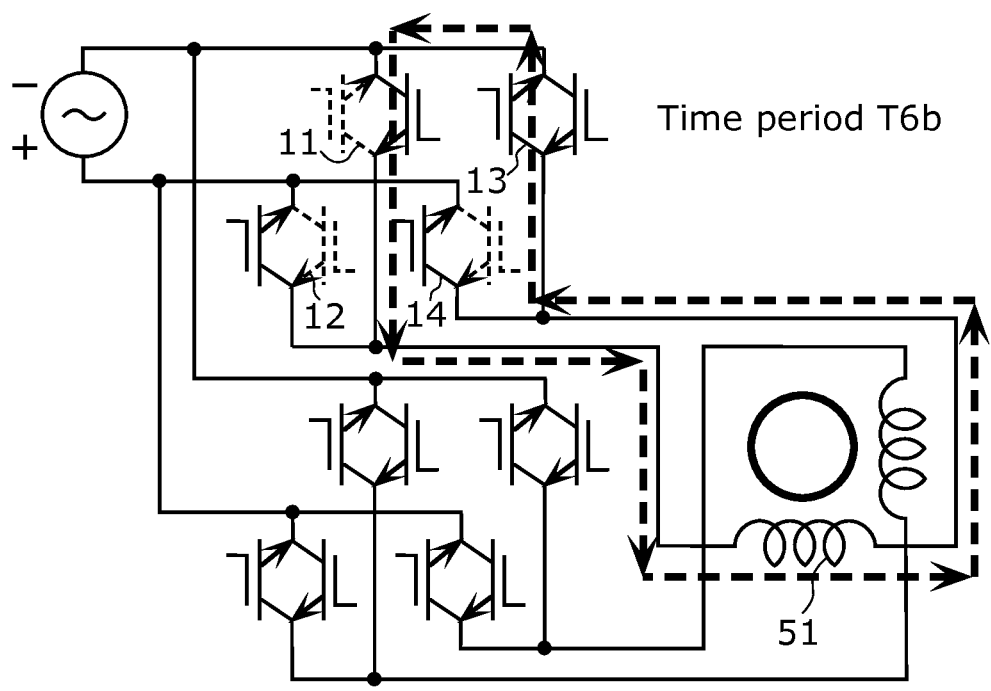
FIG. 11F is a circuit diagram illustrating an example of the states of switches and a current path according to Variation 1 of Embodiment 1.
Figure 11G:
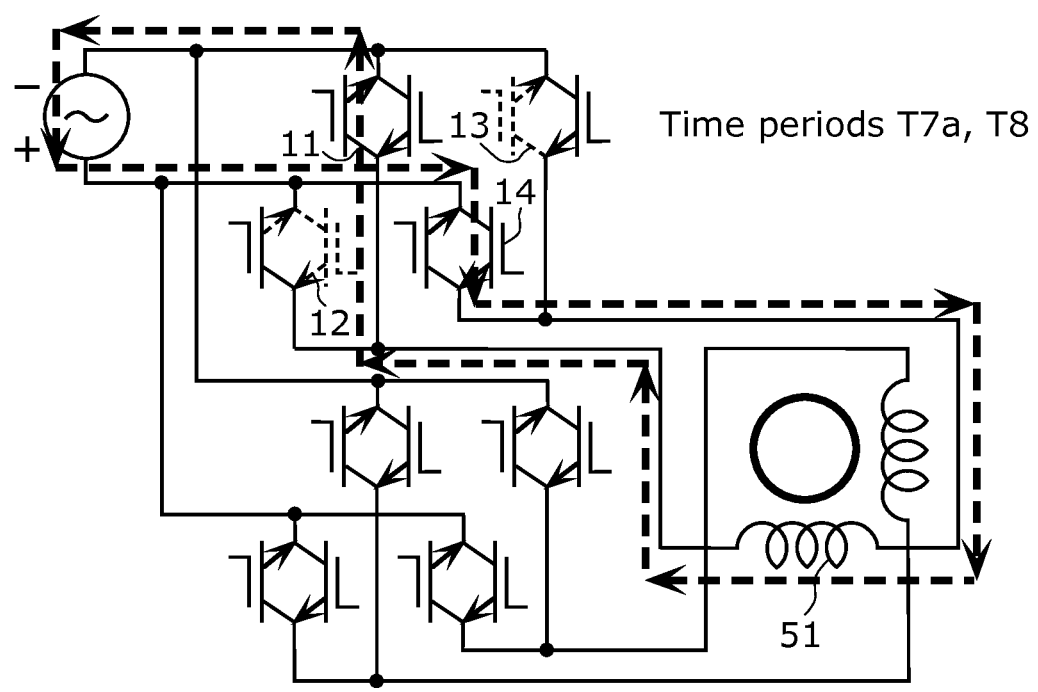
FIG. 11G is a circuit diagram illustrating an example of the states of switches and a current path according to Variation 1 of Embodiment 1.
Figure 11H:
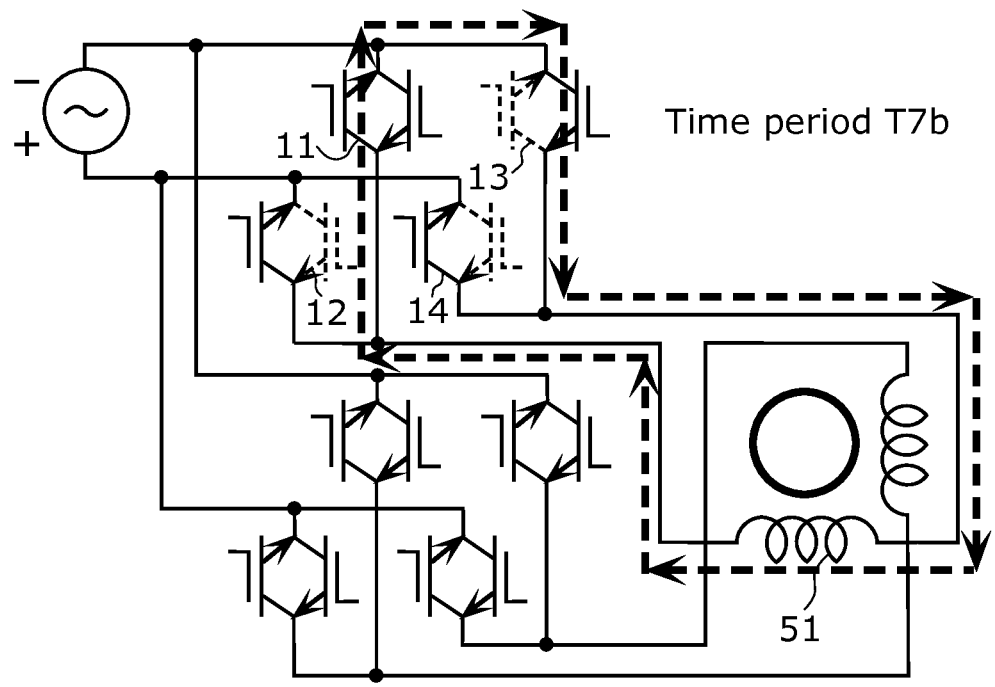
FIG. 11H is a circuit diagram illustrating an example of the states of switches and a current path according to Variation 1 of Embodiment 1.
Figure 13A:
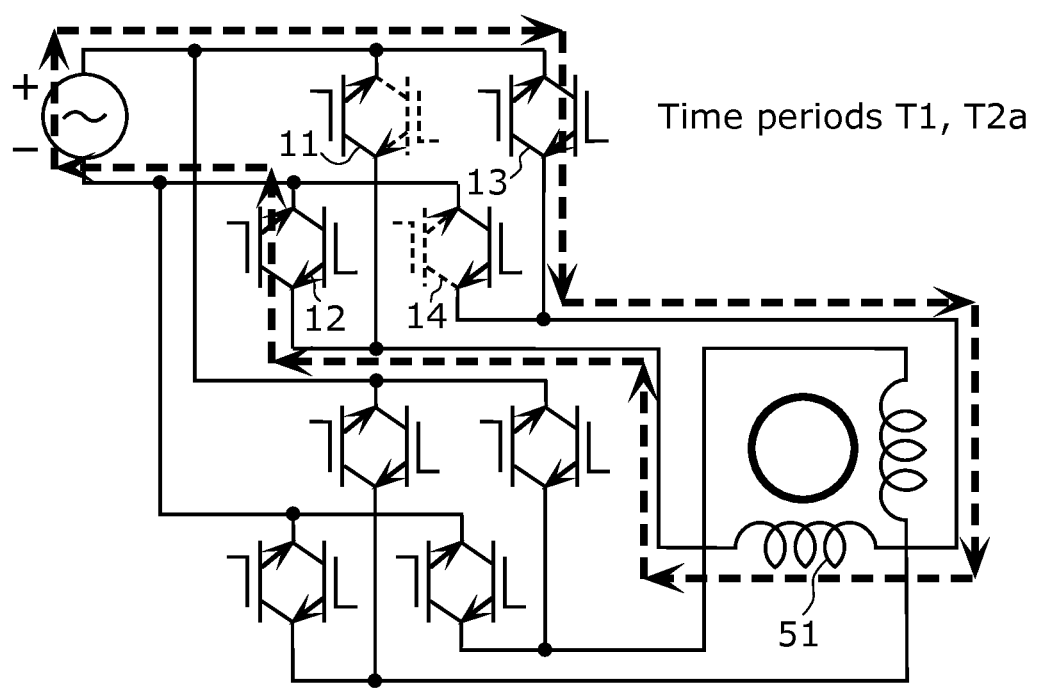
FIG. 13A is a circuit diagram illustrating an example of the states of switches and a current path according to Variation 2 of Embodiment 1.
Figure 13B:
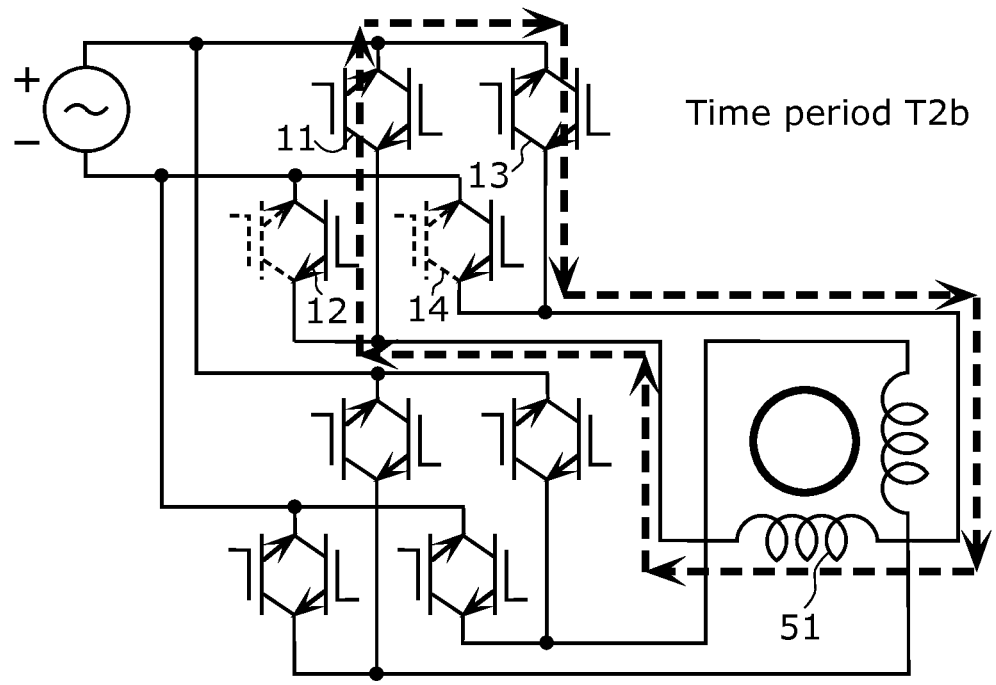
FIG. 13B is a circuit diagram illustrating an example of the states of switches and a current path according to Variation 2 of Embodiment 1.
Figure 13C:
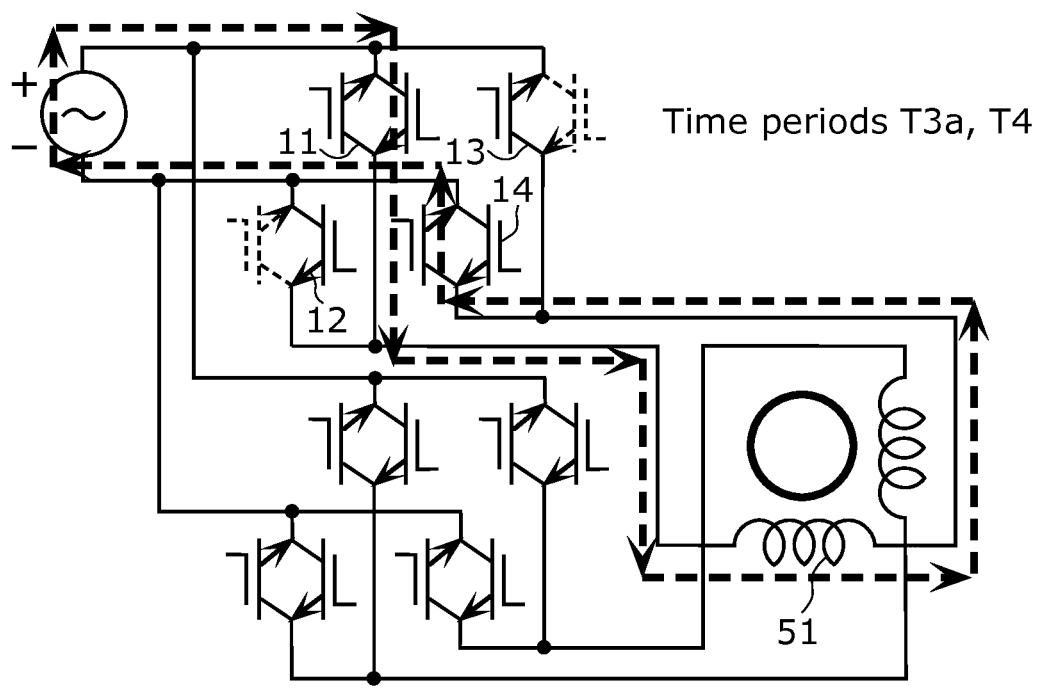
FIG. 13C is a circuit diagram illustrating an example of the states of switches and a current path according to Variation 2 of Embodiment 1.
Figure 13D:
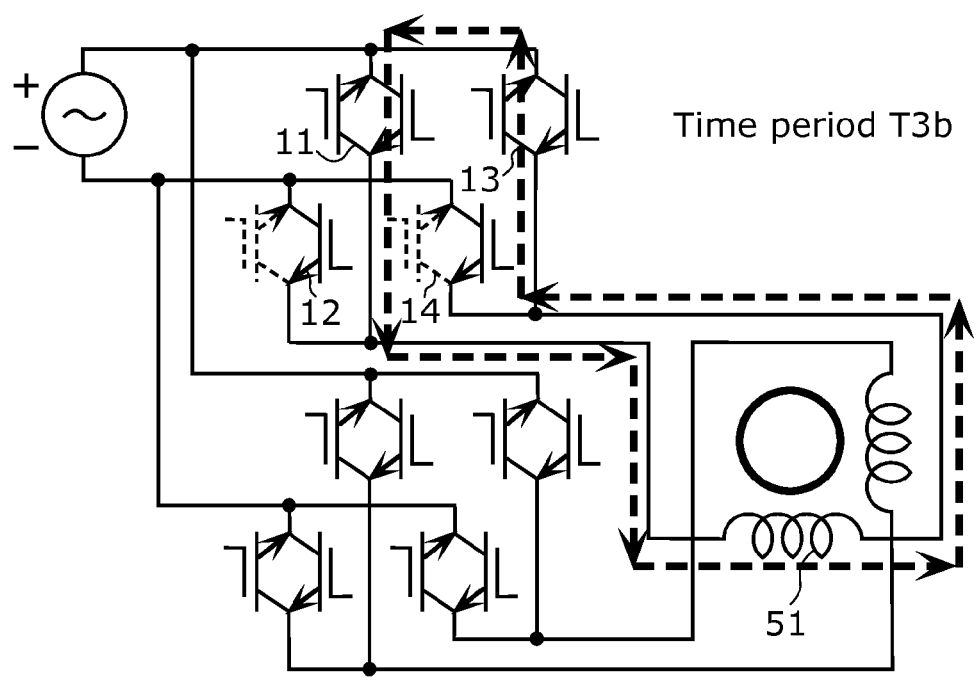
FIG. 13D is a circuit diagram illustrating an example of the states of switches and a current path according to Variation 2 of Embodiment 1.
Figure 13E:
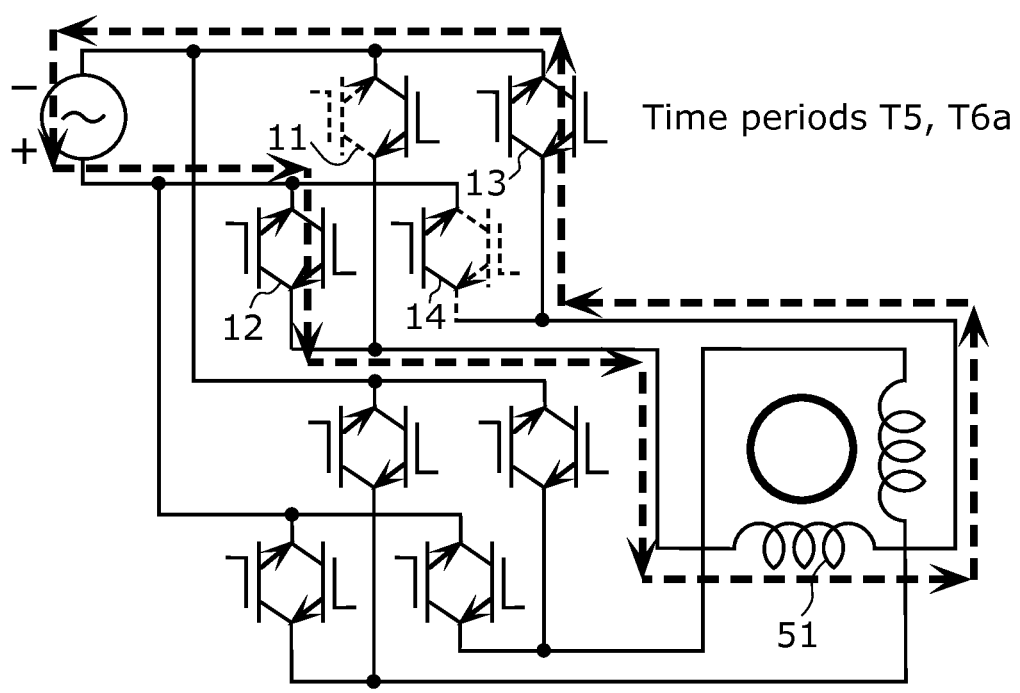
FIG. 13E is a circuit diagram illustrating an example of the states of switches and a current path according to Variation 2 of Embodiment 1.
Figure 13F:
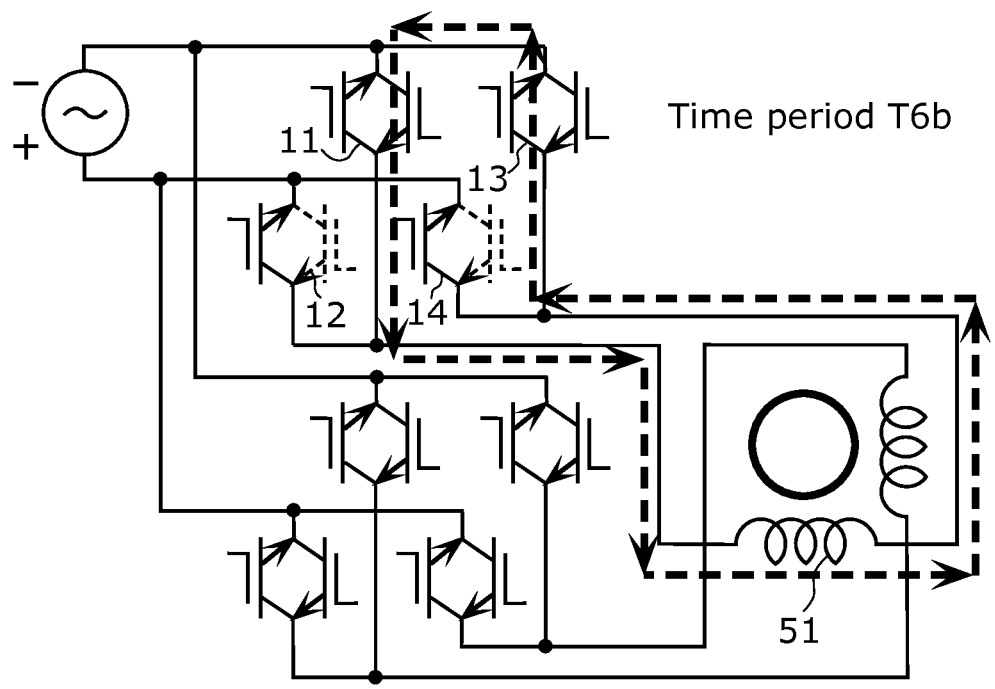
FIG. 13F is a circuit diagram illustrating an example of the states of switches and a current path according to Variation 2 of Embodiment 1.
Figure 13G:
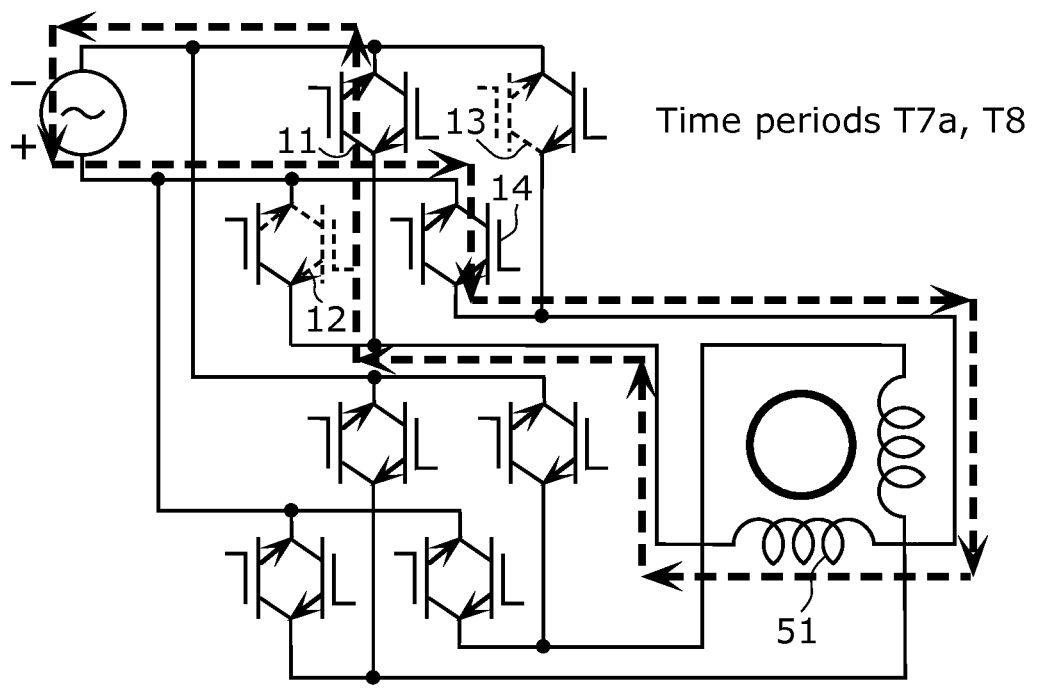
FIG. 13G is a circuit diagram illustrating an example of the states of switches and a current path according to Variation 2 of Embodiment 1.
Figure 13H:
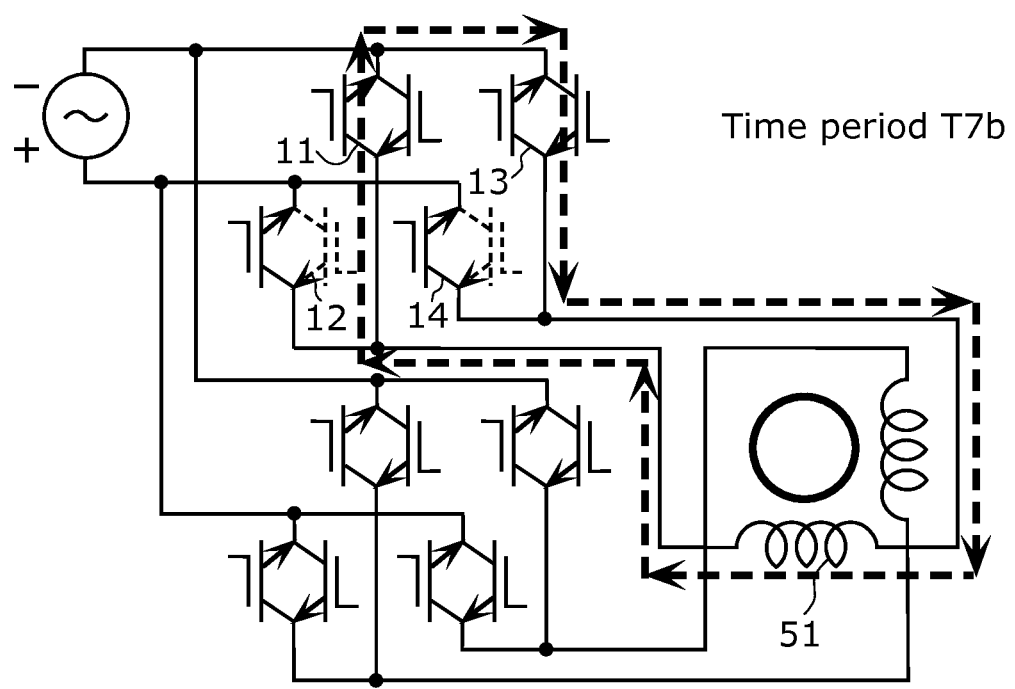
FIG. 13H is a circuit diagram illustrating an example of the states of switches and a current path according to Variation 2 of Embodiment 1.

When this is considered in relation to the above-described motor system, it means that there are cases where the regenerative current from the first axis winding 51 illustrated in FIG. 11A and FIG. 11B flows in a direction opposite to the illustrated direction, for example. Such opposite flow occurs when a large magnetic energy accumulated in the preceding period is remaining in the first axis winding 51.

When the regenerative current from the first axis winding 51 flows in the direction opposite to the illustrated direction, the regenerative current from the first axis winding 51 circulates to the single-phase AC power supply 2 in the case of FIG. 11A, whereas in the case of FIG. 11B, there is no path along which the regenerative current can circulate, and thus an extremely large voltage is applied to SW11 and a large power loss occurs.

To solve such a problem, Variation 2 provides a path of the regenerative current from the load by placing plural bidirectional switches in the bidirectional conducting state.

FIG. 12 is a timing chart illustrating an example of the waveforms of the gate signals G1a to G4b generated based on the above idea. FIG. 12 is illustrated in the same manner as FIG. 10.

The gate signals G1a to G4b in FIG. 12 are different from the gate signals G1a to G4b in FIG. 10 in that the gate signals G1b, G3b, G1a, and G3a are set to the ON level in the time periods T2b, T3b, T6b, and T7b to form a path of the regenerative current from the first axis winding 51 via SW11 and SW13 placed in the bidirectional conducting state.

With the gate signals G1a to G4b in FIG. 12, the same switching operations as in the case of the gate signals G1a to G4b in FIG. 4 are performed for the winding current flowing in the illustrated direction, as illustrated in FIG. 13A to FIG. 13H. In addition, in the time periods T2b, T3b, T6b, and T7b, the path of the regenerative current from the first axis winding 51 is formed via SW11 and SW13 placed in the bidirectional conducting state, and thus it is possible to pass the regenerative current in the direction opposite to the illustrated direction.

This results in an increase in the total number of times the levels of the gate signals are changed because not only the levels of the gate signals G2a, G4a, G2b, and G4b but also the levels of the gate signals G1b, G3b, G1a, and G3a are changed in the PWM control. However, it becomes possible to allow the regenerative current from the first axis winding 51 to circulate within the matrix switch 10 irrespective of the direction of the regenerative current, and thus power regeneration can be appropriately performed.

Embodiment 2

Embodiment 2 describes some changes from Embodiment 1 described above.

First, the following describes a power conversion method for making the output voltage zero (suspending the voltage supply) during a time period in which the absolute value of the input voltage is insufficient.

Figure 14:
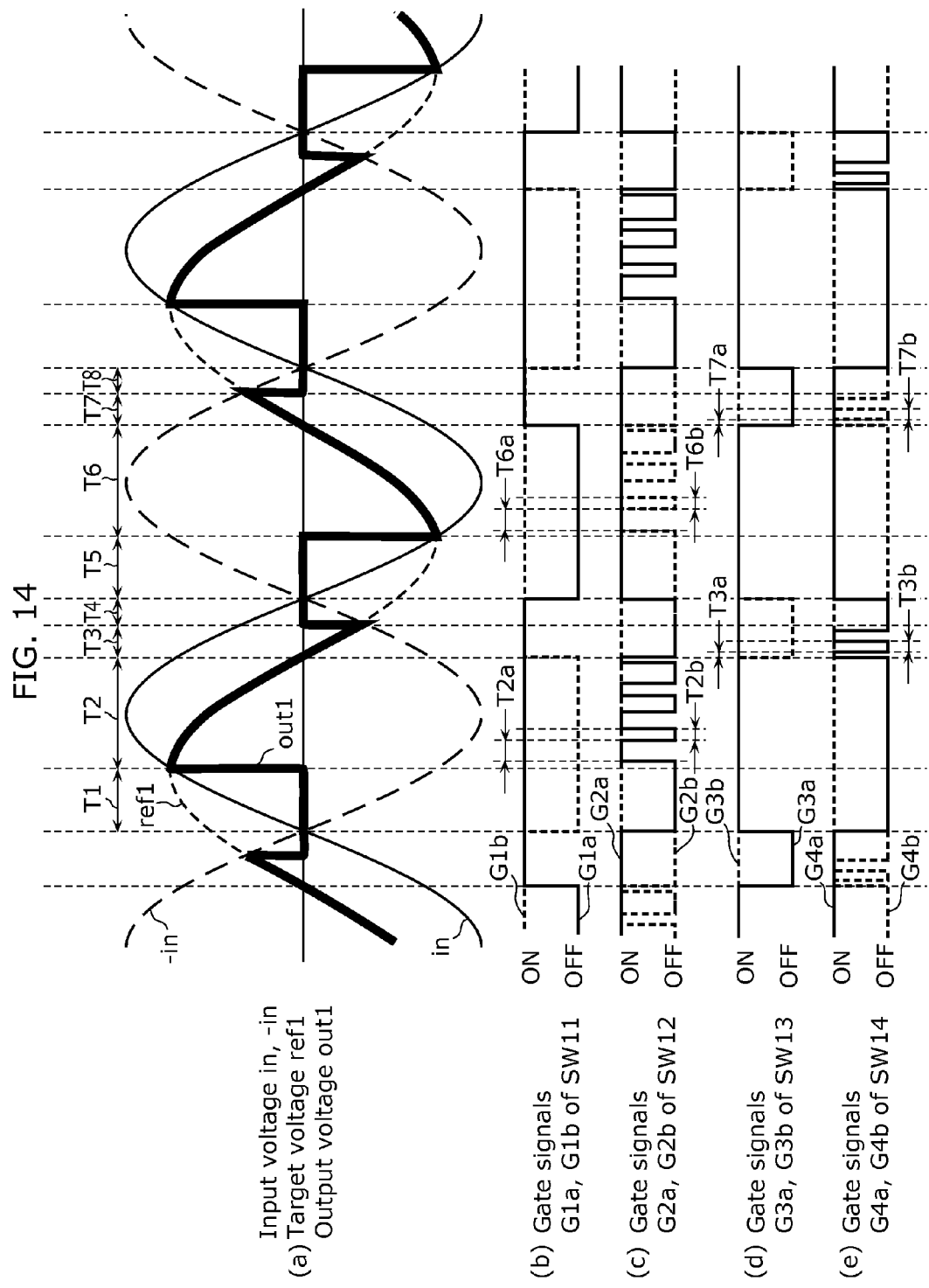
FIG. 14 is a timing chart illustrating an example of gate signals according to Embodiment 2.
Figure 17A:
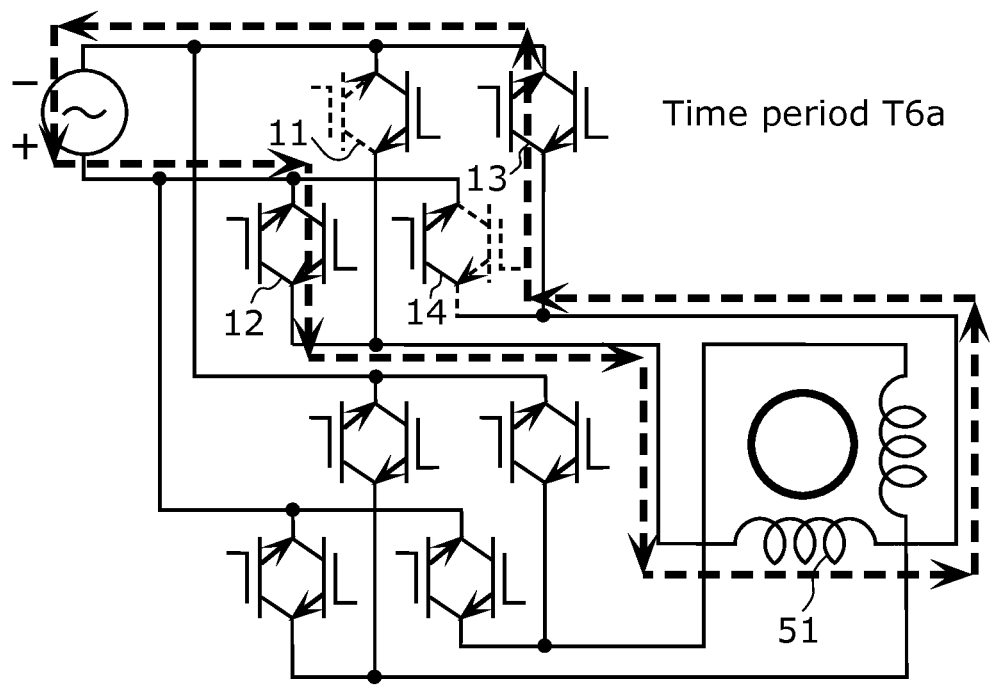
FIG. 17A is a circuit diagram illustrating an example of the states of switches and a current path according to Embodiment 2.
Figure 17B:
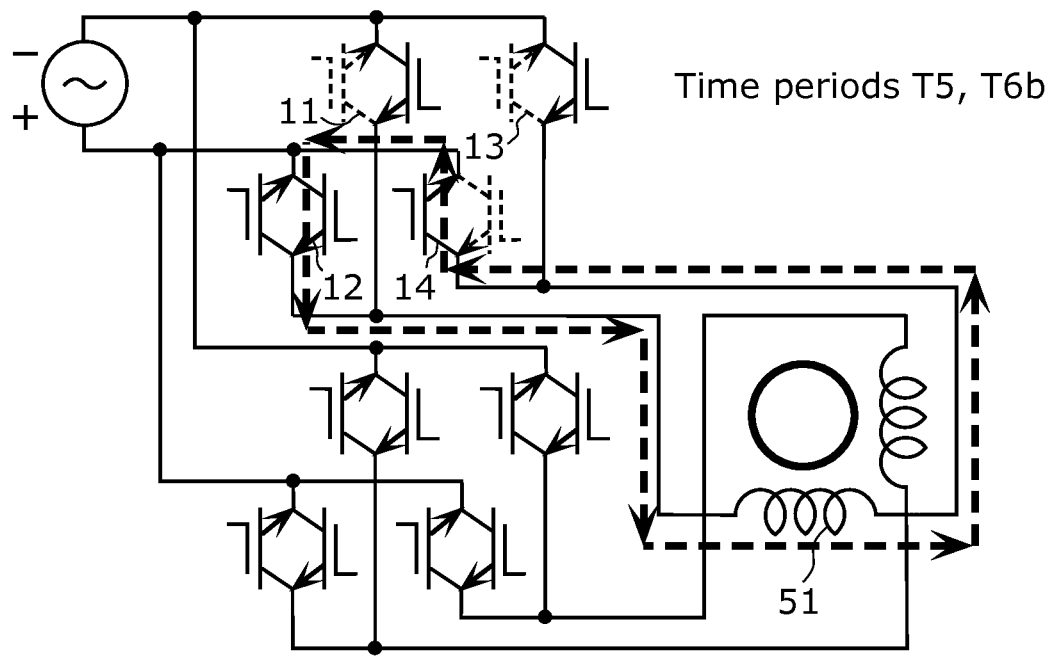
FIG. 17B is a circuit diagram illustrating an example of the states of switches and a current path according to Embodiment 2.
Figure 17C:
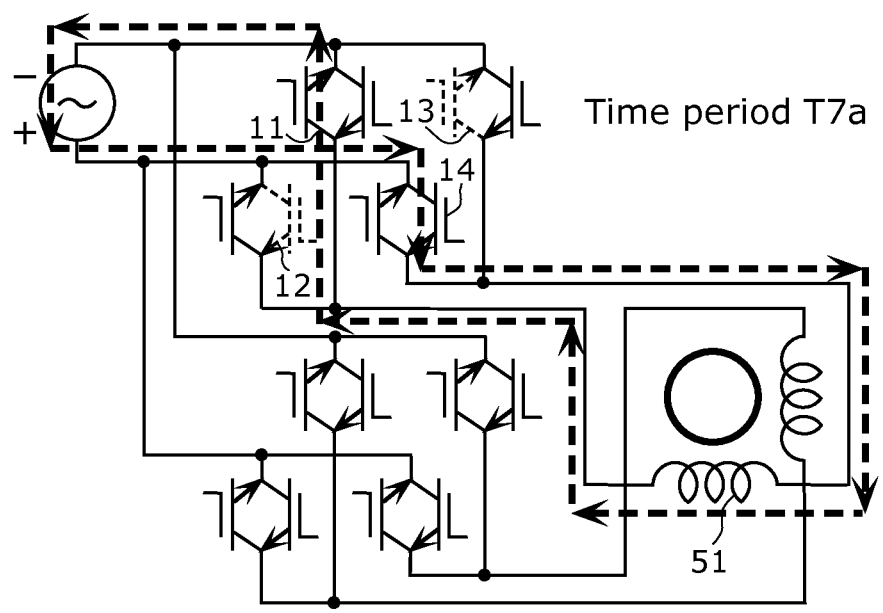
FIG. 17C is a circuit diagram illustrating an example of the states of switches and a current path according to Embodiment 2.
Figure 17D:
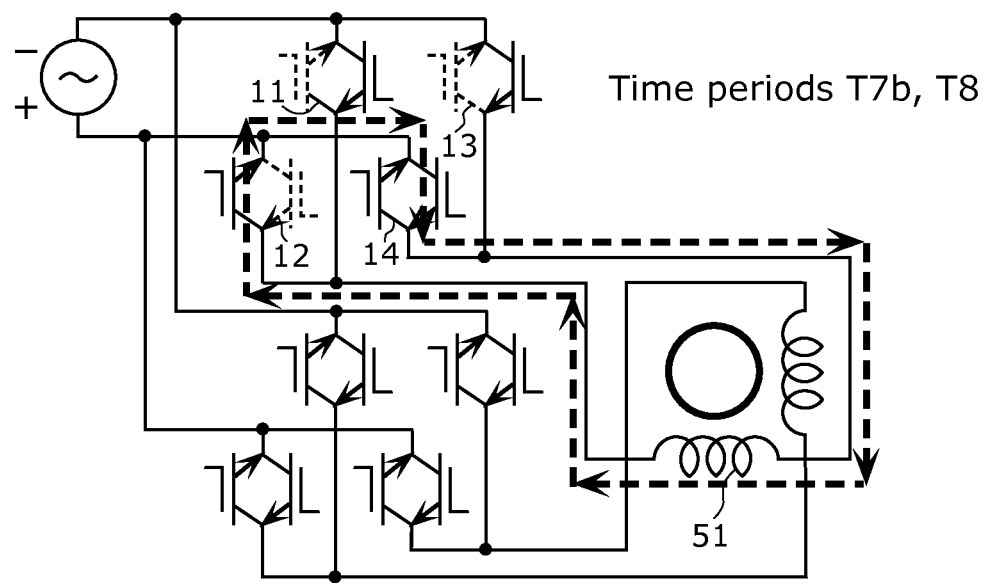
FIG. 17D is a circuit diagram illustrating an example of the states of switches and a current path according to Embodiment 2.
Figure 19A:
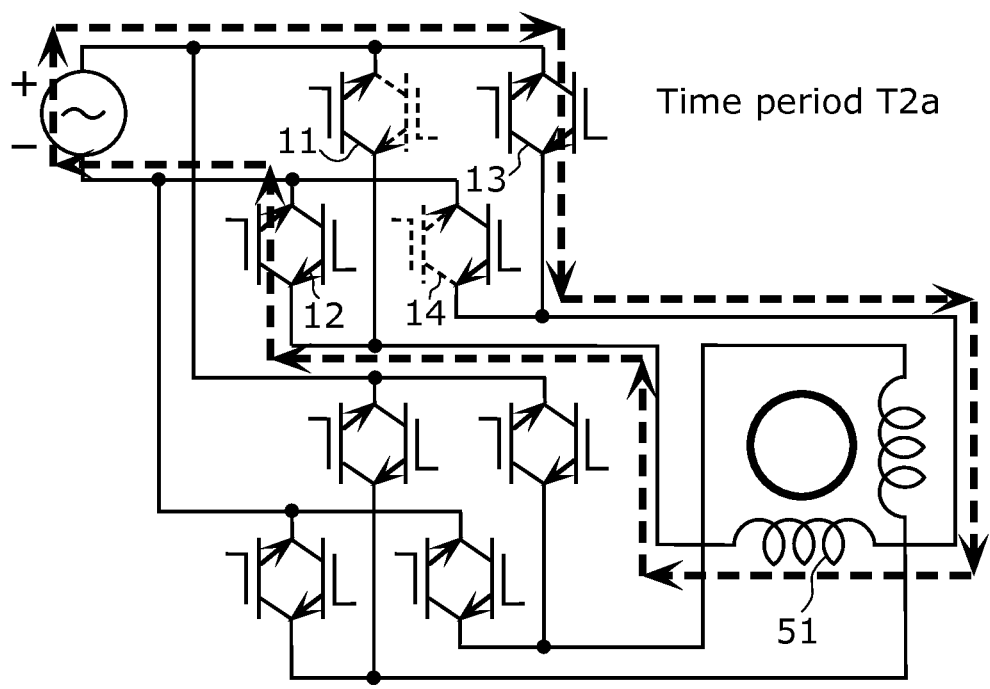
FIG. 19A is a circuit diagram illustrating an example of the states of switches and a current path according to Embodiment 2.
Figure 19B:
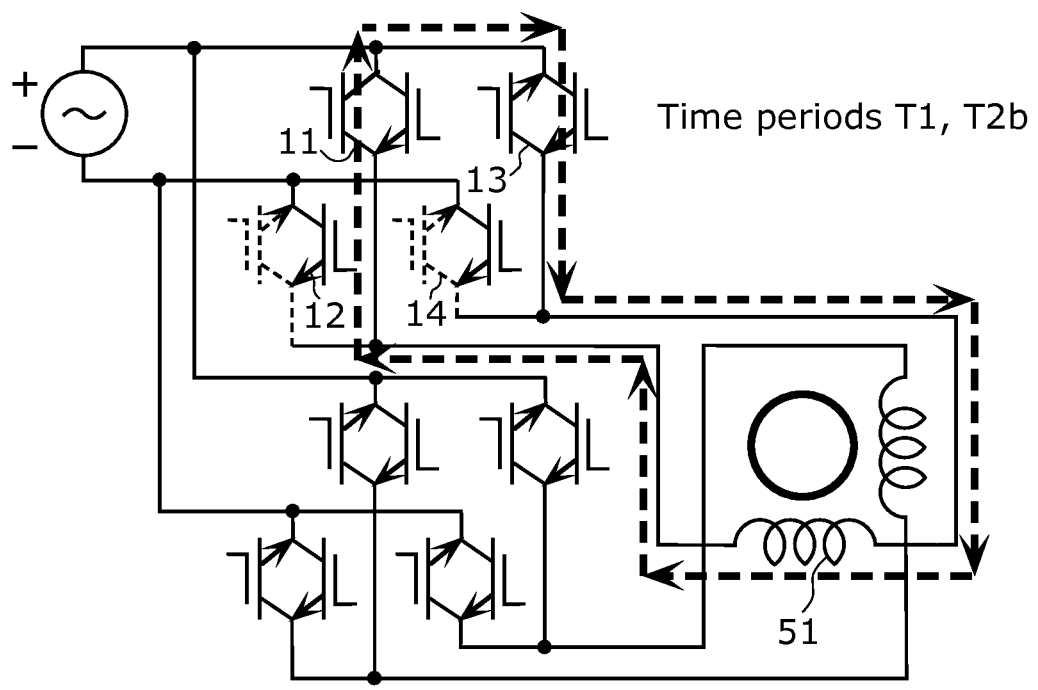
FIG. 19B is a circuit diagram illustrating an example of the states of switches and a current path according to Embodiment 2.
Figure 19C:
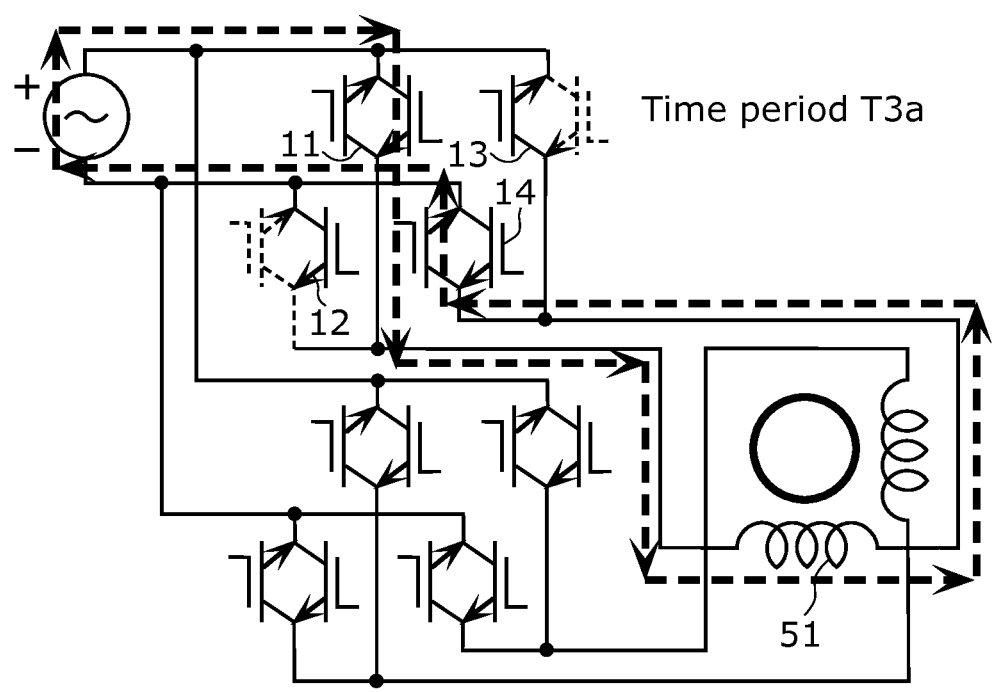
FIG. 19C is a circuit diagram illustrating an example of the states of switches and a current path according to Embodiment 2.
Figure 19D:
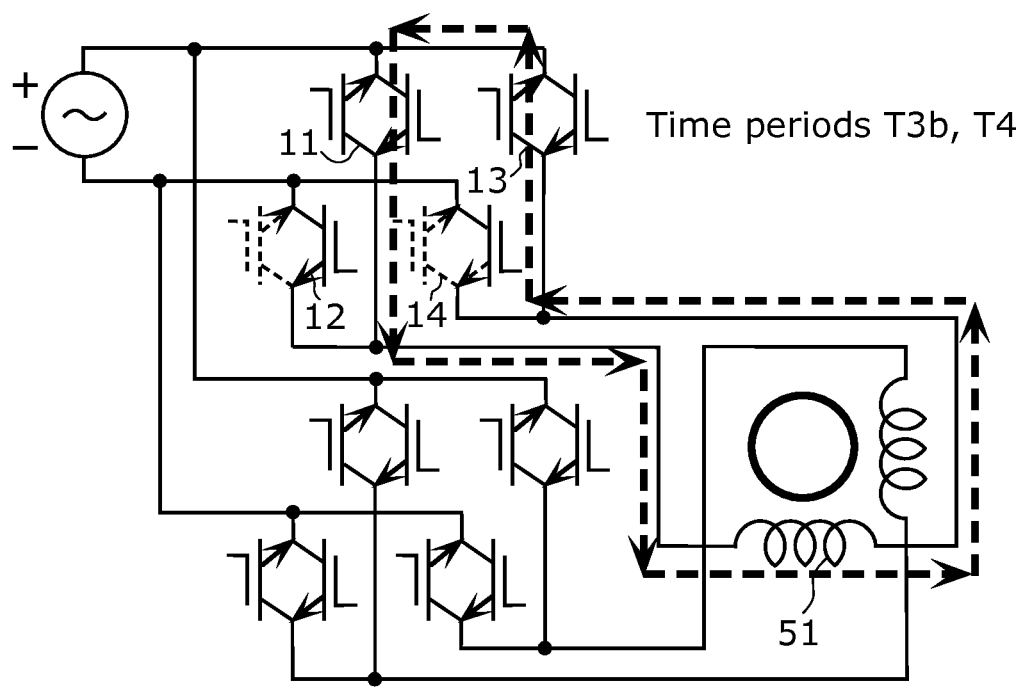
FIG. 19D is a circuit diagram illustrating an example of the states of switches and a current path according to Embodiment 2.
Figure 19E:
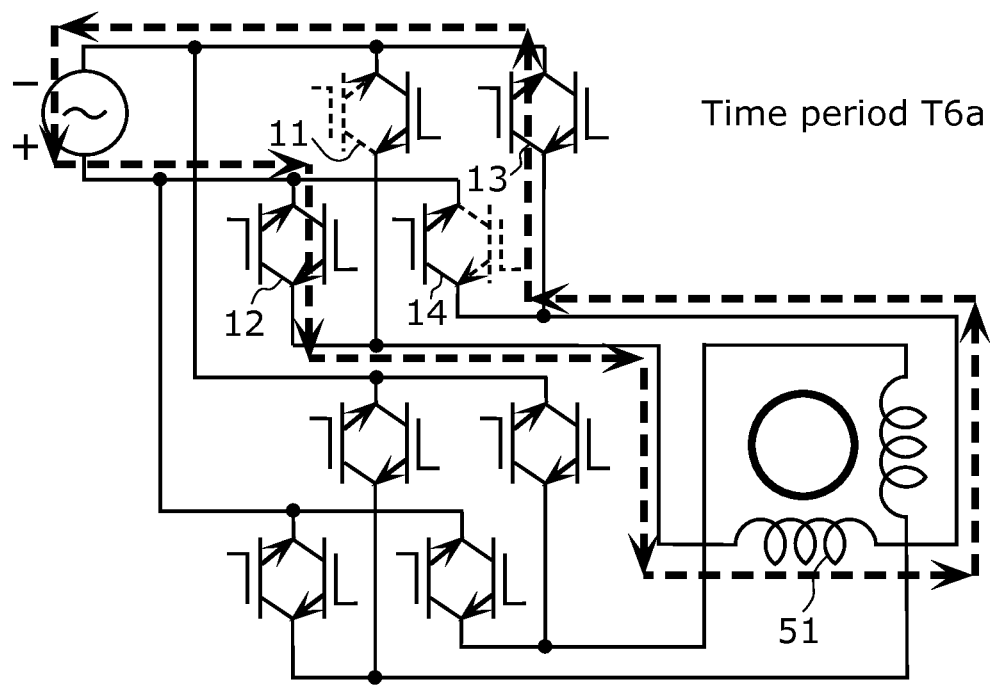
FIG. 19E is a circuit diagram illustrating an example of the states of switches and a current path according to Embodiment 2.
Figure 19F:
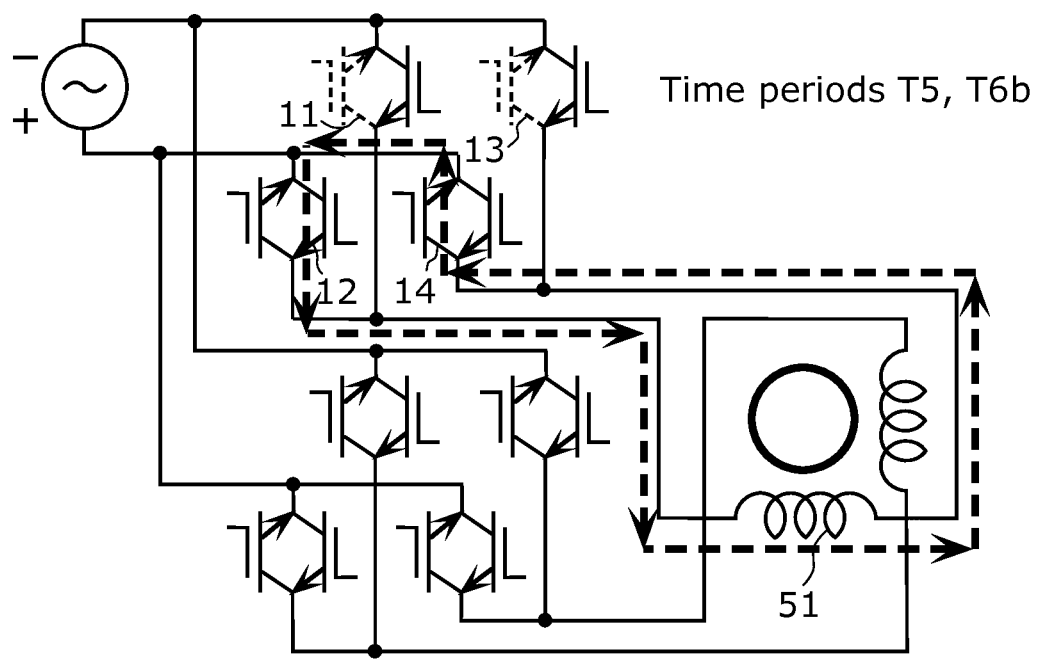
FIG. 19F is a circuit diagram illustrating an example of the states of switches and a current path according to Embodiment 2.
Figure 19G:
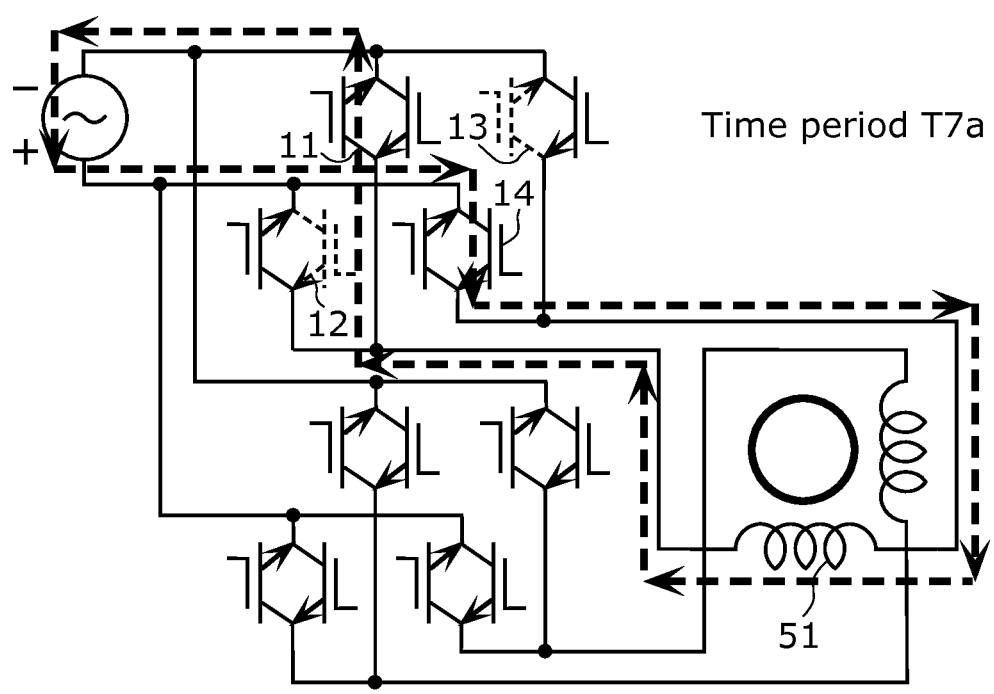
FIG. 19G is a circuit diagram illustrating an example of the states of switches and a current path according to Embodiment 2.
Figure 19H:
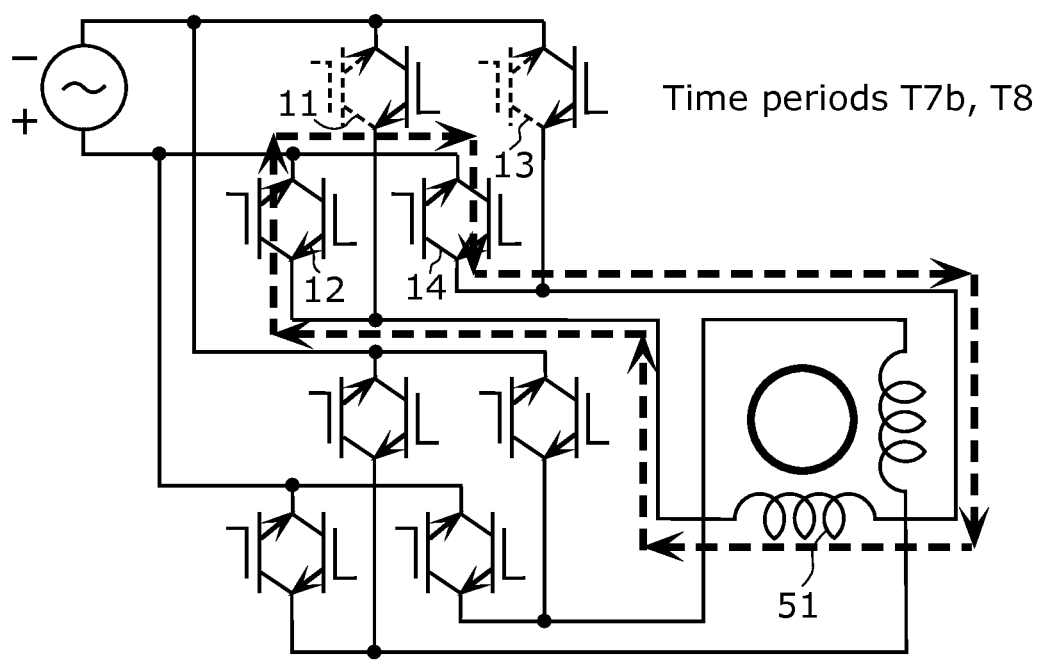
FIG. 19H is a circuit diagram illustrating an example of the states of switches and a current path according to Embodiment 2.

FIG. 14 and FIG. 15 are timing charts each illustrating an example of the waveforms of the gate signals G1a to G4b generated by the control signal generating unit 24 for performing such a power conversion method. The gate signals G1a to G4b in FIG. 14 and FIG. 15 are partly different from the gate signals G1a to G4b in FIG. 10 and FIG. 12, respectively.

The gate signals G1a to G4b in FIG. 14 are different from the gate signals G1a to G4b in FIG. 10 only in that the gate signal G2a in the time period T1, the gate signal G4a in the time period T4, the gate signal G2b in the time period T5, and the gate signal G4b in the time period T8 are fixed at the OFF level to suspend the voltage supply during a time period in which the instantaneous absolute value of the input voltage in is less than or equal to the instantaneous absolute value of the first target voltage ref1. In other words, in the time periods T1, T4, T5, and T8, the gate signals G1a to G4b in FIG. 14 are set at the same levels as those in the time periods T2b, T3b, T1b, and T7b, respectively, each of which is a regeneration period of the PWM cycle. As a result, the voltage supply is suspended and the first-phase output voltage out1 becomes zero.

With the gate signals G1a to G4b in FIG. 14, in the time periods T1, T4, T5, and T8, the conduction states of SW11 to SW14 and the current path of the first axis winding 51 are set as illustrated in FIG. 11B, FIG. 11D, FIG. 11F, and FIG. 11H, respectively, and power regeneration is performed allowing the regenerative current from the first axis winding 51 to circulate within the matrix switch 10.

The gate signals G1a to G4b in FIG. 15 are different from the gate signals G1a to G4b in FIG. 12 only in that the gate signals G2a, G4a, G2b, and G4b are fixed at the OFF level and the gate signals G1b, G3b, G1a, and G3a are fixed at the ON level in the time periods T1, T4, T5, and T8 in which the instantaneous absolute value of the input voltage in is less than or equal to the instantaneous absolute value of the first target voltage ref1. In other words, in the time periods T1, T4, T5, and T8, the gate signals G1a to G4b in FIG. 15 are set at the same levels as those in the time periods T2b, T3b, T6b, and T7b, respectively, each of which is a regeneration period of the PWM cycle. As a result, the voltage supply is suspended and the first-phase output voltage out1 becomes zero.

With the gate signals G1a to G4b in FIG. 15, in the time periods T1, T4, T5, and T8, the conduction states of SW11 to SW14 and the current path of the first axis winding 51 are set as illustrated in FIG. 13B, FIG. 13D, FIG. 13F, and FIG. 13H, respectively, and power regeneration is performed allowing the regenerative current from the first axis winding 51 to circulate within the matrix switch 10.

According to the power conversion method described above, the voltage supply is suspended by making the output voltage zero during the time period in which the absolute value of the input voltage is insufficient. Thus, the fluctuations of the input voltage can be reduced without placing an excessive load on the power supply (including the resistance of a wire, for example) that supplies the input voltage. Furthermore, since there is no longer a need to accurately estimate the time at which the input voltage becomes 0 V, misoperation is less likely to occur even when the circuit illustrated in FIG. 1A having few sensors is used instead of the circuit illustrated in FIG. 1B capable of accurately calculating the potential difference of the input voltage.

Next, the following describes a power conversion method for leveling out, among a plurality of bidirectional switches, the number of times switching is performed.

FIG. 16 is a timing chart illustrating an example of the waveforms of the gate signals G1a to G4b generated by the control signal generating unit 24 for performing such a power conversion method. The gate signals G1a to G4b in FIG. 16 are partly different from the gate signals G1a to G4b in FIG. 14.

The gate signals G1a to G4b in FIG. 16 are different from the gate signals G1a to G4b in FIG. 14 only in that in the time periods T5 and T6, the changing of the level of the gate signal G1a is stopped and the level of the gate signal G3a is changed instead, and in the time periods T7 and T8, the changing of the level of the gate signal G4b is stopped and the level of the gate signal G1a is changed instead.

FIG. 17A to FIG. 17D are circuit diagrams each illustrating: the conduction states of the bidirectional switches 11 to 14 that are set according to the first control signals G1a to G4b illustrated in FIG. 16 in the time periods T5 to T8; and the current path of the first axis winding 51 determined accordingly.

With the gate signals G1a to G4b in FIG. 16, the conduction states of SW11 to SW14 and the current path of the first axis winding 51 are set as illustrated in FIG. 17A, FIG. 17B, FIG. 17C, and FIG. 17D in the time period T6a, the time periods T5 and T6b, the time period T7a, and the time periods T7b and T8, respectively.

As a result, the non-inverting voltage supply through the PWM control (cyclical power feeding and regeneration) is performed through the switching operations of SW12 and SW13 which differ between the time periods T2 and T6, and the inverting voltage supply through the PWM control (cyclical power feeding and regeneration) is performed through the switching operations of SW14 and SW11 which differ between the time periods T3 and T7.

According to the power conversion method described above, leveling out the number of times of the switching operations of the bidirectional switches 11 to 14 leads to leveling out of the heat generated by the bidirectional switches 11 to 14. As a result, it is possible to reduce the disadvantages of decreased rated power and lower reliability caused by local overheating of the bidirectional switches 11 to 14.

The power conversion method for leveling out the number of times of the switching operations of the bidirectional switches 11 to 14 can be combined with the power conversion method for providing the path of the regenerative current from the load by placing plural bidirectional switches in the bidirectional conducting state.

FIG. 18 is a timing chart illustrating an example of the waveforms of the gate signals G1a to G4b generated by the control signal generating unit 24 for performing such a power conversion method. The gate signals G1a to G4b in FIG. 18 are partly different from the gate signals G1a to G4b in FIG. 16.

The gate signals G1a to G4b in FIG. 18 are different from the gate signals G1a to G4b in FIG. 16 in that in the time periods T2b and T3b, the gate signals G1b and G3b are set at the ON level to form a path of the regenerative current from the first axis winding 51 via SW11 and SW13 placed in the bidirectional conducting state, and in the time periods T6*b* and T7*b*, the gate signals G4*b* and G2*b* are set at the ON level to form a path of the regenerative current from the first axis winding 51 via SW12 and SW14 placed in the bidirectional conducting state.

With the gate signals G1*a* to G4*b* in FIG. 18, the same switching operations as in the case of the gate signals G1*a* to G4*b* in FIG. 4 can be performed as illustrated in FIG. 19A to FIG. 19H. In addition, in the time periods T2*b* and T3*b*, the path of the regenerative current from the first axis winding 51 is formed via SW11 and SW13 placed in the bidirectional conducting state, and in the time periods T6*b* and T7*b*, the path of the regenerative current from the first axis winding 51 is formed via SW12 and SW14 placed in the bidirectional conducting state.

As a result, it becomes possible to level out the number of times of the switching operations of the bidirectional switches 11 to 14 and to allow the regenerative current from the first axis winding 51 to circulate within the matrix switch 10 irrespective of the direction of the regenerative current.

Embodiment 3

The following describes a simulation of motor driving performed by the above-described power conversion apparatus. In this simulation, a simulation model representing the above-described motor system including a power conversion apparatus is defined, and main voltages and currents of this simulation model are determined.

Figure 20:
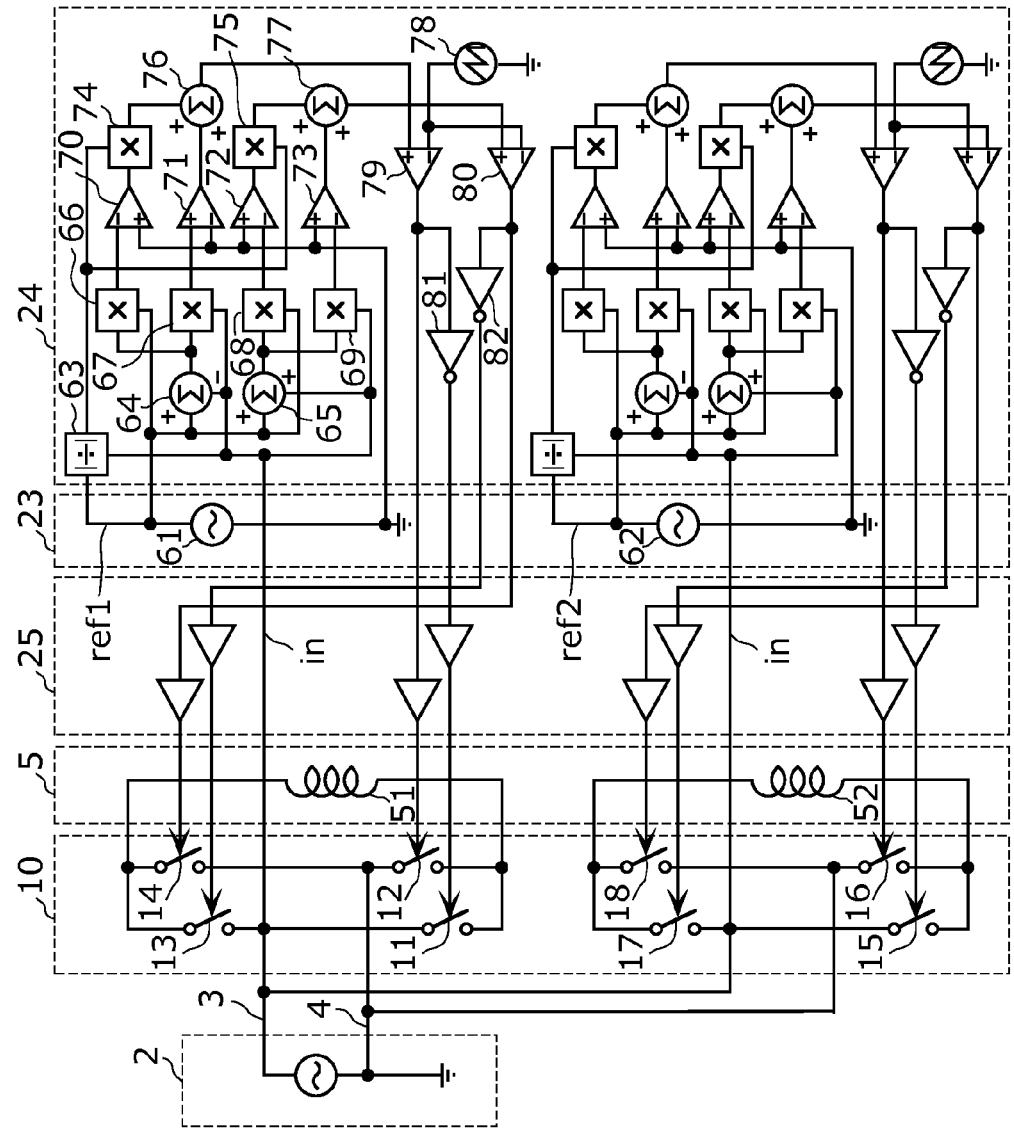
FIG. 20 is a functional block diagram illustrating an example of a simulation model of a motor system according to Embodiment 3.

FIG. 20 is a functional block diagram illustrating an example of a simulation model. The model illustrated in FIG. 20 has a function to perform the power conversion method described using FIG. 4. In this model, the parts corresponding to the structural elements illustrated in FIG. 1A, FIG. 1B, and FIG. 2 are denoted with the same reference signs as in FIG. 1A, FIG. 1B, and FIG. 2.

FIG. 21 is a timing chart illustrating an operation of the model in FIG. 20.

In FIG. 20, the target voltage designating unit 23 includes an oscillator 61 which generates an AC voltage designating the first target voltage ref1 and an oscillator 62 which generates an AC voltage designating the second target voltage ref2. These AC voltages form a two-phase AC voltage.

The control signal generating unit 24 includes a first signal generating circuit (the upper portion of the drawing) which generates first control signals for controlling SW11 to SW14, and a second signal generating circuit (the lower portion of the drawing) which generates second control signals for controlling SW15 to SW18. The first signal generating circuit includes a divider 63, adders 64, 65, 76, and 77, multipliers 66 to 69, 74, and 75, comparators 70 to 73, 79, and 80, an oscillator 78, and inverters 81 and 82. Although the reference numerals are not shown, the second signal generating circuit has the same configuration.

The following describes in detail the first signal generating circuit which generates the first control signals.

The oscillator 78 generates a PWM carrier signal. The PWM carrier signal is ramp waves (e.g. sawtooth waves, triangular waves) which rise for each PWM cycle. The divider 63 consecutively calculates the absolute values |ref1/in| of the values each obtained by dividing the instantaneous value of the first target voltage ref1 by the instantaneous value of the input voltage in.

The adder 64 calculates the sign of ref1−in ((b) in FIG. 21) from the instantaneous value of the input voltage in and the instantaneous value of the first target voltage ref1. The multiplier 66 and the comparator 70 calculate the sign of (ref1−in)×ref1 ((d) in FIG. 21), and the multiplier 67 and the comparator 71 calculate the sign of (ref1−in)×in ((c) in FIG. 21).

When (c) and (d) are calculated as (+, +), (−, −), (−, +), the comparators 70 and 71, the multiplier 74, and the adder 76 shift the value obtained by the division by the divider 63 to a value higher than the largest value of the PWM carrier signal, a value within the range of the amplitude of the PWM carrier signal, and a value lower than the smallest value of the PWM carrier signal, respectively.

The comparator 79 compares the level-shifted value and the PWM carrier signal and the inverter 81 generates the following first control signals: the first control signal corresponding to the period of continuous execution of the non-inverting voltage supply; the first control signal corresponding to the period of the execution of the non-inverting voltage supply through the PWM control; and the first control signal corresponding to the period of the suspension of the non-inverting voltage supply ((e) in FIG. 21). These first control signals are specifically the gate signals corresponding to SW12 illustrated in (c) in FIG. 4.

In such a manner, the duty cycle of the non-inverting voltage supply through the PWM control is changed for each PWM cycle so that the duty cycle is equal to the ratio |ref1/in|, which is the ratio of the instantaneous value of the first target voltage ref1 to the instantaneous value of the input voltage in.

In parallel with this, the following control is performed for the inverting voltage supply.

The adder 65 calculates the sign of ref1+in ((f) in FIG. 21) from the instantaneous value of the input voltage in and the instantaneous value of the first target voltage ref1. The multiplier 68 and the comparator 72 calculate the sign of (ref1+in)×ref1 ((h) in FIG. 21), and the multiplier 69 and the comparator 73 calculate the sign of (ref1+in)×in ((g) in FIG. 21).

When (g) and (h) are calculated as (−, +), (+, −), (+, +), the comparators 72 and 73, the multiplier 75, and the adder 77 shift the value obtained by the division by the divider 63 to a value higher than the largest value of the PWM carrier signal, a value within the range of the amplitude of the PWM carrier signal, and a value lower than the smallest value of the PWM carrier signal, respectively.

The comparator 80 compares the level-shifted value and the PWM carrier signal and the inverter 82 generates the following first control signals: the first control signal corresponding to the period of continuous execution of the inverting voltage supply; the first control signal corresponding to the period of the execution of the inverting voltage supply through the PWM control; and the first control signal corresponding to the period of the suspension of the inverting voltage supply ((i) in FIG. 21). These first control signals are specifically the gate signals corresponding to SW14 illustrated in (e) in FIG. 4.

In such a manner, the duty cycle of the inverting voltage supply through the PWM control is also changed for each PWM cycle so that the duty cycle is equal to the ratio |ref1/in|, which is the ratio of the instantaneous value of the first target voltage ref1 to the instantaneous value of the input voltage in.

The second signal generating circuit performs the same processing as described above for the input voltage in and the second target voltage ref2 to generate the second control signals for controlling SW15 to SW18. However, the second signal generating circuit is different from the first signal generating circuit in that ramp waves (e.g. sawtooth waves, triangular waves) which drop for each PWM cycle are used as the PWM carrier signal.

The following describes the result of a simulation performed using the model illustrated in FIG. 20. This simulation was performed under the following specific conditions: the input voltage in=(√2)×100 sin (ωt); the first target voltage ref1=100 sin (ωt+π/4); and the second target voltage ref2=100 sin (ωt−π/4).

Figure 22A:
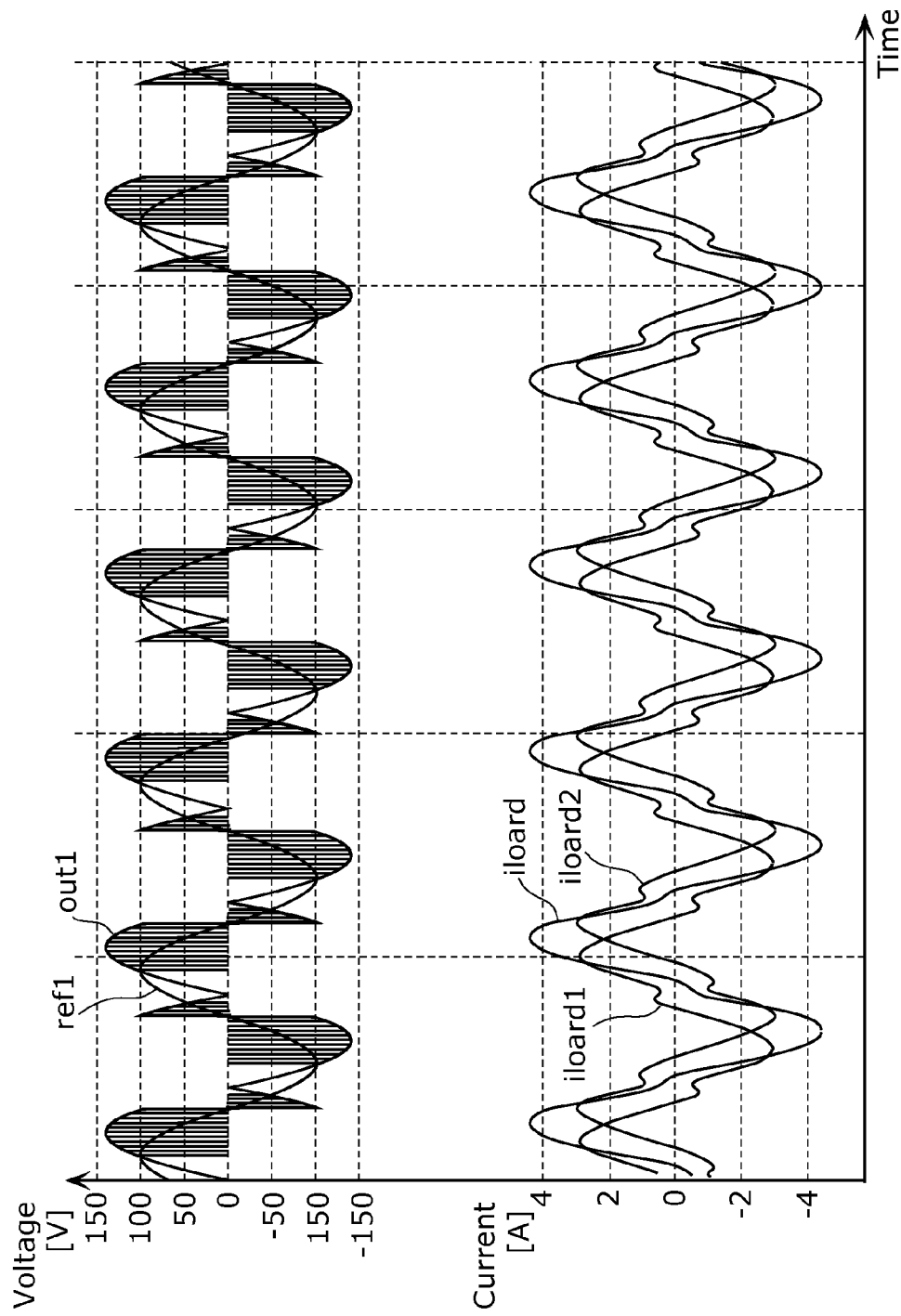
FIG. 22A is a graph illustrating an example of a simulation result according to Embodiment 3.

FIG. 22A is a graph illustrating the waveforms of the first target voltage ref1 and the first-phase output voltage out1, and the waveforms of a current iload 1 of the first axis winding 51, a current iload 2 of the second axis winding 52, and the total current iload (=iload 1+iload 2), which were obtained through the simulation.

There are vertical stripes in some segments of the waveform of the first-phase output voltage out1 to represent voltage swing caused by the PWM control. The first-phase output voltage out1 in such segments swings between zero and the instantaneous value of the input voltage in due to the PWM control, and the average voltage for each PWM cycle is the first target voltage ref1. Although not illustrated in the diagram, the same result has been obtained for the second target voltage ref2 and the second-phase output voltage out2.

It was confirmed that although the waveform of the total current iload is slightly modulated at the points where the input voltage in crosses zero, the total current iload has the same phase as the input voltage in and has a substantially sinusoidal waveform.

Furthermore, using the same model, a simulation was performed with the frequencies of the first target voltage ref1 and the second target voltage ref2 three times greater than the frequency of the input voltage in.

FIG. 22B is a graph illustrating the waveforms of the first target voltage ref1 and the first-phase output voltage out1 which were obtained through the simulation. It was confirmed from the graph of FIG. 22B that the same operation is performed even when the frequencies of the first target voltage ref1 and the second target voltage ref2 are three times greater than the frequency of the input voltage in.

In the above-described simulation model, the ramp waves which rise for each PWM cycle are used as the PWM carrier signal for the PWM control over the first-phase output voltage out1, and the ramp waves which drop for each PWM cycle are used as the PWM carrier signal for the PWM control over the second-phase output voltage out2.

Figure 23A:
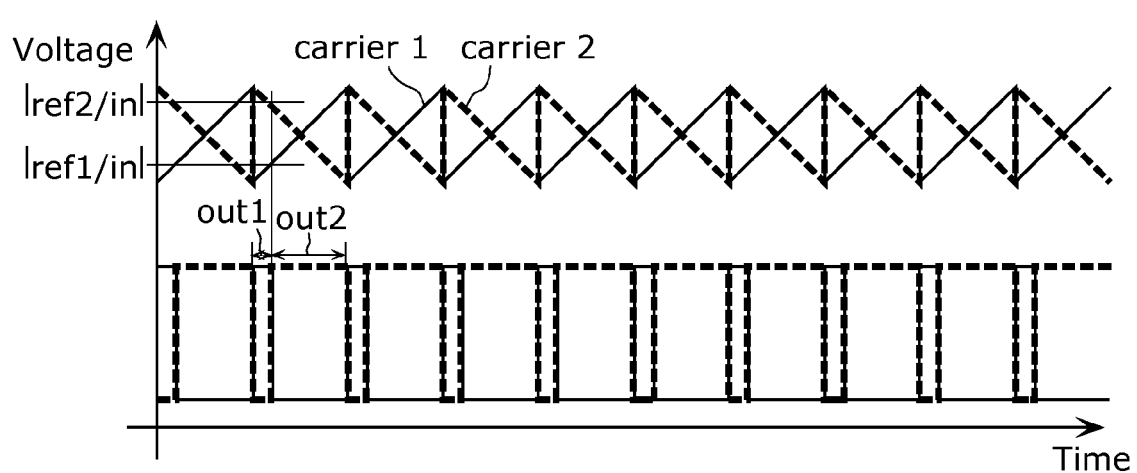
FIG. 23A is a graph illustrating an example of a PWM control operation according to Embodiment 3.
Figure 23B:
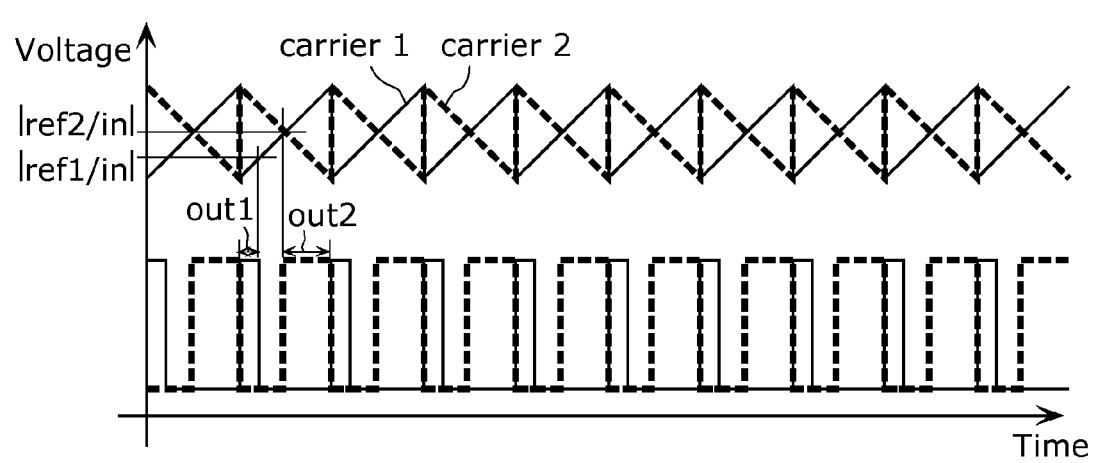
FIG. 23B is a graph illustrating another example of a PWM control operation according to Embodiment 3.
Figure 24:
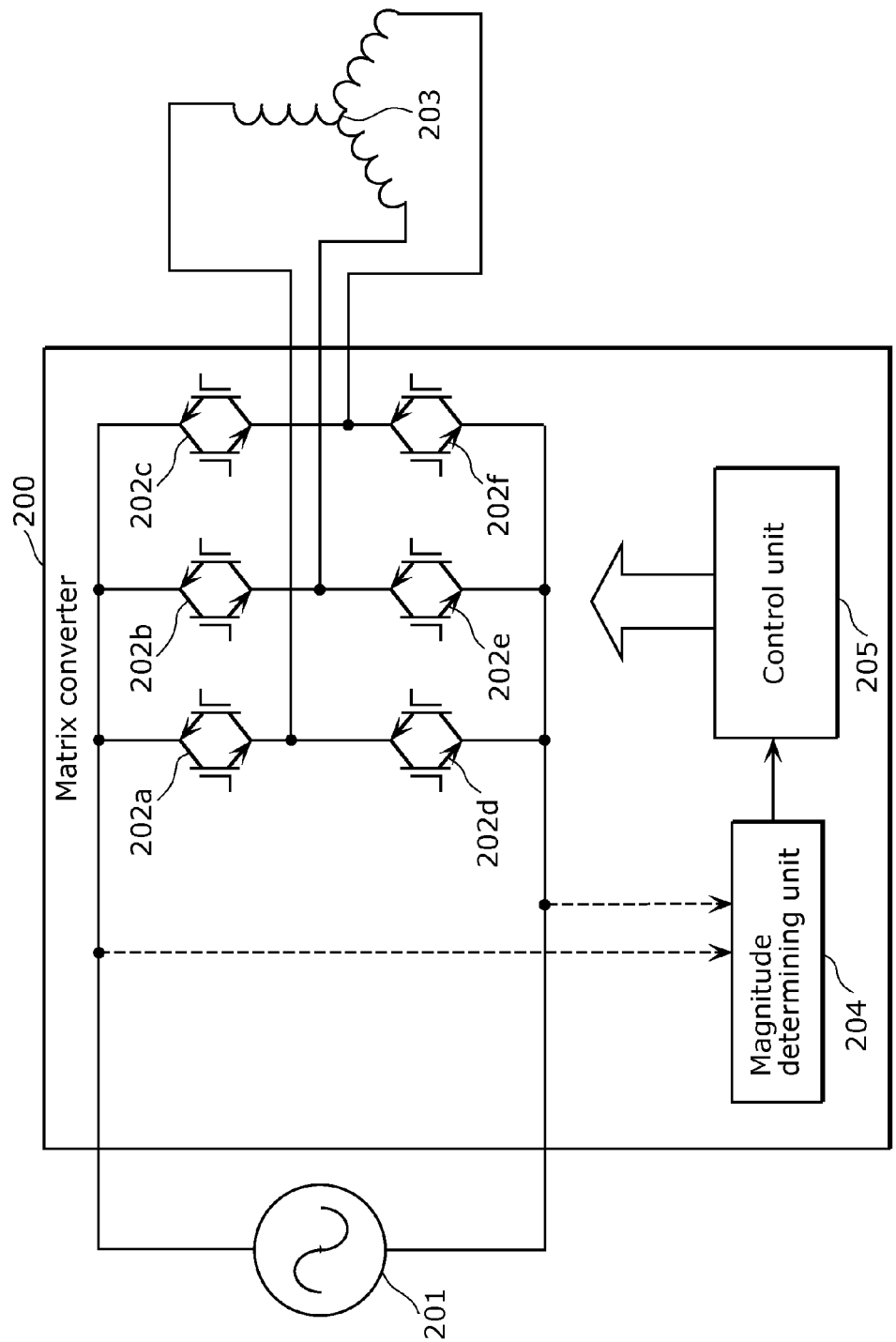
FIG. 24 is a circuit diagram of a conventional matrix converter.
Figure 25:
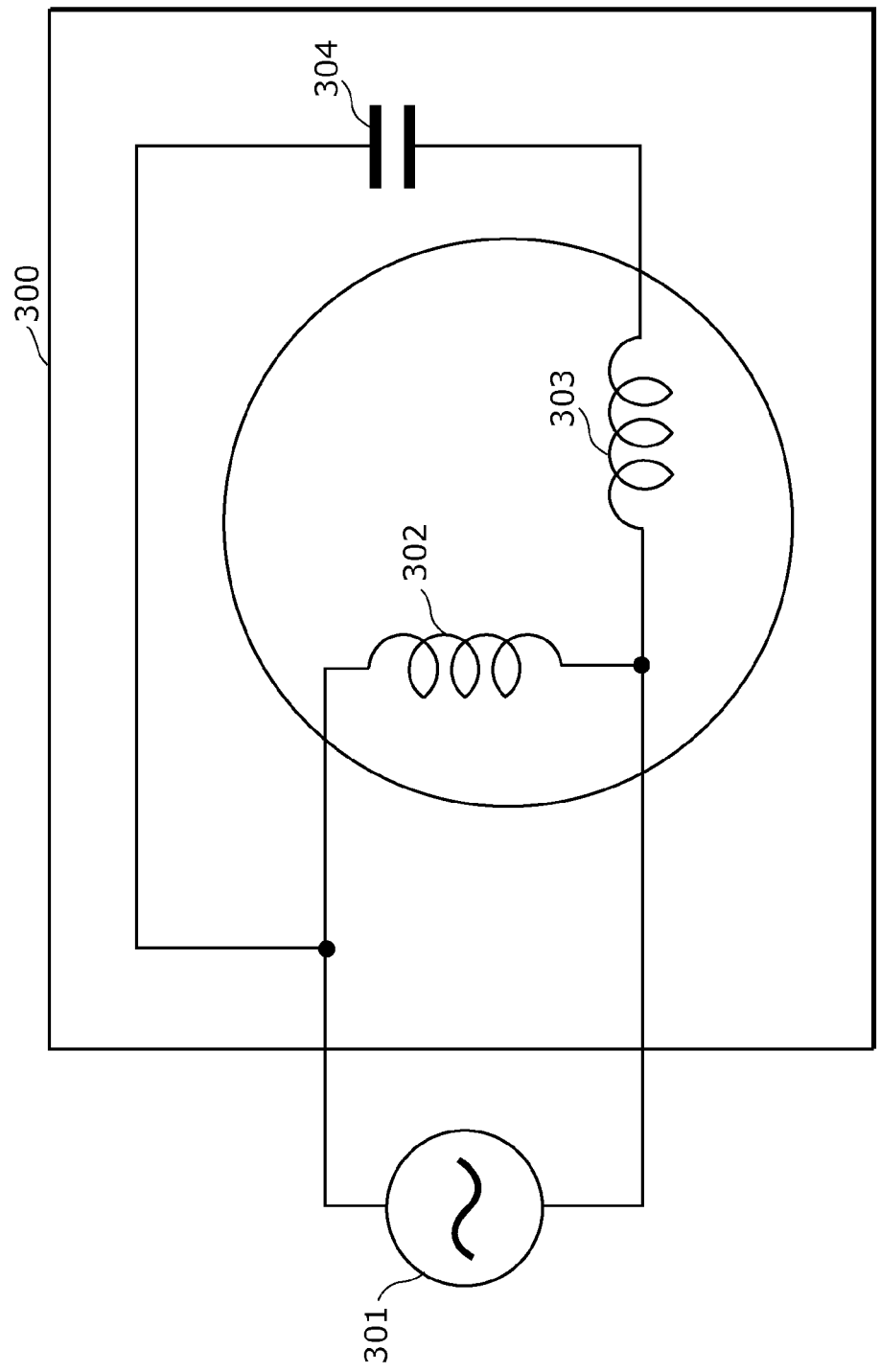
FIG. 25 is a circuit diagram of a conventional capacitor motor.

FIG. 23A and FIG. 23B are timing charts each illustrating the PWM control operation performed by such a configuration.

FIG. 23A shows an example of the waveforms of the main signals in the PWM control operation when the total duty cycle of the two phases is 100%. FIG. 23B shows an example of the waveforms of the main signals in the PWM control operation when the total duty cycle of the two phases is 70%.

In FIG. 23A and FIG. 23B, the input voltage is output as the first-phase output voltage out1 when the level of the first-phase PWM carrier signal carrier 1 is less than or equal to the first-phase duty cycle |ref1/in|, as indicated by the waveform in a solid line. The input voltage is output as the second-phase output voltage out2 when the level of the second-phase PWM carrier signal carrier 2 is less than or equal to the second-phase duty cycle |ref2/in|, as indicated by the waveform in a dotted line.

In such a manner, the first-phase power feeding and the second-phase power feeding in the PWM control operation are performed in the time period including the beginning of the PWM cycle and the time period including the end of the PWM cycle, respectively. Thus, the power feeding periods of the two phases do not overlap each other unless the total of the duty cycles of the two phases in the PWM control operation exceeds 100%. As a result, it is possible to reduce the fluctuations of the input voltage by preventing an excessive load on the power supply (including the resistance of a wire, for example) that supplies the input voltage.

A typical example of the case where the total of the duty cycles of the two phases in the PWM control is 100% has been described earlier. That is the case where the input voltage in=(√2) V sin (ωt), the first target voltage ref1=V sin (ωt+π/4), and the second target voltage ref2=V sin (ωt−π/4), described as an example of the waveforms illustrated in FIG. 3. According to this example, in=ref1+ref2 is established, and thus in the time periods T2 and T6 in FIG. 3, the PWM control is performed with the total of the duty cycles of the two phases maintained at 100%.

As described above, the input voltage in is effectively and stably converted into the first-phase output voltage out1 and the second-phase output voltage out2 by using the first target voltage ref1 and the second target voltage ref2 having an amplitude 1/√2 times smaller than the amplitude of the input voltage in, a frequency identical to the frequency of the input voltage in, and phase differences of +45 degrees and −45 degrees relative to the input voltage in.

It is to be noted that the overlap of the power feeding periods of the two phases can be avoided using a method different from the one described above. For example, the first-phase PWM control is performed in the above-described manner, and the second-phase PWM control is changed as follows: Specifically, the first-phase PWM carrier signal is used for the second phase, too, and the input voltage is output as the second-phase output voltage out2 when the level of the first-phase PWM carrier signal carrier 1 is greater than the value (1−|ref2/in|) obtained by inverting the second-phase duty cycle. This method also produces the same result as described above.

It is to be noted that the dead time can be controlled by using triangular waves as the PWM carrier signals, instead of the sawtooth waves illustrated in FIG. 23A and FIG. 23B.

The herein disclosed subject matter is to be considered descriptive and illustrative only, and the appended claims are of a scope intended to cover and encompass not only the particular embodiments disclosed, but also equivalent structures, methods, and/or uses.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory.

INDUSTRIAL APPLICABILITY

The present disclosure is applicable to a power conversion apparatus which converts a single-phase AC voltage into a two-phase AC voltage, and can be used especially for driving a two-phase induction motor.

The invention claimed is:

1. A power conversion apparatus which converts an input voltage which is a single-phase AC voltage into output voltages forming a two-phase AC voltage, the power conversion apparatus comprising:
   a pair of input terminals to which the input voltage is applied;
   a pair of first output terminals which output one of the output voltages as a first-phase output voltage;

a pair of second output terminals which output the other of the output voltages as a second-phase output voltage;

four first bidirectional switches each corresponding to a different combination of one of the paired input terminals and one of the paired first output terminals to switch connection and disconnection between the corresponding input terminal and first output terminal according to a corresponding one of first control signals;

four second bidirectional switches each corresponding to a different combination of one of the paired input terminals and one of the paired second output terminals to switch connection and disconnection between the corresponding input terminal and second output terminal according to a corresponding one of second control signals;

a target voltage designating unit configured to designate a first target voltage representing, using one of AC voltages forming a two-phase AC voltage, consecutive target values of the first-phase output voltage and a second target voltage representing, using the other of the AC voltages forming the two-phase AC voltage, consecutive target values of the second-phase output voltage;

a control signal generating unit configured to (i) generate the first control signals to cyclically connect and disconnect the pair of the input terminals and the pair of the first output terminals via the first bidirectional switches at a duty cycle corresponding to a ratio of an instantaneous absolute value of the first target voltage to an instantaneous absolute value of the input voltage during a time period in which the instantaneous absolute value of the input voltage is greater than the instantaneous absolute value of the first target voltage, and (ii) generate the second control signals to cyclically connect and disconnect the pair of the input terminals and the pair of the second output terminals via the second bidirectional switches at a duty cycle corresponding to a ratio of an instantaneous absolute value of the second target voltage to the instantaneous absolute value of the input voltage during a time period in which the instantaneous absolute value of the input voltage is greater than the instantaneous absolute value of the second target voltage; and a driver which supplies the generated first control signals to the first bidirectional switches and the generated second control signals to the second bidirectional switches.

2. The power conversion apparatus according to claim 1, wherein the input voltage is a sinusoidal AC voltage, and the target voltage designating unit is configured to designate the first target voltage and the second target voltage using AC voltages forming a two-phase sinusoidal AC voltage which have: an amplitude $1/\sqrt{2}$ times smaller than an amplitude of the input voltage; a frequency identical to a frequency of the input voltage; and phase differences of +45 degrees and −45 degrees relative to the input voltage.

3. The power conversion apparatus according to claim 1, wherein the control signal generating unit is configured to (i) generate the first control signals to (a) make a straight connection between the pair of the input terminals and the pair of the first output terminals during a time period in which the input voltage and the first target voltage have a same polarity and (b) make a cross connection between the pair of the input terminals and the pair of the first output terminals during a time period in which the input voltage and the first target voltage have different polarities, and (ii) generate the second control signals to (a) make a straight connection between the pair of the input terminals and the pair of the second output terminals during a time period in which the input voltage and the second target voltage have a same polarity and (b) make a cross connection between the pair of the input terminals and the pair of the second output terminals during a time period in which the input voltage and the second target voltage have different polarities.

4. The power conversion apparatus according to claim 1, wherein the control signal generating unit is configured to (i) generate the first control signals to constantly connect the pair of the input terminals and the pair of the first output terminals during a time period in which the instantaneous absolute value of the input voltage is less than or equal to the instantaneous absolute value of the first target voltage, and (ii) generate the second control signals to constantly connect the pair of the input terminals and the pair of the second output terminals during a time period in which the instantaneous absolute value of the input voltage is less than or equal to the instantaneous absolute value of the second target voltage.

5. The power conversion apparatus according to claim 1, wherein the control signal generating unit is configured to (i) generate the first control signals to constantly disconnect the pair of the input terminals and the pair of the first output terminals during a time period in which the instantaneous absolute value of the input voltage is less than or equal to the instantaneous absolute value of the first target voltage, and (ii) generate the second control signals to constantly disconnect the pair of the input terminals and the pair of the second output terminals during a time period in which the instantaneous absolute value of the input voltage is less than or equal to the instantaneous absolute value of the second target voltage.

6. The power conversion apparatus according to claim 1, wherein the control signal generating unit is configured to (i) generate the first control signals to short-circuit the pair of the first output terminals when the pair of the input terminals and the pair of the first output terminals are disconnected, and (ii) generate the second control signals to short-circuit the pair of the second output terminals when the pair of the input terminals and the pair of the second output terminals are disconnected.

7. The power conversion apparatus according to claim 6, wherein each of the first bidirectional switches and each of the second bidirectional switches includes two unidirectional switches connected in inverse parallel, each of the unidirectional switches changing between a forward-directional conducting state and a non-conducting state according to either a corresponding one of the first control signals or a corresponding one of the second control signals and not conducting in an opposite direction, and the control signal generating unit is configured to (i) generate, for short-circuiting the pair of the first output terminals, the first control signals to place, in the conducting state, all the unidirectional switches included in plural ones of the first bidirectional switches which are used for short-circuiting the pair of the first output terminals, and (ii) generate, for short-circuiting the pair of the second output terminals, the second control signals to place, in the conducting state, all the unidirectional switches included in plural ones of the second bidirectional switches which are used for short-circuiting the pair of the second output terminals.

8. The power conversion apparatus according to claim 1, wherein each of the first bidirectional switches and each of the second bidirectional switches includes two unidirectional switches connected in inverse parallel, each of the unidirectional switches changing between a forward-directional conducting state and a non-conducting state according to either a corresponding one of the first control signals or a corresponding one of the second control signals and not conducting in an opposite direction, and the control signal generating unit is configured to generate the first control signals and the second control signals to (i) change between the conducting state and the non-conducting state of one of the two unidirectional switches to which the input voltage is applied in a forward direction and (ii) constantly place, in the conducting state, the other of the two unidirectional switches to which the input voltage is applied in the opposite direction.

9. The power conversion apparatus according to claim 1, wherein the control signal generating unit is configured to (i) generate the first control signals to place, in a conducting state, plural ones of the first bidirectional switches which are determined depending on a polarity of the input voltage, when the pair of the input terminals and the pair of the first output terminals are connected, and (ii) generate the second control signals to place, in a conducting state, plural ones of the second bidirectional switches which are determined depending on the polarity of the input voltage, when the pair of the input terminals and the pair of the second output terminals are connected.

10. The power conversion apparatus according to claim 1, wherein the control signal generating unit is configured to generate the first control signals and the second control signals to avoid overlap of a time period in which the pair of the input terminals and the pair of the first output terminals are connected and a time period in which the pair of the input terminals and the pair of the second output terminals are connected.

11. A motor system comprising:
the power conversion apparatus according to claim 1;
a two-phase induction motor including: a first axis winding; a second axis winding; a rotor; a pair of first power receiving terminals connected to the first axis winding; and a pair of second power receiving terminals connected to the second axis winding, the first axis winding and the second axis winding being not electrically connected within the two-phase induction motor;
first feed lines connecting the pair of the first output terminals of the power conversion apparatus and the pair of the first power receiving terminals of the two-phase induction motor; and
second feed lines connecting the pair of the second output terminals of the power conversion apparatus and the pair of the second power receiving terminals of the two-phase induction motor.

12. The motor system according to claim 11,
wherein the two-phase induction motor includes a rotation angle sensor which outputs a rotation angle signal indicating consecutive rotation amounts of the rotor, the power conversion apparatus further includes a rotation angle obtaining unit configured to obtain the rotation angle signal, and the target voltage designating unit is configured to perform vector control to change at least one of amplitude, frequency, and phase of the first target voltage and the second target voltage based on a difference between a rotation speed of the rotor determined from the obtained rotation angle signal and a speed command value.

13. The motor system according to claim 11,
wherein the power conversion apparatus further includes: a current sensor which outputs current amount signals each indicating consecutive current amounts flowing in either the pair of the first output terminals or the pair of the second output terminals; and a current amount obtaining unit configured to obtain the current amount signals, and the target voltage designating unit is configured to perform speed sensorless vector control to estimate a rotation speed of the rotor using the obtained consecutive current amounts, and change at least one of amplitude, frequency, and phase of the first target voltage and the second target voltage based on a difference between the estimated rotation speed and a speed command value.

14. A power conversion method for converting an input voltage which is a single-phase AC voltage into output voltages forming a two-phase AC voltage, the power conversion method comprising:
receiving the input voltage at a pair of input terminals;
designating a first target voltage representing, using one of AC voltages forming a two-phase AC voltage, consecutive target values of a first-phase output voltage that is one of the output voltages and a second target voltage representing, using the other of the AC voltages forming the two-phase AC voltage, consecutive target values of a second-phase output voltage that is the other of the output voltages;
cyclically connecting and disconnecting the pair of the input terminals and a pair of first output terminals via first bidirectional switches at a duty cycle corresponding to a ratio of an instantaneous absolute value of the first target voltage to an instantaneous absolute value of the input voltage during a time period in which the instantaneous absolute value of the input voltage is greater than the instantaneous absolute value of the first target voltage; and
cyclically connecting and disconnecting the pair of the input terminals and a pair of second output terminals via second bidirectional switches at a duty cycle corresponding to a ratio of an instantaneous absolute value of the second target voltage to the instantaneous absolute value of the input voltage during a time period in which the instantaneous absolute value of the input voltage is greater than the instantaneous absolute value of the second target voltage.

* * * * *